United States Patent
Isacks et al.

(10) Patent No.: US 10,306,000 B1
(45) Date of Patent: May 28, 2019

(54) METHODS AND APPARATUS FOR GENERATING, AGGREGATING AND/OR DISTRIBUTING PRESENCE INFORMATION

(71) Applicant: Ribbon Communications Operating Company, Inc., Westford, MA (US)

(72) Inventors: Kevin Neil Isacks, Fremont, CA (US); Lisa Villa Neyen, Belmont, NC (US); Shambhu Dayal Rai, Monmouth Junction, NJ (US); Timothy R. Thornton, Brick, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 15/163,517

(22) Filed: May 24, 2016

Related U.S. Application Data

(63) Continuation-in-part of application No. 14/312,038, filed on Jun. 23, 2014, now Pat. No. 9,398,107, and a continuation-in-part of application No. 14/231,606, filed on Mar. 31, 2014, now Pat. No. 10,044,774.

(51) Int. Cl.
*G06F 15/16* (2006.01)
*H04L 29/08* (2006.01)
*H04L 29/06* (2006.01)
*H04M 7/12* (2006.01)

(52) U.S. Cl.
CPC .......... *H04L 67/22* (2013.01); *H04L 65/1006* (2013.01); *H04L 65/1069* (2013.01); *H04L 65/1073* (2013.01); *H04L 67/24* (2013.01); *H04L 67/306* (2013.01); *H04M 7/127* (2013.01)

(58) Field of Classification Search
CPC . H04L 67/22; H04L 65/1073; H04L 65/1069; H04L 65/1006; H04L 67/24; H04L 67/306; H04M 7/127
USPC ........................................................ 709/204
See application file for complete search history.

(56) References Cited

U.S. PATENT DOCUMENTS

| | | | |
|---|---|---|---|
| 5,768,519 A | 6/1998 | Swift et al. | |
| 7,441,032 B2 * | 10/2008 | Costa Requena | ....... H04L 51/04 455/456.1 |
| 7,536,437 B2 * | 5/2009 | Zmolek | ................... H04L 63/08 455/456.1 |

(Continued)

*Primary Examiner* — Michael Won
(74) *Attorney, Agent, or Firm* — Straub & Straub; Stephen T. Straub; Michael P. Straub

(57) ABSTRACT

Methods and apparatus for deriving and/or generating, user presence information from communication signals monitored by a SBC or PRI Gateway and aggregating and/or distributing the user presence information. An exemplary method embodiment includes the steps of storing a plurality of user profile records, each of the user profile records mapping contact information for a user to one or more user identifiers corresponding to the user; receiving first signaling information; determining a first user corresponding to the first signaling information by comparing at least a first portion of the information contained in the first signaling information to at least a first portion of the information contained in the plurality of user profiles; and generating presence status information for the first user and communicating the first presence status information to a presence server as presence status information corresponding to a first user identifier, said first user identifier corresponding to said first user.

20 Claims, 26 Drawing Sheets

(56) References Cited

U.S. PATENT DOCUMENTS

| | | | |
|---|---|---|---|
| 7,673,327 B1 | 3/2010 | Polis et al. | |
| 7,917,583 B2 * | 3/2011 | Angiolillo | H04L 12/581 709/204 |
| 7,933,608 B2 * | 4/2011 | Tejani | H04L 69/329 370/338 |
| 8,194,642 B2 | 6/2012 | Rosenberg | |
| 8,369,311 B1 * | 2/2013 | Kirchhoff | H04M 3/42263 370/352 |
| 8,412,675 B2 | 4/2013 | Alvarado et al. | |
| 8,422,487 B2 * | 4/2013 | Mason | H04L 12/5815 370/252 |
| 8,694,517 B2 | 4/2014 | Johnsen et al. | |
| 8,861,537 B1 * | 10/2014 | Braithwaite | 370/401 |
| 8,903,903 B2 * | 12/2014 | Benedyk | H04L 67/24 709/204 |
| 9,344,458 B2 * | 5/2016 | Hubler | H04L 65/1006 |
| 2005/0267895 A1 * | 12/2005 | Yoshiuchi | H04L 29/06027 |
| 2005/0289180 A1 | 12/2005 | Pabla et al. | |
| 2006/0212420 A1 | 9/2006 | Murthy | |
| 2006/0253593 A1 * | 11/2006 | Jachner | H04M 3/42195 709/227 |
| 2007/0027975 A1 | 2/2007 | Tai et al. | |
| 2007/0130260 A1 * | 6/2007 | Weintraub | H04L 29/06027 709/204 |
| 2008/0162637 A1 * | 7/2008 | Adamczyk | H04L 51/043 709/204 |
| 2008/0243789 A1 | 10/2008 | Kussmaul et al. | |
| 2009/0034698 A1 * | 2/2009 | Karnalkar | H04W 4/12 379/88.22 |
| 2010/0088365 A1 * | 4/2010 | Varney | H04L 67/24 709/203 |
| 2010/0299385 A1 * | 11/2010 | Root | H04M 3/42365 709/202 |
| 2010/0299615 A1 * | 11/2010 | Miluzzo | H04W 4/02 715/752 |
| 2011/0035443 A1 * | 2/2011 | Jensen | H04W 4/20 709/204 |
| 2011/0044321 A1 * | 2/2011 | Rosenberg | H04M 7/0057 370/352 |
| 2011/0113094 A1 * | 5/2011 | Chunilal | G06F 17/30867 709/204 |
| 2011/0202602 A1 * | 8/2011 | Biollo | H04L 51/043 709/204 |
| 2013/0166595 A1 | 6/2013 | Meketa et al. | |
| 2013/0212176 A1 * | 8/2013 | Koulomzin | G06Q 50/01 709/204 |
| 2013/0238723 A1 * | 9/2013 | Balannik | G06Q 10/10 709/206 |
| 2014/0095602 A1 * | 4/2014 | Sheppard | H04L 67/24 709/204 |
| 2014/0149511 A1 * | 5/2014 | Nunez Diaz | H04L 67/24 709/204 |
| 2014/0164519 A1 * | 6/2014 | Shah | H04L 67/306 709/204 |
| 2014/0229614 A1 | 8/2014 | Aggarwal et al. | |
| 2015/0237008 A1 | 8/2015 | Ansari et al. | |

* cited by examiner

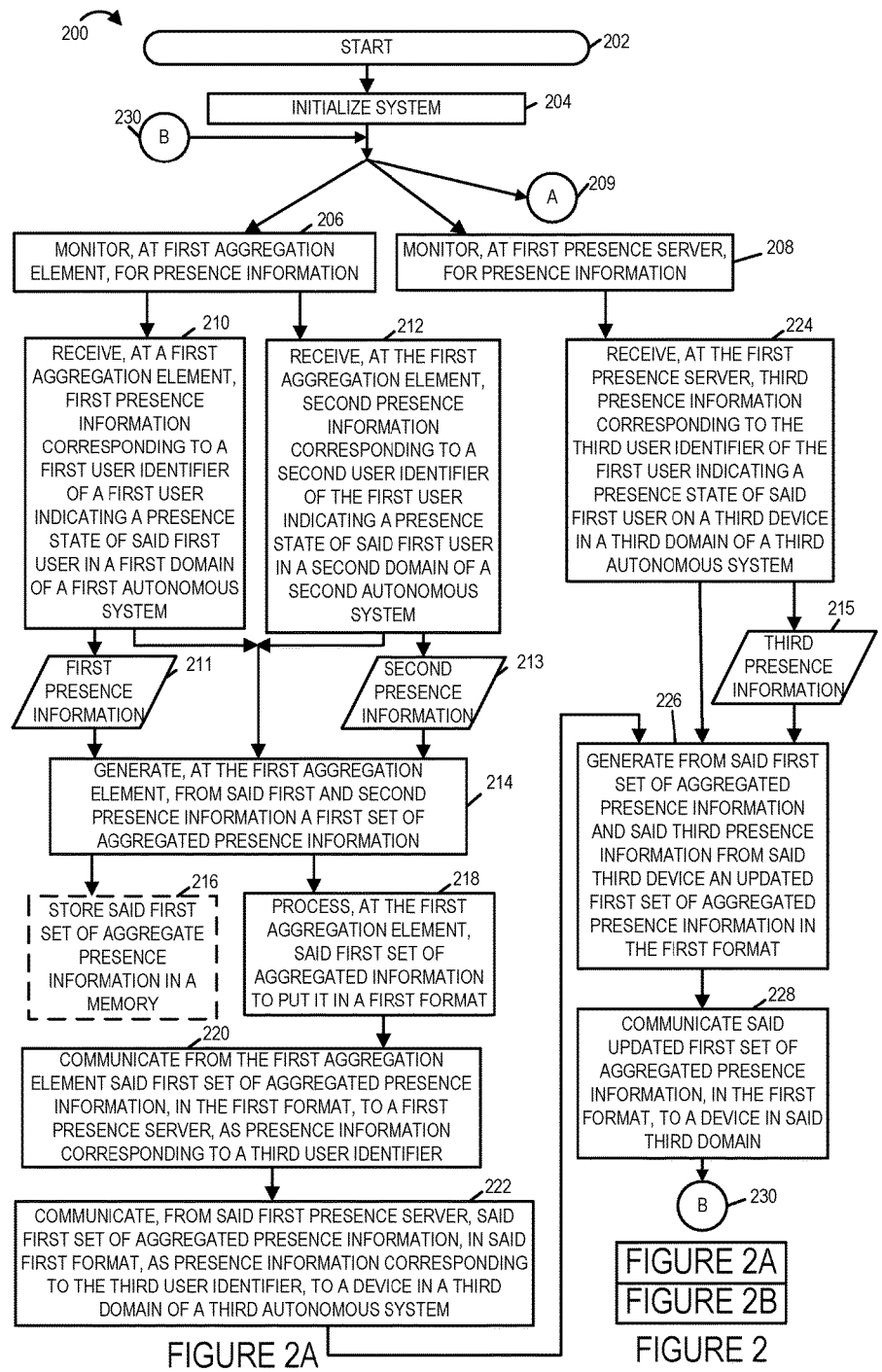

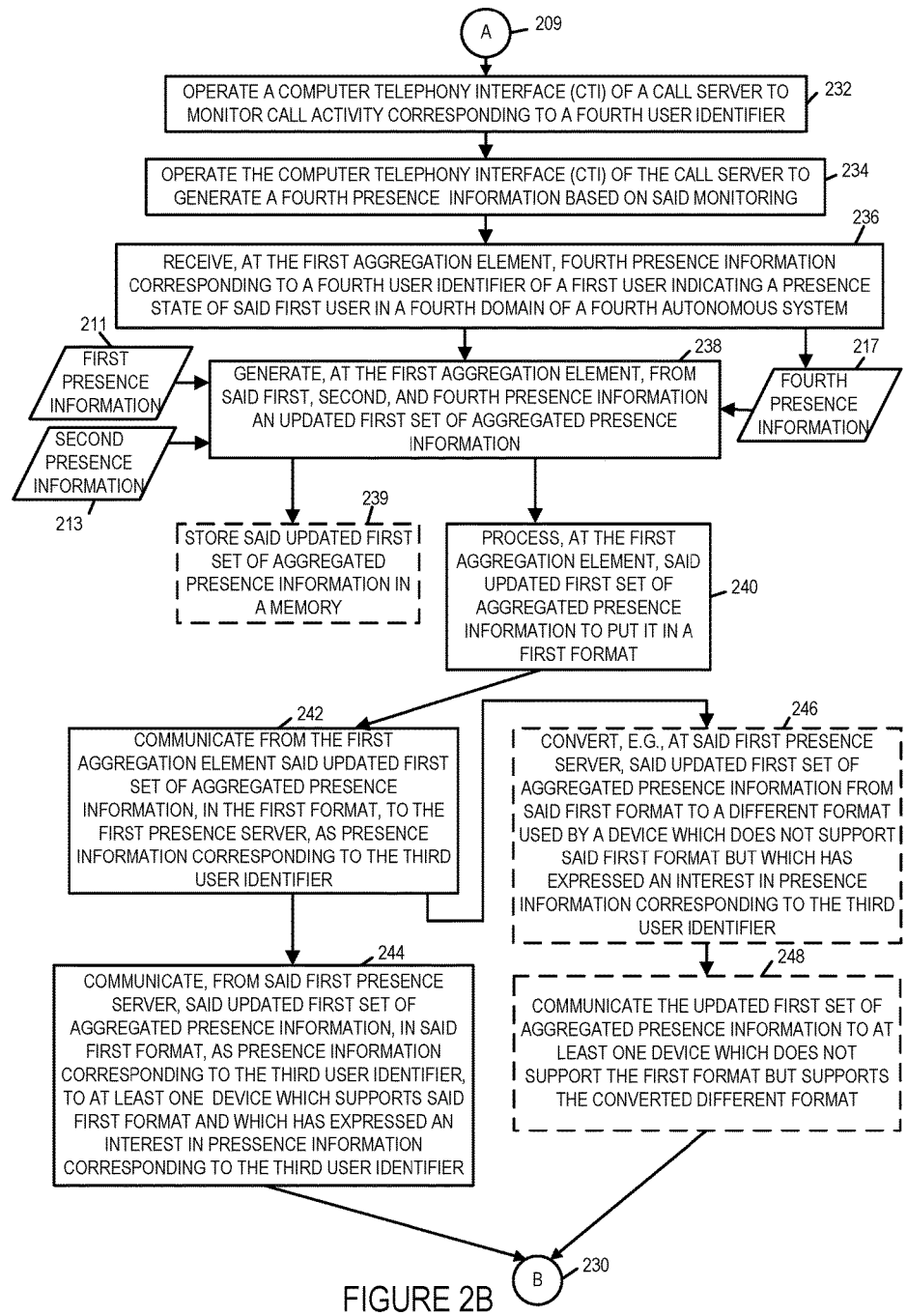

| ACTIVITY CORRESPONDING TO USER ID, E.G., IMS ID, MONITORED BY DEVICE DERIVED FROM OR BASED ON MONITORED SIGNALS CORRESPONDING TO CONTACT INFORMATION FOR USER ID | PRESENCE INFORMATION GENERATED BY DEVICE, SBC OR PRI GATEWAY, FOR USER ID BASED ON/ DERIVED FROM MONITORED SIGNALS |
|---|---|
| REGISTERED | AVAILABLE |
| MAKES A CALL | BUSY |
| RECEIVES A CALL | BUSY |
| CALL OVER | AVAILABLE |
| NOT REGISTERED | OFFLINE |
| LOCATION | LOCATION |
| DEVICE CAPABILITY | DEVICE CAPABILITY |

FIGURE 17

METHODS AND APPARATUS FOR GENERATING, AGGREGATING AND/OR DISTRIBUTING PRESENCE INFORMATION

RELATED APPLICATIONS

The present application is a continuation in part of U.S. patent application Ser. No. 14/231,606 filed Mar. 31, 2014, entitled, Methods and Apparatus for Aggregating and Distributing Presence Information, and U.S. patent application Ser. No. 14/312,038 filed Jun. 23, 2014, entitled, Methods and Apparatus for Aggregating and Distributing Contact and Presence and Information both of which are hereby expressly incorporated by reference in their entirety and which are owned by the assignee of the instant application.

FIELD

The present application relates to methods and apparatus for deriving and/or generating, user presence information from monitored communications signals and aggregating and/or distributing the user presence information.

BACKGROUND

Session Initiation Protocol (SIP) is an application level protocol defined by Internet Engineering Task Force (IETF) for creating, modifying and terminating multimedia sessions. SIP is widely used for establishing and terminating voice, video, and messaging sessions over IP (Internet Protocol) and to exchange presence information.

Presence information is a status indicator that conveys ability and willingness of a potential communication partner (on the other end). A user's client provides presence information (presence state) to a presence service. The presence service stores the user's presence information in what constitutes the user's personal availability record sometimes referred to as a presentity. Under certain conditions the user's presentity is made available for distribution to other users, who are sometimes referred to as watchers, to convey the user's availability for communication. In this way the presence information is the service enabler for instance messaging (IM), voice or video sessions. The growth in popularity of instant messaging and voice over IP from consumers is largely attributed to the availability of the presence information of other users such as in a buddy list.

Many communications devices such as for example those which are connected directly to a PSTN or Internet do not provide presence information. For example, legacy PBX systems typically do not provide presence information for their users. Furthermore, it is typical for a user to be reachable on many different devices. Currently when a user is a Skype for business Lync client, its presence status is tied only a Skype for business to Skype for business session. This limitation does not communicate the full range of other devices that the user may have, such as PBX lines, home phones, mobile devices, etc.

It should be appreciated from the foregoing that there is a need for methods and apparatus that can provide a user's presence information for devices and systems that do not support and/or do not provide presence information. Furthermore, it should be appreciated that there is a need for providing presence information on behalf of users that do not have devices or operate behind devices that do not support or provide presence information. Moreover, it should be appreciated that there is a need for determining a user's presence information without affecting the user's communication signaling.

There are currently multiple services offering presence, IM, and/or voice/video communications services. For example, the IP (Internet Protocol) Multimedia Subsystem (IMS) is an architectural framework for delivering Internet Protocol (IP) multimedia services. IMS was originally designed by the wireless standards body 3rd Generation Partnership Project (3GPP) and later on maintained and updated by 3GPP, 3GPP2 and TISPAN (Telecommunications and Internet converged Services and Protocols for Advanced Networking) as a collaborative effort. IMS defines an architecture and procedures for implementing the voice, video, IM and presence services based on Session Initiation Protocol. IMS is considered one of the next generation architectures for providing services over IP among the Telcom industry. There are also numerous web based services such as, for example, Google Talk (gtalk), skype, and yahoo instant messaging offering presence enabled instant messaging, voice and/or video services. Moreover, there are product offerings such as, for example, Microsoft Lync and Cisco Jabber, which are popular in the Enterprise market. Microsoft (MS) Lync offers integrated instant messaging, voice, video services from a system hosted in the Enterprise as well as Lync online which is a cloud based communication service. In such systems in order to get a communication service a user needs an Identity which is recognized in the service domain. For example, a skype ID is needed for using skype service, an IMS Public user Identity is needed for using IMS service, and an Microsoft Lync ID is needed for using Lync service.

These communication services are managed as autonomous systems which recognize the user by the Identity assigned to the user by the system. However, each system does not know the Identities of the same user in other autonomous systems. As a result, presence aggregation logic does not take the activity on other user identities of the same user into consideration. This leads to inaccurate representation of the presence state of the user. For example, Microsoft Lync aggregates the presence of the user based on the activity of the user on all the devices, the user logged in with a Microsoft Lync ID. But, Microsoft Lync presence does not take into account the user activity in other domains or autonomous systems such as gtalk or IMS phone.

It should be appreciated that there is a need for methods and apparatus that can not only derive and/or generate a user's presence information from monitoring a user's communication signals but also a need to aggregate and distribute a user's presence information across multiple autonomous federated and non-federated systems and/or domains.

SUMMARY

Various embodiments, in accordance with the present invention, are directed to methods and apparatus for generating and/or deriving a user's presence information by monitoring communication signals sent by one of the user's devices. Some embodiments, in accordance with the present invention are directed to methods and apparatus which also combine the generated and/or derived presence state information for a user, who has different identities corresponding to different domains and/or autonomous systems, and/or for redistributing combined presence state information across multiple autonomous federated and non-federated systems and/or domains. The present invention addresses the problems discussed above and solves communications and Internet centric problems such as how to determine and provide presence information for a user operating on a device or system that does not support presence services in an efficient and economical manner without delaying or interrupting service being provided to a user.

For example, MS Lync presence state information corresponding to a user is generated based on the user's activity on the IMS identity, e.g., phone number, of the user as derived from signaling messages passing through a Session Border Controller which is non-intrusively monitoring the signals it receives. In another example, a Session Border Controller (SBC) or Primary Rate Interface Gateway device non-intrusively monitors communications signals passing through it to intelligently determine that presence information derived from the monitored signals needs to be published to one or more presence servers.

An exemplary method of operating a communications system, comprises the steps of storing, at a storage device a plurality of user profile records, each of the user profile records mapping contact information for a user to one or more user identifiers corresponding to the user; receiving, at a monitoring device, first signaling information, said monitoring device being a Session Border Controller or a gateway; determining, at the monitoring device, a first user corresponding to the first signaling information by comparing at least a first portion of the information contained in the first signaling information to at least a first portion of the information contained in the plurality of user profiles; generating, at the monitoring device, first presence status information corresponding to the first user based on said first signaling information; and communicating, from the monitoring device, the first presence status information, in a first format to a first presence server as presence status information corresponding to a first user identifier, said first user identifier corresponding to said first user.

An exemplary monitoring device and/or apparatus in accordance with an embodiment of the present invention includes: a storage device for storing a plurality of user profile records, each of the user profile records mapping contact information for a user to one or more user identifiers corresponding to the user; an Input/Output Interface configured to receive first signaling information, said monitoring device being a Session Border Controller or a gateway; and a processor configured to operate said monitoring device to: (i) identify a first user corresponding to the first signaling information by comparing at least a first portion of the information contained in the first signaling information to at least a first portion of the information contained in the plurality of user profiles; (ii) generate first presence status information corresponding to the first user based on said first signaling information; and (iii) communicate via said Input/Output Interface the first presence status information, in a first format, to a first presence server as presence status information corresponding to a first user identifier, said first user identifier corresponding to said first user.

In some embodiments, the user profile records are stored in cache memory in the monitoring device. In various embodiments, the contact information is a PBX telephone number and the user identifier is a Skype for business user ID. The determined presence information in some such embodiments is sent to a Lync presence server as presence information corresponding to the Skype for business user Id. In some embodiments the user profile records are contained in an Active Database. In some embodiments the first portion of the information contained in the first signaling information is a called party phone number, a calling party phone number, and/or a calling party name.

In most embodiments, the received signals passing through the SBC or PRI gateway monitoring device are non-intrusively monitored to determine if presence information can be determined from the received signals. In some embodiments, the received signals are routed to one or more phone numbers based on contact information contained in a user profile record identified as corresponding to the user for whom the received signal is destined.

While various exemplary embodiments and features have been described, numerous additional features and embodiments are described in the detailed description which follows. Furthermore it should be understood that while various features and elements are described in this summary all features and elements are not necessary or required for all embodiments of the invention.

BRIEF DESCRIPTION OF THE FIGURES

FIG. 2 shows the combination of FIGS. 2A and 2B.

FIG. 2A is a first part of a flowchart of an exemplary method of providing presence information in a communications environment including multiple autonomous systems in accordance with an exemplary embodiment.

FIG. 2B is a second part of a flowchart of an exemplary method of providing presence information in a communications environment including multiple autonomous systems in accordance with an exemplary embodiment.

FIG. 17 illustrates an exemplary table that is used to generate presence information based on monitored activity derived from received signals in accordance with one embodiment of the present invention.

DETAILED DESCRIPTION

Figure 1:
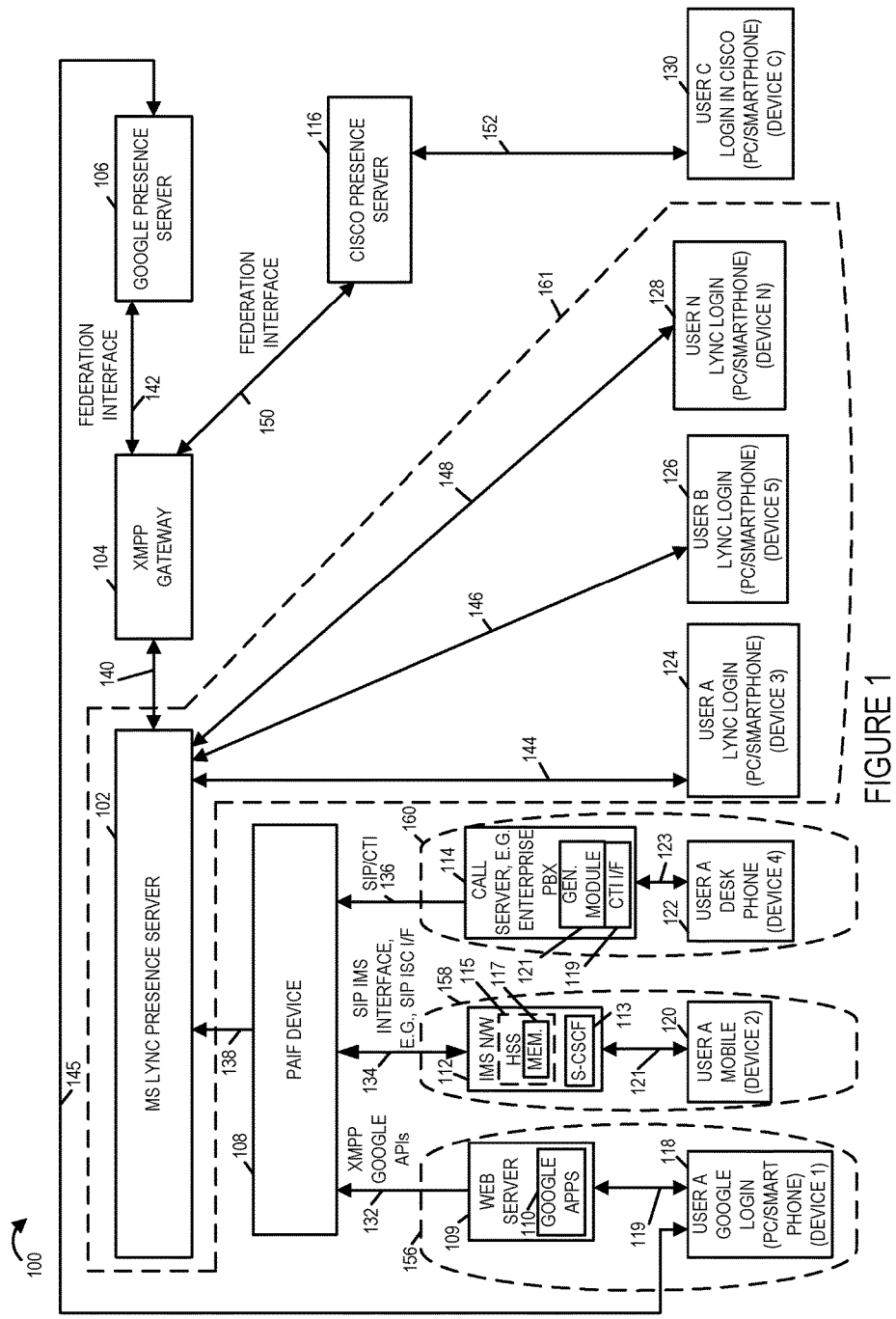
FIG. 1 illustrates an exemplary communications environment in accordance with one embodiment of the present invention.

FIG. 1 illustrates an exemplary communications environment 100 including, among other things, a presence server 102 and a presence aggregation information interworking function device (PAIF device) 108 for processing data, in accordance with one embodiment of the present invention. The data being processed may be, and in various embodiments is, user presence information from a variety of different systems. In some embodiments of the present invention, the exemplary communications environment 100 is implemented to aggregate user presence information for one or more user's from a plurality of autonomous communications systems and then distribute the aggregated presence information to one or more devices.

The exemplary communications environment 100 includes a presence server 102 which is shown in the exemplary embodiment as a MS Lync Presence server, an Extensible Messaging and Presence Protocol (XMPP) gateway 104, a Google presence server 106, a Cisco presence server 116, a presence aggregation information interworking function device (PAIF device) 108, a web server 109 including a Google applications module 110, an IP Multimedia Subsystem (IMS) network 112, and a call server 114, e.g., an Enterprise PBX system.

IMS network 112 includes a call server control entity, e.g., S-CSCF (Serving-Call Session Control Function) 113. In the exemplary embodiment, device 2 120 is a mobile device having an IMS ID corresponding to user A. In some embodiments, second presence information, corresponding to device 2 120 and user A, which is communicated to PAIF device 108, includes SIP session information from S-CSCF 113. In some embodiments, IMS network 112 includes a home subscriber server (HSS) 115 including memory 117 for storing one or more sets of aggregate presence information corresponding to IMS IDs, e.g., for storing a first set of aggregate presence information corresponding to the IMS ID being used by device 2 120. Thus, in some embodiments, aggregate presence information generated by PAIF device 108 is stored in the IMS network 112 in memory 117 of HSS 115.

Call server 114 includes a CTI interface 119 and a generation module 121. The CTI interface 119 is configured to monitor for call activity corresponding to a fourth user identifier corresponding to user A, e.g., activity corresponding to user identifier used with desk phone device 4 122. Generation module 121 is configured to generate fourth presence information based on the monitoring of the CTI interface 119. Fourth presence information is an input to PAIF device 108.

The exemplary communications environment 100 further includes a plurality of user devices (device 1 118, device 2 120, device 3 124, device 4 122, device 5 126, . . . , device N 128, and device C 130). Device 1 118 is a PC/smartphone, which corresponds to user A and which includes Google login capability. Device 2 120 is a mobile, e.g. a cell phone with an IMS ID, which corresponds to user A. Device 3 124 is a PC/smartphone, which corresponds to user A and which includes Lync login capability. Device 4 122 is a desk phone, which corresponds to user A and which interfaces to Enterprise PBX 114. Device 5 126 is a PC/smartphone, which corresponds to user B and which includes Lync login capability and a MS Lync ID different from user A and user N. Device N 128 is a PC/smartphone, which corresponds to user N and which includes Lync login capability and a MS Lync ID different from user A and B. Device C 130 is a PC/smartphone, which corresponds to user C and which includes Cisco login capability.

The exemplary communications environment 100 further includes communications links (119, 121, 144, 123, 146, 148, 152) between user devices (user device 1 118, user device 2 120, user device 4 122, user device 3 124, user device B 126, user device N 128, user device C 130) and (Google applications module 110, IMS network 112, Enterprise PBX system 114, MS Lync Presence server 102, MS Lync Presence server 102, MS Lync Presence server 102, Cisco Presence server 116), respectively. The exemplary communications environment 100 further includes a link 132 between web server 109 including Google Applications module 110 and PAIF device 108, a link 134 between IMS network 112 and PAIF device 108, a link 136 between Enterprise PBX system 114 and PAIF device 108, a link 138 between PAIF device 108 and MS Lync presence server 102. Exemplary system 100 further includes a communications link 140 between MS Lync Presence server 102 and XMPP gateway 104, a communications link 142, e.g., a Federation interface, between XMPP gateway 104 and Google presence server 106, a communications link 150, e.g., a Federation interface, between XMPP gateway 104 and Cisco Presence server 116, and a communications link 145 between Google Presence server 106 and user device 1 106. The communications links of the communications environment 100 may be, and in some embodiments are, bi-directional communications links.

Google Apps 110 and user device 1 118 are part of a first autonomous network 156. IMS network 112 and user device 2 120 are part of a second autonomous network 158. Call server 114, e.g., an Enterprise PBX system, and user device 4 122 are part of a fourth autonomous system 160. User device 3 124, user device 5 126, and user device N 128, and MS Lync presence server 102 are part of a third autonomous network 161.

PAIF device 108 receives and aggregates presence information corresponding to different user identifiers for the same user, e.g., user A, corresponding to different domains in different autonomous systems. The PAIF device 108 receives presence information to be aggregated via different interfaces, e.g., a XMPP interface via link 132, a SIP IMS interface via link 134, and a SIP/CTI interface via link 136. The PAIF device 108 generates a set of aggregated presence information from the received presence information and puts it in a first format, e.g., a format compatible to the MS Lync presence server 102. The MS Lync presence server 102 receives presence information from devices with a MS Lync interface, e.g., PAIF device 138, device 3 124, device 126, and device N 128. The MS Lync presence server 102 aggregates presence information received from PAIF device 108 and device 3 124, which correspond to the same user, e.g., user A. The MS Lync presence server performs format conversion of aggregated presence information. The MS Lync Presence server 102 communicates aggregated presence information to other devices in the communications environment 100, e.g., which have registered to receive updated presence information or have requested presence information, e.g., corresponding to a particular user identifier.

User A, user B, and user N use the MS Lync presence server 102 for presence and address book services, while user C uses the Cisco Jabber including the Cisco presence server 116 for presence and address book services. User A uses device 1 118 with gtalk communications, device 2 120 with mobile cellular network communications, device 3 124 with MS Lync communications, and device 4 122, e.g., a desk phone with Internet packet based phone communications, for communications. The PAIF device 108 updates the presence state based on activity on user A's various identities, e.g., corresponding to devices 118, 120, 122. The MS Lync server 102 aggregates status information corresponding to device 3 124 with the status information communicated from PAIF device 108. The MS Lync Presence server 102 sends updated presence states to all the watchers, e.g., devices which have previously registered to receive status updates corresponding to user A. For example, consider that user B and user C are watching user A, then Lync presence server 102 will send the updated presence state pertaining to user A, to user B, e.g., device 126 and to user C, e.g., device 130. In this example, user C is in a different domain, and federation interface 150 is used to send the updated status.

In the exemplary communications environment 100, there are two levels of aggregation for presence information corresponding to user A, e.g., a first level performed by PAIF device 108 and a second level performed by MS Lync presence server 102. In some embodiments, the MS Lync presence server 102 in unaware that the presence information being communicated from PAIF device 108 to the MS Lync presence server is aggregated presence information corresponding to different user devices in different domains of different autonomous networks.

Figure 10:
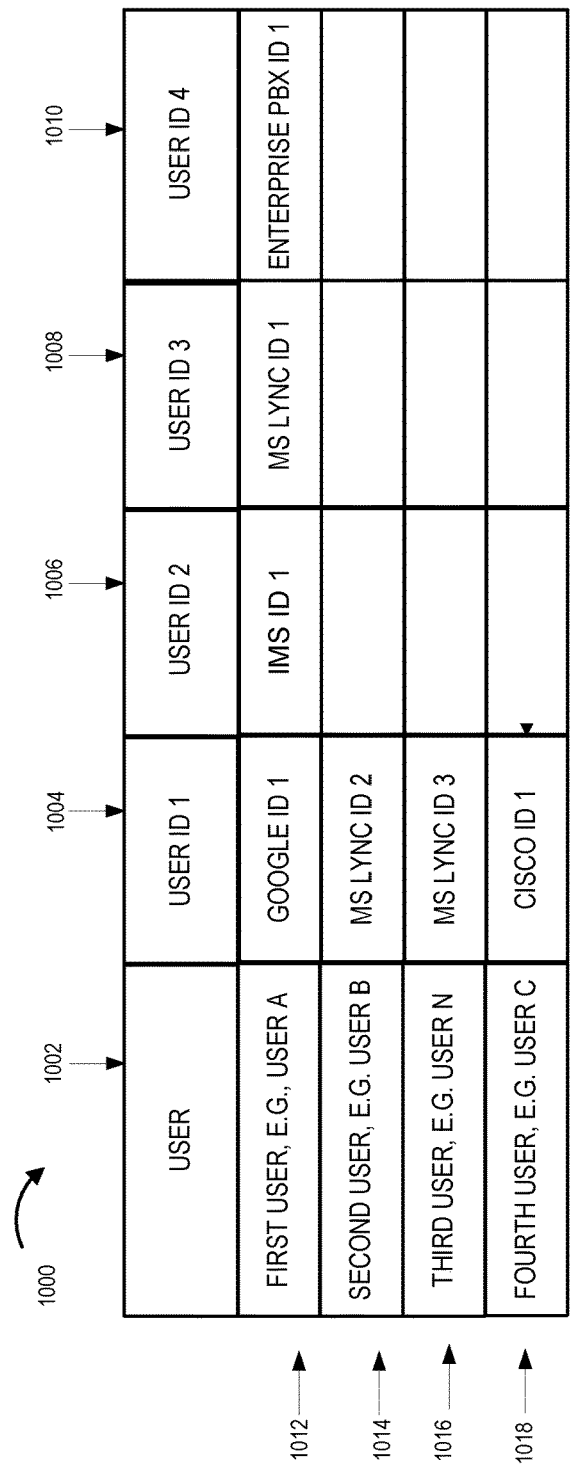
FIG. 10 illustrates an exemplary table 1000 which correlates users with user IDs.

FIG. 2, comprising the combination of FIG. 2A and FIG. 2B, is a flowchart 200 of an exemplary method of providing presence information in a communications environment including multiple autonomous systems, e.g., communications environment 100 of FIG. 1, in accordance with an exemplary embodiment. Operation starts in step 202 and proceeds to step 204, in which the system is initialized. During the initialization step, the user identities corresponding to each user are stored in memory, e.g., the user identifiers corresponding to the first user are associated in memory accessible to the PAIF device, e.g., PAIF memory 322, as corresponding to the first user. The stored user identities are then available for later use in the process for example during the aggregation of presence information for a user based on the user ids associated with the user. FIG. 10 provides an exemplary table 1000 generated during initiation corresponding to the users shown in FIG. 1 which may be, and in some embodiments is stored in PAIF memory 322. Each of the entries in rows 1012, 1014, 1016 and 1018 contains information associating the user identified in the entries of column 1002 with its known user IDs or aliases wherein the user's user ID 1 is contained in the entries in column 1004, the user's user ID 2 is contained in the entries of 1004, the user's user ID 3 is contained in the entries of column 1008 and the user's user ID 4 is contained in the entries s of column 1010. For example, the first user, e.g., user A (entry column 1002, row 1012) is associated with user ID 1 which is Google ID 1 (entry column 1004, row 1012), user ID 2 which is IMS ID 1 (entry column 1006, row 1012), user ID 3 which is MS Lync ID 1 (entry column 1008, row 1012), and user ID 4 Enterprise PBX ID 1 (entry column 1010, row 1012). The user IDs, e.g., MS Lync ID. 1, MS Lync ID. 2, Google ID 1, IMS ID 1, Enterprise PBX ID 1, and Cisco ID 1 are merely exemplary are merely used for illustrative purposes. Row 1014 of table 1000 associates the second user, e.g., user B (entry column 1002, row 1014) with user ID 1 which is MS Lync ID 2 (entry column 1004, row 1014). Row 1016 of table 1000 associates the third user, e.g., user N (entry column 1002, row 1016) with user ID 1 which is MS Lync ID 3 (entry column 1004, row 1016). Row 1018 of table 1000 associates the fourth user, e.g., user C (entry column 1002, row 1018) with user ID 1 which is Cisco ID 1 (entry column 1004, row 1018).

Operation proceeds from step 204 to step 206, step 208, and step 232, via connecting node A 209.

In step 206, monitoring is performed at a first aggregations element, e.g., PAIF device 108, for presence information. Operation proceeds from step 206 to step 210 and 212. In step 210 first presence information 211, corresponding to a first user identifier of a first user, e.g., user A, indicating a presence state of said first user in a first domain of a first autonomous system, e.g., system 156, is received at the first aggregation element. Returning to step 212, in step 212 second presence information 213, corresponding to a second user identifier of the first user device indicating a presence of state of said first user in a second domain of a second autonomous system, e.g., system 158, is received at the first aggregation element. Operation proceeds from step 210 and step 212 to step 214.

Figure 11:
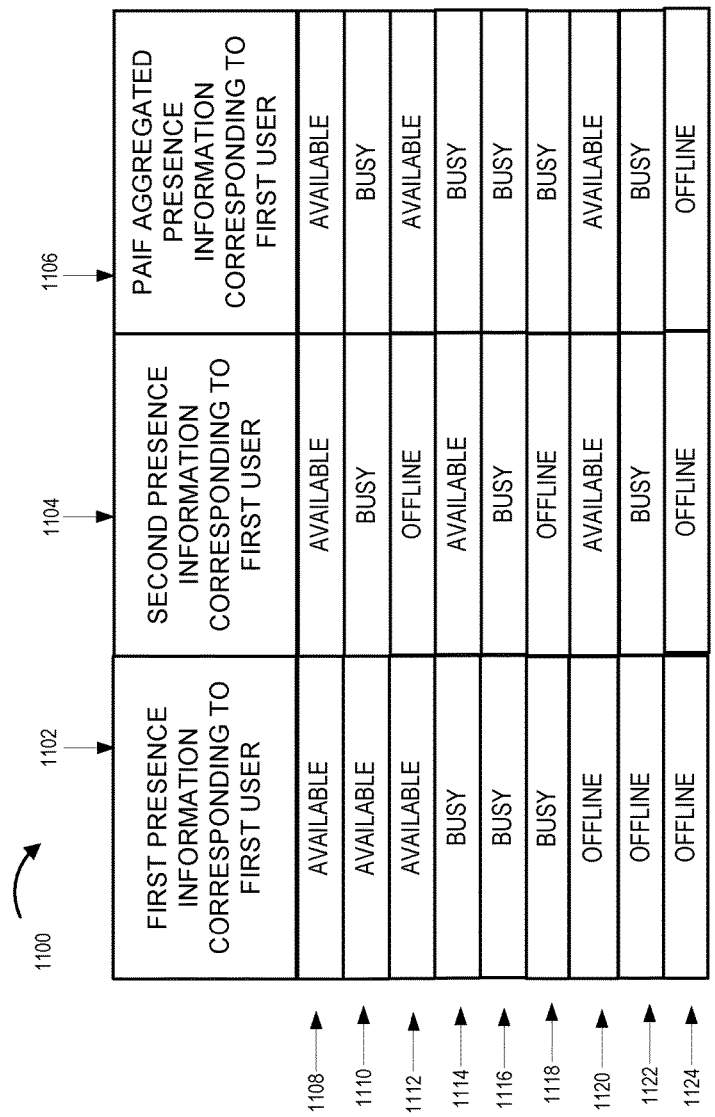
FIG. 11 illustrates an exemplary logic table that is used to generate aggregated presence information in accordance with one embodiment of the present invention.

In step 214 a first set of aggregated presence information is generated at the first aggregation element from the first and second presence information. In some embodiments the first set of aggregated presence information is generated by performing an ORing operation on the first presence information received corresponding to the first user identifier and the second presence information corresponding to a second user identifier of the first user. Table 1100 of FIG. 11 shows an exemplary logic table that illustrates the PAIF aggregated state for a first user based on the first presence information corresponding to a first user identifier of the first user indicating a presence state of said first user in a first domain of a first autonomous system and the second presence information corresponding to the second user identifier of the first user indicating a presence state of said first user in a second domain of a second autonomous system. The presence states used in this example are available, busy and offline. The entries of column 1102 provide the first presence information corresponding to the first user in the first domain of the first autonomous system. The entries of column 1104 provide the second presence information corresponding to the first user in the second domain of the second autonomous system. The entries of column 1106 provide the PAIF aggregated presence information that may be, and in some embodiments is, generated based on the first and second presence information contained in entries in the corresponding row of the table. Rows 1108, 1110, 1112, 1114, 1116, 1118, 1120, 1122, and 1124 associate a first presence information corresponding to a first user, a second presence information corresponding to a first user with the PAIF aggregated presence information generated from the corresponding first and second presence information. For example, if the first presence information received corresponding to the first user is a state of available (entry column 1102, row 1110) and the second presence information received corresponding to the first user is a state of busy (entry column 1104, row 1110) then the PAIF aggregated presence information corresponding to the first user that is generated is a state of busy (entry column 1106, row 1110).

Operation proceeds from step 214 to step 218, and in some embodiments, operation proceeds from step 214 to optional step 216. In step 216, the first set of aggregate presence information is stored in a memory, e.g., memory 117 of FIG. 1 or memory 314 of FIG. 3. In step 218, the first set of aggregated information is processed at the first aggregation element to put the first set of aggregated information in a first format. In some embodiments, the first set of aggregated information in the first format includes an aggregation indicator indicating that the information being communicated is aggregated information. In various embodiments, the first set of aggregated information in the first format is stored in a memory, e.g., memory 117 of FIG. 1 or memory 314 of FIG. 3. Operation proceeds from step 218 to step 220.

In step 220, the first set of aggregated presence information, in the first format, is communicated from the first aggregation element to a first presence server, e.g., MS Lync presence server 102, as presence information corresponding to a third user identifier. Operation proceeds from step 220 to step 222. In step 222, the first set of aggregated presence information, in said first format, as presence information corresponding to the third user identifier, is communicated from the first presence server to a device, e.g., device 3 124, in a third domain of a third autonomous system. In one exemplary embodiment the third device is an MS LYNC device.

In some embodiments, the first set of aggregated presence information is generated by a presence aggregation internetworking function module included in said first aggregation element. In some such embodiments, the first aggregation element is configured to interface between an IMS network and a MS Lync server. In some such embodiments, the first aggregation element is located in a device, e.g., PAIF device 108, positioned between the IMS network, e.g., IMS network 112, and the MS Lync server, e.g., MS Lync server 102. In some such embodiments, the MS Lync server is the first presence server.

In some embodiments, the first aggregation element is located in a device located in the IMS network. In some embodiments, the first aggregation element is located is located in a session border controller which is an edge device positioned at the edge of an IMS network.

Operation proceeds from step 222 to step 226.

Returning to step 208, in step 208 monitoring is performed at the first presence server for presence information. Operation proceeds from step 208 to step 224. In step 224, third presence information 215 corresponding to the third user identifier of the first user indicating a presence state of said first user on a third device, e.g., device 3 124, in a third domain of a third autonomous system is received at the first presence server. Operation proceeds from step 224 to step 226.

Figure 12:
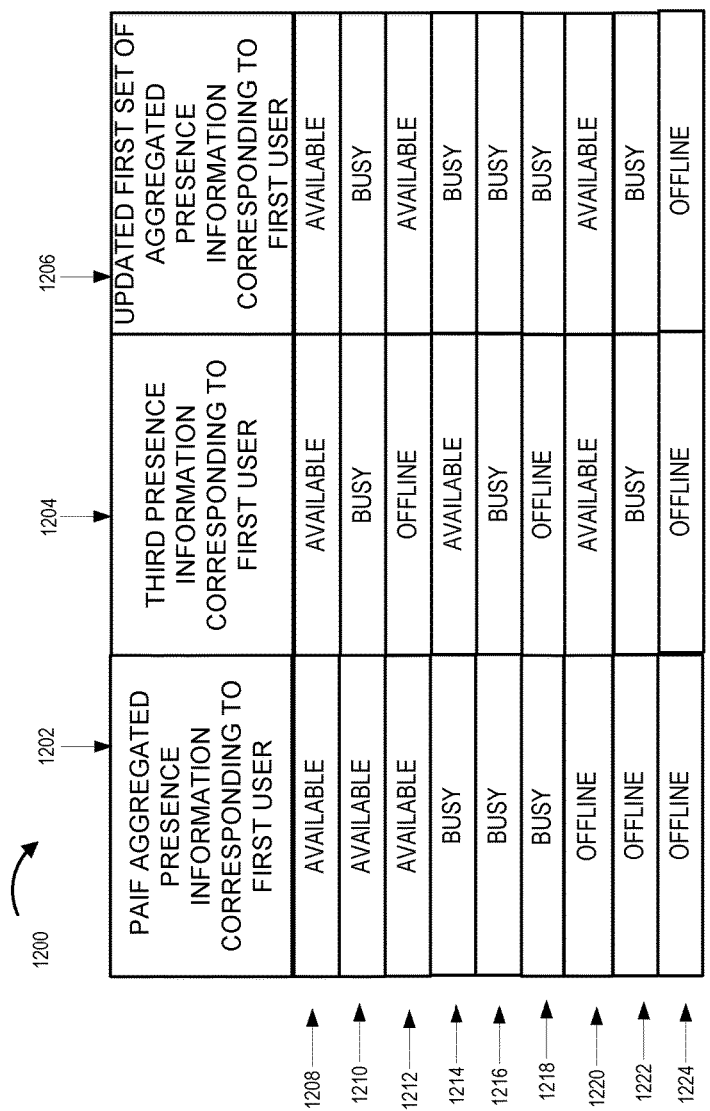
FIG. 12 illustrates an exemplary logic table that is used to generate updated aggregated presence information in accordance with one embodiment of the present invention.

In step 226 an updated first set of aggregated presence information in the first format is generated from the first set of aggregated presence information and the third presence information from said third device. In some embodiments the updated first set of aggregated presence information is generated by performing an ORing operation on the first set of aggregated presence information received corresponding to the third user identifier and the third presence information received from said third device. Table 1200 of FIG. 12 shows an exemplary logic table that illustrates the logic used to generate the updated first set of presence information corresponding to the first user from a first set of PAIF aggregated presence information corresponding to the first user and third presence information corresponding to the first user. The presence states used in this example are available, busy and offline. The entries of column 1202 provide the PAIF aggregated presence information corresponding to the first user. The entries of column 1204 provide the third presence information corresponding to the first user. The entries of column 1206 provide the updated first set of presence corresponding to the first user. The updated first set of presence information corresponding to the first user may be, and in some embodiments is, generated based on the first set of PAIF aggregated presence information and the third presence information corresponding to the first user contained in entries in the corresponding row of the table. Rows 1208, 1210, 1212, 1214, 1216, 1218, 1220, 1222, and 1224 associate PAIF aggregated presence information corresponding to a first user, third presence information corresponding to a first user with the updated first set of aggregated presence information generated from the corresponding PAIF aggregated and third presence information. For example, if the PAIF aggregated presence information received corresponding to the first user is a state of available (entry column 1202, row 1210) and the third presence information received corresponding to the first user is a state of busy (entry column 1204, row 1210) then the updated first set of aggregated presence information corresponding to the first user that is generated is a state of busy (entry column 1206, row 1210).

Operation proceeds from step 226 to step 228. In step 228 said updated first set of aggregated presence information in the first format is communicated to a device in the third domain, e.g., the third device, e.g., device 3 124, or another device in the third domain, e.g., device 5 126 or device N 126. In some embodiments, the first presence server is an MS Lync server, and the third identifier is an MS Lync ID. In some such embodiments, the first set of aggregated presence information is not indicated to be aggregated information. In some such embodiments, the first and second user identifiers are not MS Lync identifiers. Operation proceeds from step 228 via connecting node B 230 to the input of steps 206, 208 and 232.

Returning to step 232, in step 232 a computer telephony interface (CTI) of a call server, e.g., CTI 119 of call server 114, is operated to monitor call activity corresponding to a fourth user identifier. Operation proceeds from step 232 to step 234. In step 234 the computer telephony interface of the call server is operated to generate a fourth presence information based on said monitoring. Operation proceeds from step 234 to step 236. In step 236 fourth presence information 217 corresponding to a fourth user identifier of a first user indicating a presence state of said first user in a fourth domain of a fourth autonomous system, e.g., system 160, is received at the first aggregation element. Operation proceeds from step 236 to step 238. In step 238 an updated first set of aggregated presence information is generated at the first aggregation element from said first, second, and fourth presence information (211, 213, 215, 217).

In some embodiments the updated first set of aggregated presence information is generated in step 238 by performing an ORing operation on the first, second and third presence information received corresponding to the first user. For example, the exemplary logic illustrated in FIG. 11 may be extended to include the fourth presence information as will be understood by one of skill in the art. For example, if the first presence information is busy and the second presence information is available and the third presence information is offline the first set of updated aggregated presence information would be busy.

Operation proceeds from step 238 to step 240. In some embodiments, operation proceeds from step 238 to optional step 239.

Figure 3:
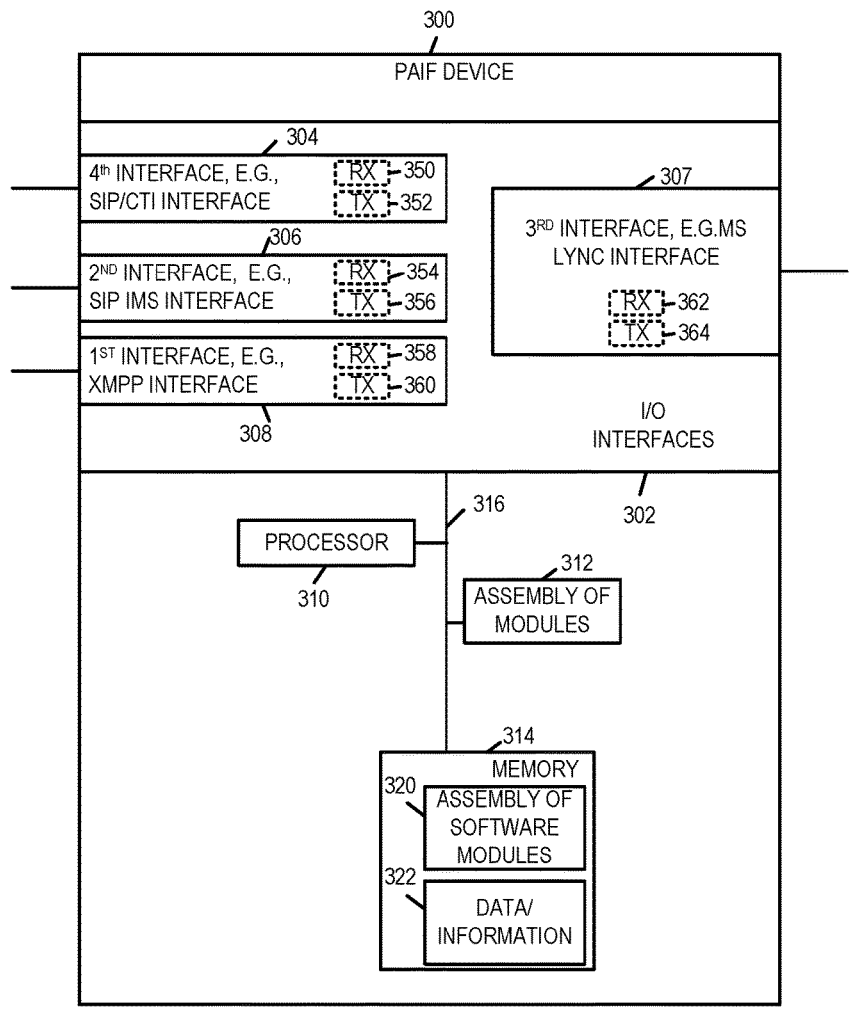
FIG. 3 illustrates an exemplary presence aggregation information interworking function (PAIF) device in accordance with an exemplary embodiment.

In step 239 the updated first set of aggregated presence information is stored in a memory, e.g., memory 117 of FIG. 1 or memory 314 of FIG. 3. In step 240 the updated first set of aggregated presence information is processed at the first aggregation element to put the updated first set of aggregated presence information in a first format. In various embodiments, the updated first set of aggregated information in the first format is stored in a memory, e.g., memory 117 of FIG. 1 or memory 314 of FIG. 3. Operation proceeds from step 240 to step 242.

In step 242 the updated first set of aggregated presence information, in the first format, is communicated from the first aggregation element to the first presence server, as presence information corresponding to the third user identifier. Operation proceeds from step 242 to step 244. In step 244 the updated first set of aggregated presence information, in said first format, as presence information corresponding to the third user identifier is communicated from the first presence server to at least one device which supports the first format and which has expressed an interest in presence information corresponding to the third user identifier, e.g., device 5 126. In some embodiments, the first presence information 211 corresponds to a first device, e.g., device 1 118; the second presence information 213 corresponds to a second device, e.g., device 2 120; the fourth presence information 217 corresponds to a fourth device, e.g., device 4 122; and the first, second and fourth devices correspond to the first user, e.g., user A. In some embodiments, the device which supports said first format and has expressed an interest in presence information corresponding to the third user identifier is a device which registered for presence updates corresponding to the first MS Lync ID or requested presence information for the first MS Lync ID which corresponds to the third user identifier.

In some embodiments, operation proceeds from step 242 to optional step 246. In step 246 the updated first set of aggregated presence information is converted from a first format to a different format used by a device which does not support said first format but which has expressed an interest in presence information corresponding to the third user identifier. In various embodiments, step 242 is performed by the first presence server. In some embodiments, the third presence information 215 includes user state information in an MS Lync format, and said first, second, and fourth domains are domains in which MS Lync is not used to communicate presence information. Operation proceeds from step 246 to step 248. In step 248 the updated first set of aggregated presence information is communicated to at least one device which does not support the first format but supports the converted different format. In various embodiments, step 248 is performed by the first presence server which sends the updated first set of aggregated presence information in the converted format to a device which does not support the first format, e.g., to device C 130. In one example, the communications path from the MS Lync presence server to device C 130 traverses XMPP gateway 104 and Cisco Presence server 116.

Operation proceeds from step 244 and/or step 248, via connecting node B 230 to the inputs of step 206, 208 and 232.

In some embodiments, the first presence information is presence information generated by a Web server, e.g., Web server 109, and the first presence information corresponds to a smart phone, e.g., device 1 118 which is a smart phone.

In some embodiments, the first presence information includes user state information in an XML (eXtensible Markup Language) format, and said first domain is a domain in which XML is used to communicate presence information. In some such embodiments, the XML format is XMPP (eXtensible Messaging and Presence Protocol) format.

In various embodiments, the second user identifier is an IMS ID and the second presence information 213 is information obtained from SIP signaling corresponding to devices using said IMS ID or location signaling corresponding to devices using said IMS ID, e.g. device 2 120. In some such embodiments, in step 215 the first set of aggregated presence information is stored in a home subscriber server memory, e.g., memory 117, corresponding to said IMS ID. In some other embodiments, the first set of aggregated presence information is stored in memory within the first aggregation element, e.g., memory 314 in device 300, which may be PAIF device 108.

In some embodiments, the second presence information 213 includes SIP session information from a call server control entity, e.g., a S-CSCF, e.g., S-CSCF 113.

In various embodiments, the first and second presence information (211, 213) each include one or more of the following: user registration status; user in call status or IDLE status; user location; access network capability information; and user device capability information, e.g., device audio and/or device video capability information.

In one exemplary embodiment, the communications environment is communications environment 100 of FIG. 1; the first aggregation element is PAIF device 108; the first presence server is MS Lync presence server 102; the first device is user A's PC/smart phone 118 including Google login; the second device is user A's mobile 120 having an IMS ID; the third device is user A's PC/smartphone 124 including Lync login; and the third device is user A's desk phone 122; the first autonomous system is system 156; the second autonomous system is system 158; the fourth autonomous system is system 160; the third autonomous system is a system including device 3 124, device 5 126, device N 128, and MS Lync presence server 102.

FIG. 3 is a drawing of an exemplary PAIF device 300 in accordance with an exemplary embodiment. Exemplary PAIF device 300 is, e.g., PAIF device 108 of FIG. 1. Exemplary PAIF device 300 includes I/O interfaces 302, a processor 310 an assembly of modules 312, and memory 314, coupled together via a bus 316 over which the various elements may interchange data and information. I/O interfaces 302 includes a plurality of interfaces including a first interface 308, e.g., a XMPP interface, a second interface 306, e.g., a SIP IMS interface 306, a third interface 307, e.g., a MS Lync interface, and a fourth interface 308, e.g., a SIP/CTI interface. Memory 314 includes an assembly of software modules 320 and data/information 322. In some embodiments, the first interface 308 includes a receiver 358 and a transmitter 360. In some embodiments, the second interface 306 includes a receiver 354 and a transmitter 356. In some embodiments, the third interface 307 includes a receiver 362 and a transmitter 364. In some embodiments, the fourth interface 304 includes a receiver 350 and a transmitter 352.

First interface 308, e.g., a XMPP interface, is configured to receive first presence information corresponding to a first user identifier of a first user indicating a presence state of said first user in a first domain of a first autonomous system. Second interface 306, e.g., a SIP IMS interface, is configured to receive second presence information corresponding to a second user identifier of the first user indicating a presence state of said first user in a second domain of a second autonomous system. In various embodiments, the first and second user identifiers are not MS Lync identifiers. Fourth interface 308, e.g., a SIP/CTI interface, is configured to receive fourth presence information corresponding to a fourth user identifier of the first user indicating a presence state of said first user in a fourth domain of a fourth autonomous system. In various embodiments, the fourth user identifier is not an MS Lync identifier.

Third interface 307, e.g., a MS Lync interface, is configured to communicate, e.g., transmit, a set of aggregated presence information, in a first format, to a presence server. For example, third interface 307 is configured to communicate a first set of aggregated presence information, in a first format to a first presence server, as presence information corresponding to a third user identifier. In some embodiments, the first presence server is an MS Lync server, e.g., MS Lync Presence server 102, and the third identifier is an MS Lync ID.

Third interface 307, e.g., a MS Lync interface, is further configured to communicate an updated first set of aggregated presence information, in the first format, to the first presence server, as presence information corresponding to the third user identifier.

In some embodiments, PAIF device 300 is configured to interface between an IMS network, and a MS Lync server. In some such embodiments, the PAIF device 300 is positioned between the IMS network and the MS Lync server. For example PAIF device 108, which may be PAIF device 300, is located between IMS network 158 and MS Lync Presence server 102. In some embodiments the PAIF device is located in the IMS network. In some embodiments, the PAIF device is located in a border session controller which is an edge device positioned at the edge of the IMS network.

Figure 4:
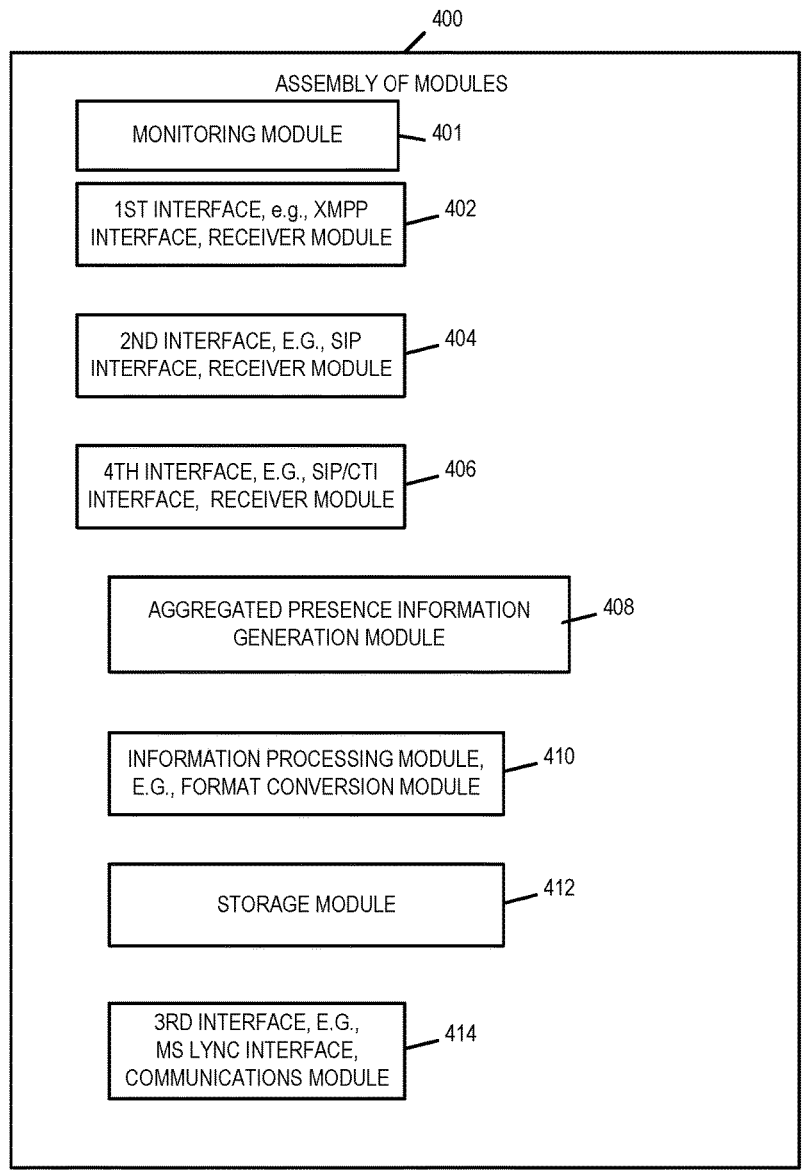
FIG. 4 illustrates an exemplary assembly of modules which may be included in a PAIF device in accordance with an exemplary embodiment.

FIG. 4 is a drawing of assembly of modules 400 which may be, and in some embodiments is, included in exemplary PAIF device 300 illustrated in FIG. 3. The modules in the assembly of modules 400 may, and in some embodiments are, implemented fully in hardware within the processor 310, e.g., as individual circuits. The modules in the assembly of modules 400 may, and in some embodiments are, implemented fully in hardware within the assembly of modules 312, e.g., as individual circuits corresponding to the different modules. In other embodiments some of the modules are implemented, e.g., as circuits, within the processor 310 with other modules being implemented, e.g., as circuits within assembly of modules 312 and/or within I/O interfaces 202, external to and coupled to the processor 310. As should be appreciated the level of integration of modules on the processor and/or with some modules being external to the processor may be one of design choice.

Alternatively, rather than being implemented as circuits, all or some of the modules included in assembly of modules 400 may be implemented in software and stored in the memory 314 of the PAIF device 300, with the modules controlling operation of PAIF device 300 to implement the functions corresponding to the modules when the modules are executed by a processor, e.g., processor 310. In some such embodiments, the assembly of modules 400 is included in the memory 314 as assembly of modules 320. In still other embodiments, various modules in assembly of modules 400 are implemented as a combination of hardware and software, e.g., with another circuit external to the processor providing input to the processor 310 which then under software control operates to perform a portion of a module's function. While shown in the FIG. 3 embodiment as a single processor, e.g., computer, it should be appreciated that the processor 310 may be implemented as one or more processors, e.g., computers.

When implemented in software the modules include code, which when executed by the processor 310, configure the processor 310 to implement the function corresponding to the module. In embodiments where the assembly of modules 400 is stored in the memory 314, the memory 314 is a computer program product comprising a computer readable medium comprising code, e.g., individual code for each module, for causing at least one computer, e.g., processor 310, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the PAIF device 300 or elements therein such as the processor 310, to perform functions of corresponding steps illustrated in the method flowchart 200 of FIG. 2. Thus the assembly of modules 400 includes various modules that perform functions of corresponding steps of the method shown in FIG. 2.

Assembly of modules 400 includes a monitoring module 401, a first interface receiver module 402, a second interface receiver module 404, a fourth interface receiver module 406, an aggregated presence information generation module 408, an information processing module 410, a storage module 412, and a third interface communications module 414. Monitoring module 401 is configured to monitor for presence information, e.g., presence information being received via first interface 308, second interface 306, and fourth interface 304.

First interface receiver module 402, e.g., a receiver module configured to receive signals via first interface 308, e.g., a XMPP interface, is configured to receive first presence information corresponding to a first user identifier of a first user indicating a presence state of said first user in a first domain of a first autonomous system. Second interface receiver module 404, e.g., a receiver module configured to receive signals via a second interface 306, e.g., a SIP IMS interface, is configured to receive second presence information corresponding to a second user identifier of the first user indicating a presence state of said first user in a second domain of a second autonomous system. Fourth interface receiver module 406, e.g., a receiver module configured to receive signals via a fourth interface 304, e.g., a SIP/CTI interface, is configured to receive fourth presence information corresponding to a fourth user identifier of the first user indicating a presence of state of said first user in a fourth domain of a fourth autonomous system.

Aggregated presence information generation module 408 is configured to generate from received presence information, a set of aggregated presence information. For example, aggregated presence information generation module 408 is configured to generate from first and second presence information a first set of aggregated presence information. In some such embodiments, the first set of aggregated presence information is not indicated to be aggregated information. In some such embodiments, the first and second user identifiers are not MS Lync identifiers. As another example, aggregated presence information generation module 408 is further configured to generate from first, second and fourth presence information an updated first set of aggregated presence information. In some such embodiments, the updated first set of aggregated presence information is not indicated to be aggregated information. In some such embodiments, the first, second, and fourth user identifiers are not MS Lync identifiers.

Information processing module 410 is configured to process a set of aggregated information to put it in a first format. For example, information processing module 410 is configured to process a first set of aggregated information to put it in a first format. In some embodiments, the first format is a format used in MS Lync communications. In some embodiments, the first set of aggregated information in the first format includes an aggregation indicator indicating that the information being communicated is aggregated information. As another example, the information processing module 410 is configured to process an updated first set of aggregated information to put in a first format.

Storage module 412 is configured to store a generated set of aggregated information and a processed set of generated aggregated information, e.g., within data/information 322 of memory 314 of PAIF device 300.

Third interface communications module 414, e.g., a MS Lync communication module, is configured to communicate, e.g., transmit, via third interface 307, e.g., a MS Lync interface, a set of aggregated presence information in a first format to a presence server. For example, third interface communications module 414 is configured to communicate a first set of aggregated presence information in a first format to a first presence server, as presence information corresponding to third user identifier.

Figure 5:
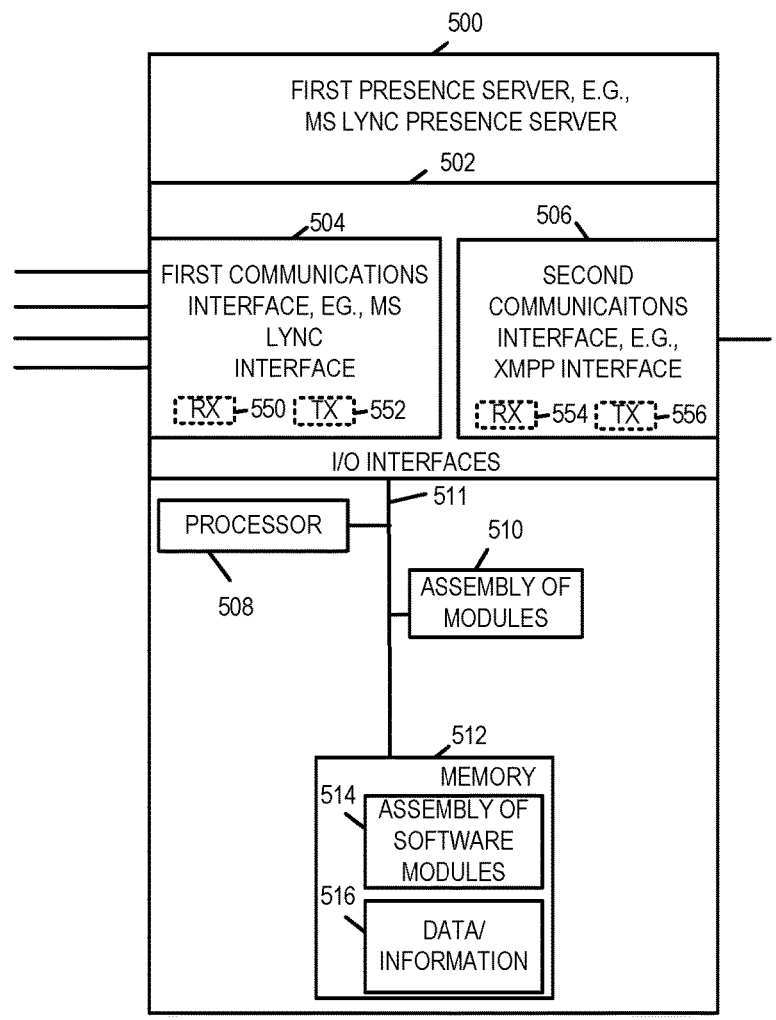
FIG. 5 illustrates an exemplary first presence server, e.g., a MS Lync presence server, in accordance with an exemplary embodiment.

FIG. 5 is a drawing of an exemplary first presence server 500, e.g., a MS Lync presence server, in accordance with an exemplary embodiment. Exemplary first presence server 500 is, e.g., MS Lync presence server 102 of FIG. 1. Exemplary first presence server 500 includes I/O interfaces 502, a processor 508, an assembly of modules 510, e.g., an assembly of circuits, and memory 512, coupled together via a bus 511 over which the various elements may interchange data and information. I/O interfaces 502 includes a plurality of interfaces including a first communications interface 504, e.g., a MS Lync interface, and a second communications interface 506, e.g., an XMPP interface 506. In some embodiments, the first communications interface 504 includes a receiver 550 and a transmitter 552. In some embodiments, the second communications interface 506 includes a receiver 554 and a transmitter 556. Memory 512 includes an assembly of software modules 514 and data/information 516.

Exemplary first communications interface 504, e.g., a MS Lync interface, couples the first presence server 500 to a plurality of devices which support communications using a first format. For example, first communications interface 504 in MS Lync presence server 102 coupled the MS Lync presence server to PAIF device 108 via link 138, to device 3 124 via link 144, to device 5 126 via link 146, and to device N 128 via link 148.

First communications interface 504 is configured to communicate, e.g., transmit, from the first presence server 500 a set of aggregated presence information in a first format. For example, first communications interface 504 is configured to communicate, e.g., transmit, from said first presence server 500 a first set of aggregated presence information in a first format, as presence information corresponding to a third user identifier to a device in a third domain of a third autonomous system. The device in a third domain of a third autonomous system is, e.g., a MS Lnyc device. In one example, the device in a third domain of a third autonomous system is device 3 124 of FIG. 1. For example, MS Lync presence server 102 transmits a set of aggregated presence information corresponding to user A via first communications interface 504 over link 144 to device 3 124.

First communications interface 504 is further configured to receive third presence information corresponding to a third user identifier of a first user device indicating presence state of said first user on a third device in said third domain of a third autonomous system. For example, MS Lync presence server 102 receives, via first communications interface 504, third presence information sent from device 3 124 over link 144. In some embodiments, the first presence server 500 is an MS Lync server, and the third user identifier is an MS Lync ID.

First communications interface 504 is further configured to receive a first set of aggregated presence information, e.g., from a PAIF device. In some embodiments, the first set of aggregated presence information is generated by a presence aggregation interworking function module included in an aggregation element, e.g., a PAIF device. First communications interface 504 is further configured to receive an updated first set of aggregated presence information, e.g., from the PAIF device.

First communications interface 504 is further configured to communicate, e.g., transmit, an updated first set of aggregated presence information in a first format to a device in the third domain. For example, an updated set of aggregated information is communicated, e.g., transmitted, via the first communications interface 504 of MS Lync presence server 102 to device 3 124, device 5 126, and/or device N 126.

Second communications interface 506, e.g., an XMPP interface, couples the first presence server 500 to a device communicating using a different format than the first format. For example, MS Lync presence server 102, which may be the first presence server 500, is coupled via second communications interface 506, e.g., an XMPP interface, to XMPP gateway 104.

Figure 6:
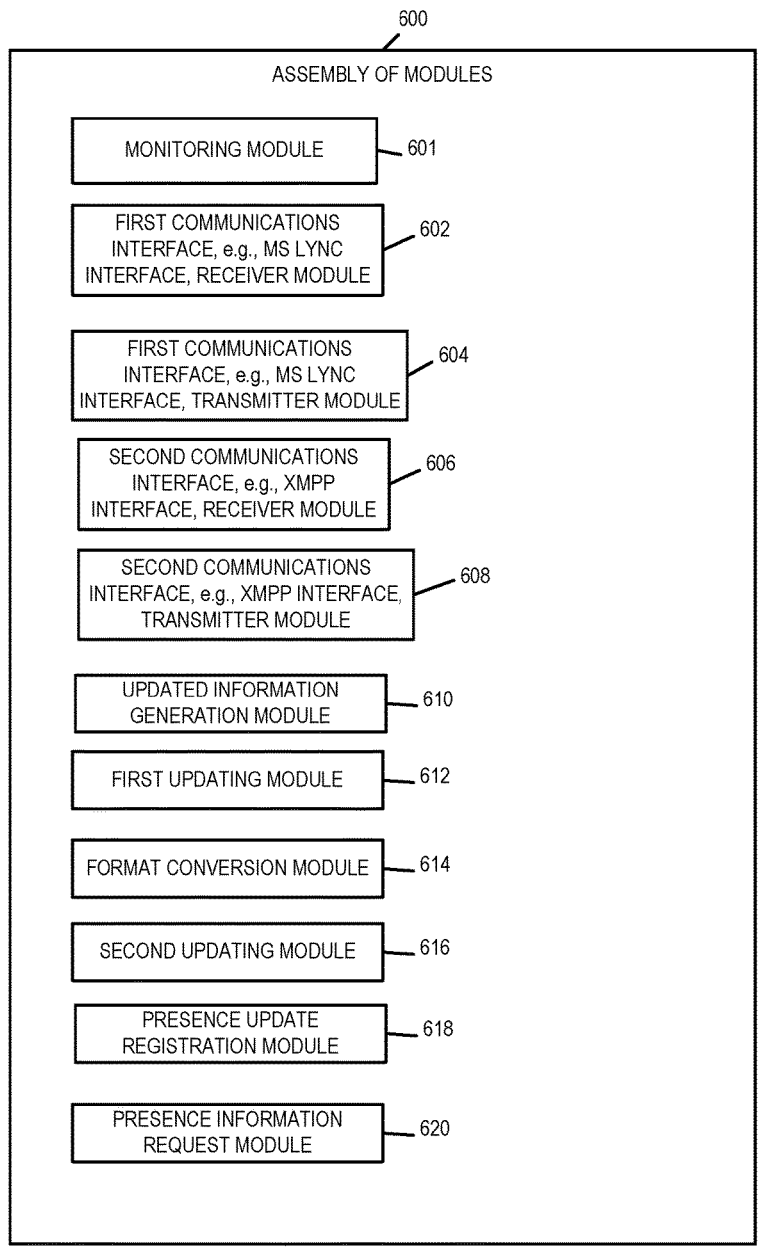
FIG. 6 illustrates an exemplary assembly of modules which may be included in a first presence server, e.g., a MS Lync server, in accordance with an exemplary embodiment.

FIG. 6 is a drawing of assembly of modules 600, which can be, and in some embodiments is, included in the exemplary first presence server 500, e.g., a MS Lync presence server, illustrated in FIG. 5. The modules in the assembly of modules 600 can, and in some embodiments are, implemented fully in hardware within the processor 508, e.g., as individual circuits. The modules in the assembly of modules 600 can, and in some embodiments are, implemented fully in hardware within the assembly of modules 510, e.g., as individual circuits corresponding to the different modules. In other embodiments some of the modules are implemented, e.g., as circuits, within the processor 508 with other modules being implemented, e.g., as circuits within assembly of modules 510 and/or within I/O interfaces 502, external to and coupled to the processor. As should be appreciated the level of integration of modules on the processor and/or with some modules being external to the processor may be one of design choice.

Alternatively, rather than being implemented as circuits, all or some of the modules including in assembly of modules 600 may be implemented in software and stored in the memory 512 of the first presence server 500, with the modules controlling operation of first presence server 500 to implement the functions corresponding to the modules when the modules are executed by a processor, e.g., processor 508. In some such embodiments, the assembly of modules 600 is included in the memory 512 as assembly of modules 514. In still other embodiments, various modules in assembly of modules 600 are implemented as a combination of hardware and software, e.g., with another circuit external to the processor providing input to the processor 508 which then under software control operates to perform a portion of a module's function. While shown in the FIG. 5 embodiment as a single processor, e.g., computer, it should be appreciated that the processor 508 may be implemented as one or more processors, e.g., computers.

When implemented in software the modules include code, which when executed by the processor 508, configure the processor 508 to implement the function corresponding to the module. In embodiments where the assembly of modules 600 is stored in the memory 512, the memory 512 is a computer program product comprising a computer readable medium comprising code, e.g., individual code for each module, for causing at least one computer, e.g., processor 508, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the first presence server 500 or elements therein such as the processor 508, to perform functions of corresponding steps illustrated in the method flowchart 200 of FIG. 2. Thus the assembly of modules 600 includes various modules that perform functions of corresponding steps of the method shown in FIG. 2.

Assembly of modules 600 includes a monitoring module 601, a first communications interface, e.g., MS Lync interface, receiver module 602, a first communications interface, e.g., MS Lync interface, transmitter module 604, a second interface, e.g., a XMPP interface, receiver module 606, a second interface, e.g., a XMPP interface, transmitter module 608, an update information generation module 610, a first updating module 612, a format conversion module 614, a second updating module 616, a presence update registration module 618, and a presence information request module 620. Monitoring module 601 is configured to monitor for presence information, e.g., presence information being received via first communications interface 504.

First communications interface receiver module 602 is configured to receive, via first communication interface 504, a set of aggregated presence information corresponding to a first user from a PAIF device, and presence information corresponding to the first user from one or more additional user devices. For example, the first communications interface receiver is configured to receive third presence information corresponding to the third user identifier of the first user indicating a presence state of the first user on a third device in said third domain of said third autonomous system.

First communications interface transmitter module 604 is configured to transmit, via the first communications interface 504, a first set of aggregated presence information in said first format, as presence information corresponding to the third user identifier to a device in a third domain of a third autonomous system. In one example, in which the first presence server 500 is MS Lync server 102, the device in the third domain of a third autonomous system is, e.g., device 3 124, which is an MS LYNC device. First communications interface transmitter module 604 is further configured to transmit, via the first communications interface 504, an updated first set of aggregated presence information in said first format, as presence information corresponding to the third user identifier to a device in a third domain of a third autonomous system. In one example, in which the first presence server 500 is MS Lync server 102, the device in the third domain of a third autonomous system is, e.g., device 3 124 or another device in the third domain, e.g., device 5 126, which is an MS LYNC device.

Second communications interface receiver module 606 is configured to receive, via second communication interface 506 signals including, e.g. presence information, a request to register to receive presence updates, a request for presence information, etc.

First communications interface transmitter module 608 is configured to transmit, via the second communications interface 506, aggregated presence information corresponding to user, e.g., an updated first set of presence information to a device which does not support the first format.

Updated information generation module 610 is configured to generate from a first set of aggregated presence information and third presence information from a third device an updated first set of aggregated presence information in the first format.

First updating module 612 is configured to control the first presence server to communicate, via said first communications interface, said updated first set of aggregated presence information, in said first format as presence information corresponding to the third user identifier, to at least one device which supports said first format and has expressed an interest in presence information corresponding to the third user identifier. A device may have expressed an interest by registering for presence updates corresponding to the first MS Lync ID or requested information for the first MS Lync ID which corresponds to the third user identifier.

Format conversion module 614 is configured to convert an updated first set of aggregated presence information from the first format to a different format used by a device which does not support the first format but has expressed an interest in presence information corresponding to the third user identifier.

Second updating module 616 is configured to control the first presence server to communicate, via a second communications interface, said updated first set of aggregated presence information to a device which does not support the first format.

Presence update registration module 618 is configured to receive and process requests from devices expressing an interest in presence information corresponding to a user ID, e.g., the third user identifier corresponding to the first user. A part of processing a request, a requesting device may be, and sometimes is, registered to receive updated presence information, e.g., on an ongoing basis as updates become available. As part of the registration, information is stored in a registration record as to the format in which the presence information is to be communicated, e.g., a first format, or a different format.

Presence information request module 620 is configured to receive and process requests from devices expressing an interest in presence information corresponding to a user ID, e.g., the third user identifier corresponding to the first user. In response to a request, a requesting device may be, and sometimes is, sent updated presence information.

In some embodiments, said first presence information corresponds to a first device, said second presence information corresponds to a second device and said fourth presence information corresponds to a fourth device, said first, second and fourth devices corresponding to the first user. In some embodiments, said third presence information includes user state information in an MS Lync format, said first, second and fourth domains being domains in which MS Lync is not used to communicate presence information.

In some embodiments, said first presence information is presence information generated by a Web server and wherein said first presence information corresponds to a smart phone. In some embodiments, said first presence information includes user state information in a XML (eXtensible Markup Language) format, said first domain being a domain in which XML is used to communicate presence information. In some embodiments, the XML format is XMPP (Extensible Messaging and Presence Protocol) format. In some embodiments, said second user identifier is an IMS ID; and the second presence information is information obtained from SIP signaling corresponding to devices using said IMS ID or location signaling corresponding to devices using said IMS ID. In some embodiments, the second presence information includes SIP session information from a call server control entity (e.g., S-CSCF).

In various embodiments, the first and second presence information each include one or more of the following: user registration status; user in call status or IDLE status; user location; access network capability information; and user device capability information, e.g., device audio and/or video capability information.

Various aspects and/or features or some embodiments, are further described below.

Figure 7:
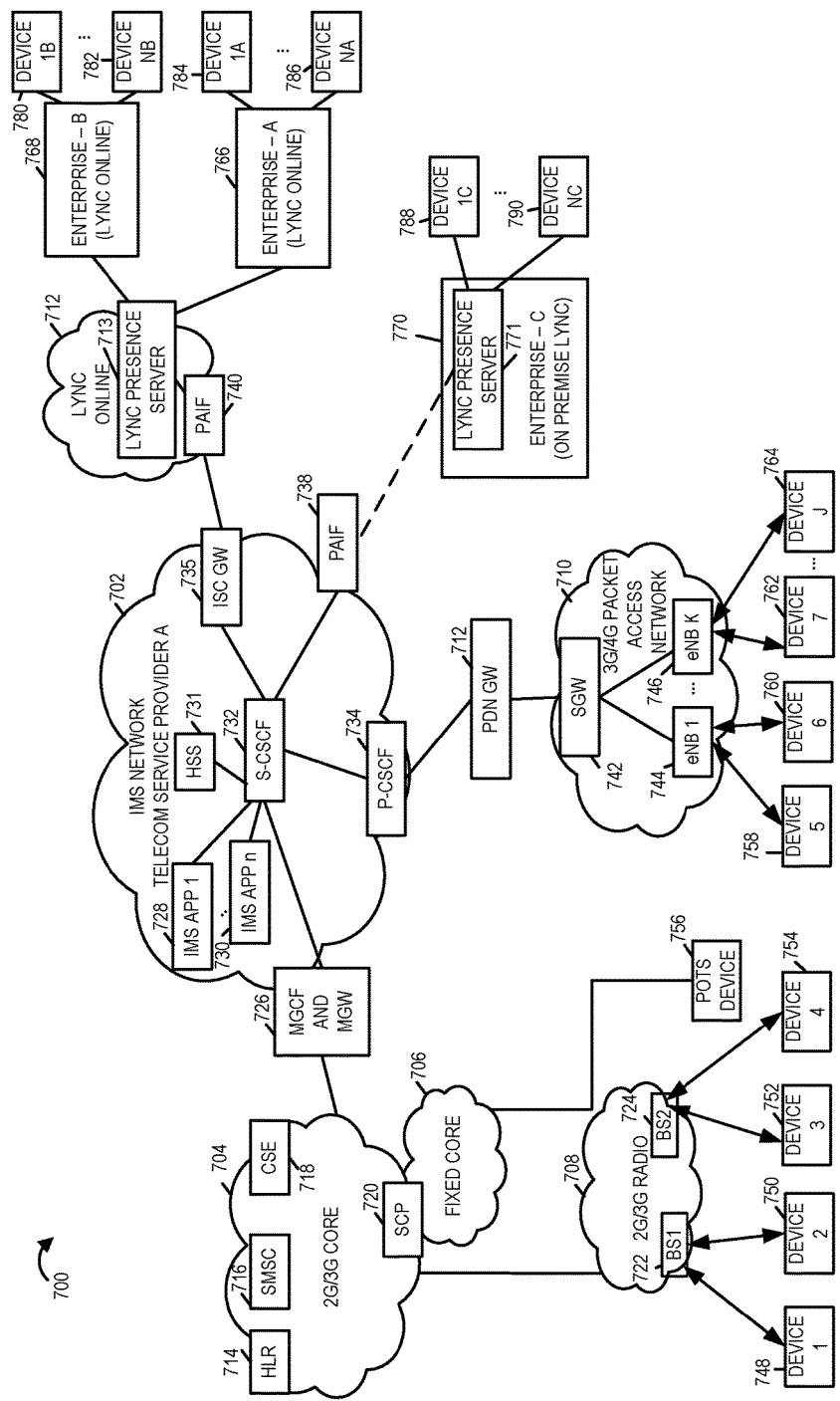
FIG. 7 illustrates an exemplary communications environment in accordance with one embodiment of the present invention.

FIG. 7 illustrates an exemplary communications environment 700 including a fixed core network 706, a 2G/3G radio network 708, a 2G/3G core network 704, a 3G/4G packet access network 710, an IMS network 702 corresponding to Telecom service provider A, a Lync online cloud 712, a first Enterprise PBX using Lync online, Enterprise A 766, a second Enterprise PBX using Lync online, Enterprise B 768, and a third Enterprise PBX using on premises Lync, Enterprise C 770.

A plain old telephone service (POTS) device 756 is connected to the fixed core network 706. The 2G/3G radio network 708 includes a plurality of base stations including exemplary base station 1 (BS 1) and base station 2 (BS 2). User device 1 748 and user device 2 750 are coupled to BS 1 722 via wireless links. User device 3 752 and user device 4 754 are coupled to BS 2 724 via wireless links. The 2G/3G core network 704 is coupled to the 2G/3G radio network 708. The 2G/3G core network includes a home location register (HLR) 714, a short message service center (SMSC) 716, circuit switched equipment (CSE) 718 and a service control point (SCP) 720. The SCP 720 interfaces the fixed core network 706 to the 2G/3G core network 704.

The 3G/4G packet access network 710 includes a plurality of eNode B devices (eNB 1 744, . . . , eNB K 746). User device 5 758 and user device 6 760 are coupled to eNB 1 744. User device 7 762 and user device J 764 are coupled to eNB K 746. The eNodeB devices (eNB 1 744, . . . , eNB K 746) are coupled to a serving gateway (SGW) 742.

IMS network 702 includes a plurality of IMS Application servers (IMS APP 1 728, . . . , IMS APP n 730), a media gateway control function and media gateway (MGCF and MGW) device 726, a serving call session control function (S-CSCF) device 732, a home subscriber server (HSS) 731, a proxy call session control function (P-CSCF) device 734, an IMS service control gateway (ISC GW) 735, and a Presence Aggregation Information Interworking Function PAIF device 738. HSS 731, IMS APP 1 728, IMS APP n 730, MCGF and MGW device 726, a P-CSCF device 734, a ISC GW 735, and PAIF device 738, are coupled to the S-CSCF 732.

MGCF and MGW device 726 couples the IMS network 702 to the 2G/3G core network 704. P-CSCF 734 is coupled to a packet data network gateway (PDN GW) 712, which is coupled to the SGW 742 of 3G/4G packet access network 710. ISC GW 735 of IMS network 702 is coupled to PAIF device 740 of Lync online cloud 712.

Enterprise C 770 includes a Lync presence server 771, which is coupled to the PAIF device 738 of IMS network 702. A plurality of user devices (user device 1C 788, . . . , user device NC 790) are coupled to Lync Presence server 770 of Enterprise C 770.

A plurality of user devices (user device 1A 784, . . . , user device NA 786) are coupled to Enterprise A 766. A plurality of user devices (user device 1B 780, . . . , user device NB 782) are coupled to Enterprise B 768. Lync Presence server 770 is coupled to PAIF 738.

Lync online cloud 712 includes a PAIF device 740 and a Lync Presence server 713, which are coupled together. Enterprise A 766 and Enterprise B 768 are coupled to Lync presence server 713.

A user may, and sometimes does, have multiple user devices, e.g., different user devices which may be used to access different autonomous systems, e.g., based on device capabilities and/or user subscription. A user may, and sometimes does, have different user IDs corresponding to different systems, e.g., an ID corresponding to a 2G cellular network, an ID corresponding to a 4G packet network, a MS Lync ID, etc.

In one embodiment, the Presence Aggregation and Interworking Function (PAIF) is included in a module positioned between MS Lync and IMS Networks and/or clouds. In the example of FIG. 1, PAIF device 108 is positioned between MS Lync Presence server 102 and IMS network 112. In other embodiments, the Presence Aggregation and Interworking Function is deployed under a MS Lync cloud or as part of an IMS network. In the example, of FIG. 7, PAIF 740 is deployed under Lync cloud 712, e.g., an MS Lync cloud, and PAIF 738 is deployed as part of IMS network 702. When the PAIF is located in the IMS network facing the Lync Enterprises, the IMS operator is able to offer the enhanced presence service to MS Lync subscribers. When the PAIF is located in the MS Lync cloud facing the IMS Operator it enables the MS Lync cloud to expose standard SIP interfaces towards the IMS Operator.

In various embodiments, the IMS network 702, uses the standard IMS procedures as defined by 3GPP and chains in the Presence Aggregation & Interworking Function (738 or 740), as an IMS Application server for the subscriber. Chaining of the PAIF Application server (738 or 740) for a subscriber can be configured in the HSS 731 via 'IFCs—Initial Filter Criteria'. S-CSCF (732)/IMS core chains in the PAIF (738 or 740) (via ISC Gateway 745 in case PAIF 740 is in a different domain) in the following events:

Registration/Deregistration—S-CSCF 732 sends the third party registration/de-registration towards PAIF (738 or 740) when IMS Identity of the user registers or de-registers, Originating call—S-CSCF 732 chains in the PAIF (738 or 740) when IMS Identity of user initiates a call, Terminating call—S-CSCF 732 chains in the PAIF (738 or 740) when an incoming call is received for IMS Identity of user.

In accordance with a feature of various embodiments of the present invention, a Presence Aggregation and Interworking Function (PAIF) module, e.g. in a PAIF device such as PAIF 738 or PAIF 740, is introduced into a communications environment. In various embodiments, a PAIF is responsible for monitoring user activity, aggregating status information corresponding to a user, and communicating aggregated status information. The PAIF monitors user activity corresponding to an IMS ID. This includes monitoring user registration information, monitoring user on call information corresponding to incoming and/or outgoing calls, and monitoring user Idle information. The PAIF aggregates the presence status of the user based on user activity on the user's IMS ID and publishes the aggregated information to a MS Lync system.

Figure 8:
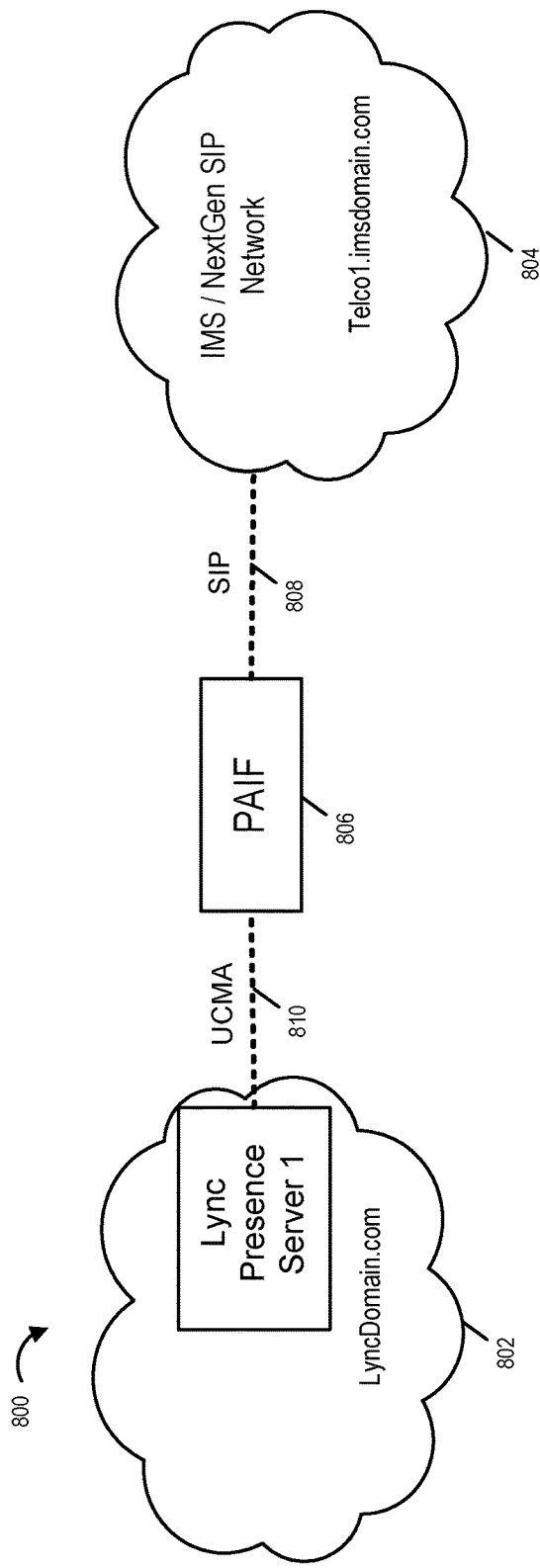
FIG. 8 is a drawing illustrating an exemplary Lync network coupled to an IMS network via a PAIF device.

FIG. 8 is a drawing 800 illustrating an exemplary Lync network 802 in the Lync domain, an exemplary IMS/NextGeneration SIP network 804 in the IMS domain, and a PAIF device 806 which bridges the two domains. The Lync network 802 includes an exemplary Lync presence server 804. SIP signals 808 flows between the IMS network and a first interface of the PAIF device 806. United Communications Managed API (UCMA) signals 810 flow between the Lync Presence server and a second interface of the PAIF device 806.

Exemplary Lync and IMS Presence aggregation procedures are described below. In some embodiments, the PAIF acts as a standard IMS Application Server (AS) relaying the SIP Requests and responses back to a S-CSCF node. The IMS AS may be, and in some embodiments is, a SIP proxy or back to back user agent (B2BUA) transparently relaying Session Description Protocol (SDP) information. The PAIF uses the knowledge of the SIP session corresponding to the IMS ID to establish the user's presence state.

The PAIF learns the location of a device using the user's IMS ID based on one or more of the following:

SIP Signaling headers, e.g., 'P-Access-Network-Info' and GeoLocation header, etc.;

Using interface to location database, e.g., HLR, HSS, etc.

The PAIF learns the User's activity on the user's devices with respect to the user's IMS ID based on one or more of the following:

by being chained in as an IMS AS by IMS core functions for calls and registrations;

by having an interface towards call server serving the User to learn its call activity, for example a CTI interface, or any notification mechanism.

The PAIF learns the user device capability on the user's IMS ID based on one or more of the following:

User and network Policy information stored in a database,

Capabilities of the Access network, which can be learned dynamically using SIP headers, e.g., 'P-Access-Network-Info', Capability of the device, which can be learned dynamically using SIP headers, e.g., 'User-Agent'.

In some embodiments, the PAIF establishes the users presence status based on one or more of the following:

User registration status;

User in call or IDLE;

User location;

Access network capabilities;

User device capability.

In some embodiments, the PAIF uses the open presence specification published by Microsoft, e.g., Microsoft's [MS-PRES]: Presence Protocol, for sharing the presence state of the user. In some embodiments, the PAIF sends a SIP PUBLISH request with pidf+xml payload representing IMS IDs presence state based on user activity.

User not de-Register→send Publish with presence state expired.

User Registered but IDLE→send Publish with presence state Available

User On call—incoming or outgoing calls→send Publish with presence state Busy

In some embodiments, the PAIF will send SIP Publish with IMS ID presence state to a Lync server in following events:

User registers→presence state Available

User de-registers/registration expired→presence state expired

User makes a call→presence state Busy

User receives a call→presence state Busy

User call is over→presence state Available

Table 1700 of FIG. 17 illustrates exemplary presence information which may be, and in some embodiments is, generated for a user ID by a monitoring device based on or derived from activity of a user's device detected by the monitoring device during monitoring of the activity of the user's device such as for example by passively monitoring signals received from the user's device or directed to the user's device passing through the monitoring device. In some such embodiments the monitoring device may be and often is a PRI Gateway, a SBC or a PAIF device. In some embodiments, the monitoring device is an edge device located on the edge of a network. In some embodiments, the monitoring device is a PAIF device incorporated into a PRI Gateway or a SBC. Each of the rows 1706, 1708, 1710, 1712, 1714, 1716, and 1716 contain two entries. The first entry of each of these rows corresponds to column 1702 and contains an activity which may be detected during monitoring of the activity corresponding to a user ID, e.g., an IMS ID, by the PAIF on one of the PAIF's I/O interfaces. The second entry of each of these rows corresponds to column 1704 and contains the corresponding presence information generated by the PAIF for the user ID based on the monitored activity contained in the entry of the first column of the row. The entries of row 1706 indicate that activity of being registered (entry row 1706, column 1702) correlates to a presence information state of available (entry row 1706, column 1704). The entries of row 1708 indicate that activity of making a call (entry row 1708, column 1702) correlates to a presence information state of busy (entry row 1708, column 1704). The entries of row 1710 indicate that activity of receiving a call (entry row 1710, column 1702) correlates to a presence information state of busy (entry row 1710, column 1304). The entries of row 1712 indicate that activity of call over (entry row 1712, column 1702) correlates to a presence information state of available (entry row 1712, column 1704). The entries of row 1714 indicate that activity of not registered (entry row 1714, column 1702) correlates to a presence information state of offline (entry row 1714, column 1704). The entries of row 1716 indicate that activity of detecting a location, e.g., through a SIP message, correlates to presence information indicating the location detected (entry row 1716, column 1704). The entries of row 1718 indicate that activity of detecting a device capability, e.g., through a SIP message, correlates to presence information indicating the device capability detected (entry row 1718, column 1704).

Figure 9:
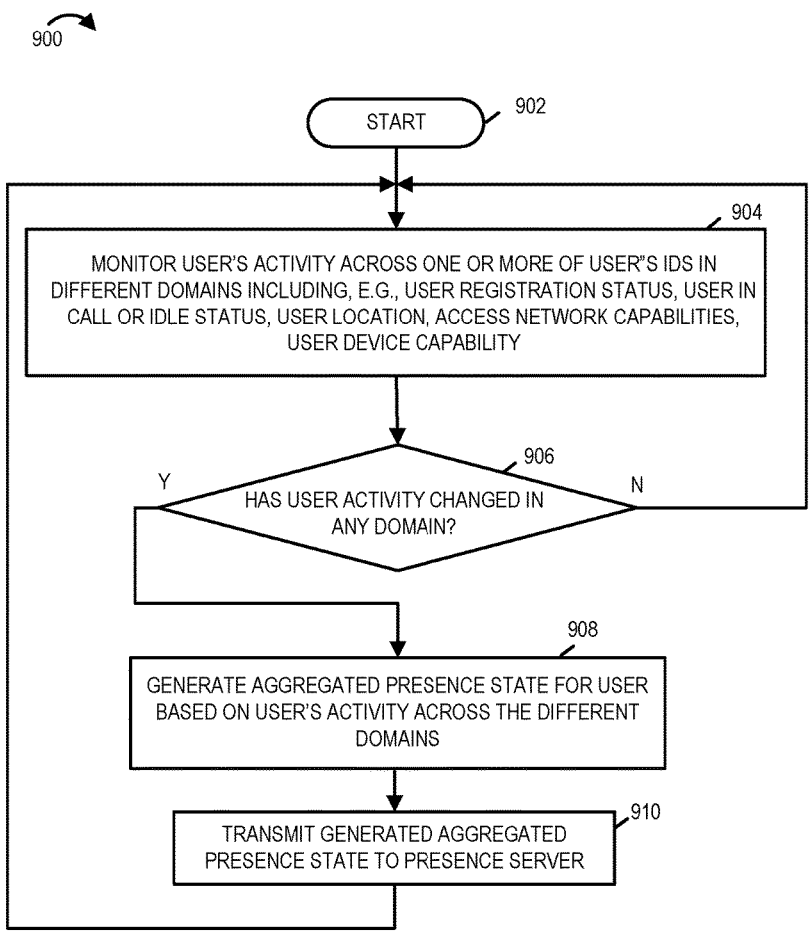
FIG. 9 is a flowchart of an exemplary method of operating a PAIF device in accordance with an exemplary embodiment.

FIG. 9 is a flowchart 900 of an exemplary method of operating a PAIF device in accordance with an exemplary embodiment. Operation starts in step 902 in which the PAIF device is powered on and initialized. Operation proceeds from step 902 to step 904, in which the PAIF device monitors a user's activity across one or more of a user's IDs in different domains, e.g., user registration status, user in call or idle status, user location, access network capabilities, user device capability. Operation proceeds from step 904 to step 906, in which the PAIF device determines if user activity has changed in any domain. If the PAIF determines that user activity has not changed, then operation proceeds from step 906 to step 904, in which the PAIF continues the monitoring. If the PAIF determines that user activity has changed, then operation proceeds from step 906 to step 908. In step 908 the PAIF device generates aggregated presence state for the user based on the user's activity across the different domains. Operation proceeds from step 908 to step 910. In step 910 the PAIF transmits the generated aggregated presence state to the presence server. Operation proceeds from step 910 to step 904 for additional monitoring.

An exemplary method of providing presence information in a communications environment including multiple autonomous systems, in accordance with some embodiments, comprises: receiving, at a first aggregation element, first presence information corresponding to a first user identifier of a first user indicating a presence state of said first user in a first domain of a first autonomous system; receiving, at the first aggregation element, second presence information corresponding to a second user identifier of the first user indicating a presence state of said first user in a second domain of a second autonomous system; generating, at the first aggregation element, from said first and second presence information a first set of aggregated presence information; and communicating from the first aggregation element said first set of aggregated presence information, in a first format, to a first presence server, as presence information corresponding to a third user identifier. In some embodiments, the exemplary method further comprises communicating, from said first presence server, said first set of aggregated presence information, in said first format, as presence information corresponding to the third user identifier, to a device, e.g., a 3rd device which is an MS LYNC device, in a third domain of a third autonomous system. In some such embodiments, the exemplary method further comprises: prior to communicating said first set of aggregated information to said presence server in the first format, processing, at said first aggregation element, said first set of aggregated information to put it in said first format. In some embodiments, said first set of aggregated information in the first format includes an aggregation indicator indicating that the information being communicated is aggregated information.

In some embodiments, the exemplary method includes receiving, at the first presence server, third presence information corresponding to said third user identifier of the first user indicating a presence state of said first user on a third device in said third domain of said third autonomous system; generating from said first set of aggregated presence information and said third presence information from said third device an updated first set of aggregated presence information in the first format; and communicating said updated first set of aggregated presence information, in the first format, to a device in said third domain, e.g., 3rd device or another device in the 3rd domain.

In some embodiments, said first set of aggregated presence information is generated by a presence aggregation internetworking function module included in said first aggregation element. In some such embodiments, said first aggregation element is configured to interface between an IMS network and a MS Lync server.

In some embodiments, said first aggregation element is located in a device positioned between the IMS network and the MS Lync Server; said MS Lync server is said first presence server. In some embodiments, first aggregation element is located in a device located in the IMS network. In some embodiments, said first aggregation element is located in a border session controller which is an edge device positioned at the edge of the IMS network. In some embodiments, the first aggregation element is location in a application server.

In various embodiments, first presence server is an MS LYNC server, and said third identifier is an MS Lync ID. In some such embodiments, said first set of aggregated presence information is not indicated to be aggregated information.

In some embodiments, said first and second user identifiers are not MS LYNC identifiers.

In various embodiments, the exemplary method includes receiving, at the first aggregation element, fourth presence information corresponding to a fourth user identifier of the first user indicating a presence state of said first user in a fourth domain of a fourth autonomous system; generating, at the first aggregation element, from said first, second and fourth presence information an updated first set of aggregated presence information; and communicating said updated first set of aggregated presence information, in the first format, to the first presence server, as presence information corresponding to the third user identifier.

In some embodiments, said first presence information corresponds to a first device, said second presence information corresponds to a second device and said fourth presence information corresponds to a fourth device, said first, second and fourth devices corresponding to the first user; and communicating, from said first presence server, said updated first set of aggregated presence information, in said first format, as presence information corresponding to the third user identifier, to at least one device which supports said first format and has expressed an interest (e.g., registered for presence updates corresponding to the first MS LYNC ID or request presence information for the first MS LYNC ID) in presence information corresponding to the third user identifier. In some such embodiments, the exemplary method further includes converting said updated first set of aggregated presence information from said first format to a different format used by a device which does not support said first format but which has expressed an interest in presence information corresponding to the third user identifier, prior to communicating said updated first set of aggregated presence information to the device which does not support said first format.

In some embodiments, said third presence information includes user state information in an MS Lync format, said first, second and fourth domains being domains in which MS Lync is not used to communicate presence information.

In some embodiments, said first presence information is presence information generated by a Web server and said first presence information corresponds to a smart phone. In some embodiments, first presence information includes user state information in a XML (eXtensible Markup Language) format, said first domain being a domain in which XML is used to communicate presence information. In some such embodiments, the XML format is XMPP (Extensible Messaging and Presence Protocol) format.

In various embodiments, the second user identifier is an IMS ID; and the second presence information is information obtained from SIP signaling corresponding to devices using said IMS ID or location signaling corresponding to devices using said IMS ID.

In various embodiments, the exemplary method includes storing said first set of aggregate presence information in a home subscriber server memory corresponding to said IMS ID. In some embodiments, the second presence information includes SIP session information from a call server control entity, e.g., a S-CSCF.

In some embodiments, said first and second presence information each include one or more of the following: user registration status; user in call status or IDLE status; user location; access network capability information; and user device capability information, e.g., device audio and/or video capability information.

In some embodiments, the exemplary method includes operating a CTI interface of a call server to monitor call activity corresponding to said fourth user identifier; and operating the CTI interface of said call server to generate said fourth presence information based on said monitoring.

An exemplary system, in accordance with some embodiments, includes a presence aggregation and interworking function (PAIF) device and a first presence server. The PAIF device includes a first interface configured to receive first presence information corresponding to a first user identifier of a first user indicating a presence state of said first user in a first domain of a first autonomous system; a second interface configured to receive second presence information corresponding to a second user identifier of the first user indicating a presence state of said first user in a second domain of a second autonomous system; an aggregated presence information generation module configured to generate, from said first and second presence information, a first set of aggregated presence information; and a third interface configured to communicate said first set of aggregated presence information, in a first format, to a first presence server, as presence information corresponding to a third user identifier.

In some embodiments, the first presence server includes: a first communications interface configured to communicate, from said first presence server, said first set of aggregated presence information, in said first format, as presence information corresponding to the third user identifier, to a device, e.g., 3rd device which is an MS LYNC device, in a third domain of a third autonomous system.

In some embodiments, said PAIF device further comprises: an information processing module configured to process said first set of aggregated information to put it in said first format. In some embodiments, said first set of aggregated information in the first format includes an aggregation indicator indicating that the information being communicated is aggregated information.

In some embodiments, the first communication interface in said first presence server is further configured to receive third presence information corresponding to said third user identifier of the first user indicating a presence state of said first user on a third device in said third domain of said third autonomous system. In various embodiments, said first presence server further comprising: an updated information generation module configured to generate, from said first set of aggregated presence information and said third presence information from said third device, an updated first set of aggregated presence information in the first format; and the first communications interface is further configured to communicate said updated first set of aggregated presence information, in the first format, to a device (e.g., 3rd device or another device in 3rd domain) in said third domain.

In some embodiments, first set of aggregated presence information is generated by a presence aggregation internetworking function module included in said aggregation element. In various embodiments, the PAIF device is configured to interface between an IMS network and a MS Lync server. In some such embodiments, the PAIF device is positioned between the IMS network and the MS Lync Server. In some embodiments, the PAIF device is located in the IMS network. In various embodiments, the PAIF device is included in a border session controller which is an edge device positioned at the edge of the IMS network.

In some embodiments, the first presence server is an MS LYNC server, and wherein said third identifier is an MS Lync ID. In some such embodiments, said first set of aggregated presence information is not indicated to be aggregated information.

In various embodiments, the first and second user identifiers are not MS LYNC identifiers. In some such embodiments, the first, second and fourth user identifiers are not MS Lync identifiers; the third user identifier is an MS LYNC identifier, and the first second and fourth user identifier correspond to the same user.

In some embodiments, the PAIF device includes a fourth interface configured to receive fourth presence information corresponding to a fourth user identifier of the first user indicating a presence state of said first user in a fourth domain of a fourth autonomous system. In some such embodiments, said aggregated presence information generation module is further configured to generate from said first, second and fourth presence information an updated first set of aggregated presence information; and the third interface is further configured to communicate said updated first set of aggregated presence information, in the first format, to the first presence server, as presence information corresponding to the third user identifier.

In some embodiments, the first presence information corresponds to a first device, the second presence information corresponds to a second device and said fourth presence information corresponds to a fourth device, said first, second and fourth devices corresponding to the first user. In some such embodiments, the first presence server further comprises: a first updating module which is configured to control the first presence server to communicate, via said first communications interface, said updated first set of aggregated presence information, in said first format, as presence information corresponding to the third user identifier, to at least one device which supports said first format and has expressed an interest (e.g., registered for presence updates corresponding to the first MSLYNC ID or request presence information for the first MS LYNC ID) in presence information corresponding to the third user identifier. In some such embodiments, said first presence server further comprises: a format conversion module configured to convert said updated first set of aggregated presence information from said first format to a different format used by a device which does not support said first format but which has expressed an interest in presence information corresponding to the third user identifier; and a second updating module which is configured to control the first presence server to communicate, via a second communications interface, said updated first set of aggregated presence information to the device which does not support said first format.

In some embodiments, the third presence information includes user state information in an MS Lync format, said first, second and fourth domains being domains in which MS Lync is not used to communicate presence information.

In various embodiments, said first presence information is presence information generated by a Web server and wherein said first presence information corresponds to a smart phone. In some embodiments, said first presence information includes user state information in a XML (eXtensible Markup Language) format, said first domain being a domain in which XML is used to communicate presence information. In some such embodiments, the XML format is XMPP (Extensible Messaging and Presence Protocol) format. In some embodiments, said second user identifier is an IMS ID; and the second presence information is information obtained from SIP signaling corresponding to devices using said IMS ID or location signaling corresponding to devices using said IMS ID.

In some embodiments, the system further includes a home subscriber server including memory for storing said first set of aggregate presence information corresponding to said IMS ID. In some embodiments, the second presence information includes SIP session information from a call server control entity, e.g., a S-CSCF.

In some embodiments, said first and second presence information each include one or more of the following: user registration status; user in call status or IDLE status; user location; access network capability information; and user device capability information, e.g., device audio and/or video capability information.

In some embodiments, the updated aggregated presence information is transmitted from the PAIF device to the first presence server when the updated aggregated presence information associated with the first user generated by the PAIF device is determined by the PAIF device to be different from the prior aggregated presence information generated by the PAIF device for the first user and the updated presence information associated with the first user is not transmitted from the PAIF device to the first presence server when the PAIF device determines that the updated aggregated presence information generated by the PAIF device is not different from the prior aggregated presence information generated by the PAIF device for the first user and previously transmitted to the first presence server. In some embodiments, the first presence server publishes aggregated user presence information only when the first presence server determines that the aggregated user presence information has changed.

In some embodiments the first and second devices may be in the same autonomous system but in different domains. The various user devices shown and described in the exemplary embodiments such as smartphones, desk phones, IMS based mobile cellphones, and PBX desk phones, are only exemplary in nature and are not meant to limit the application.

In some embodiments, device 1 118 may register with Google Presence Server 106 to receive notifications of the presence status of the third user identifier. In some such embodiments, the Google Presence Server 106 registers with the MS Lync Presence Server 102 to receive notifications regarding the status of the presence information associated with the third user identifier and upon receipt of such information from the MS Lync Presence Server 102 via XMPP Gateway 104 over communication links 140 and 142 transmits the information to the device 1 118 via communication link 145.

In various embodiments the system includes a call server including: a CTI interface for monitoring call activity corresponding to said fourth user identifier; and a generation module for generating said fourth presence information based on said monitoring.

Communications methods and apparatus which determine presence information for a user based on and/or derived from communications signals will now be discussed in further detail.

Figure 13:
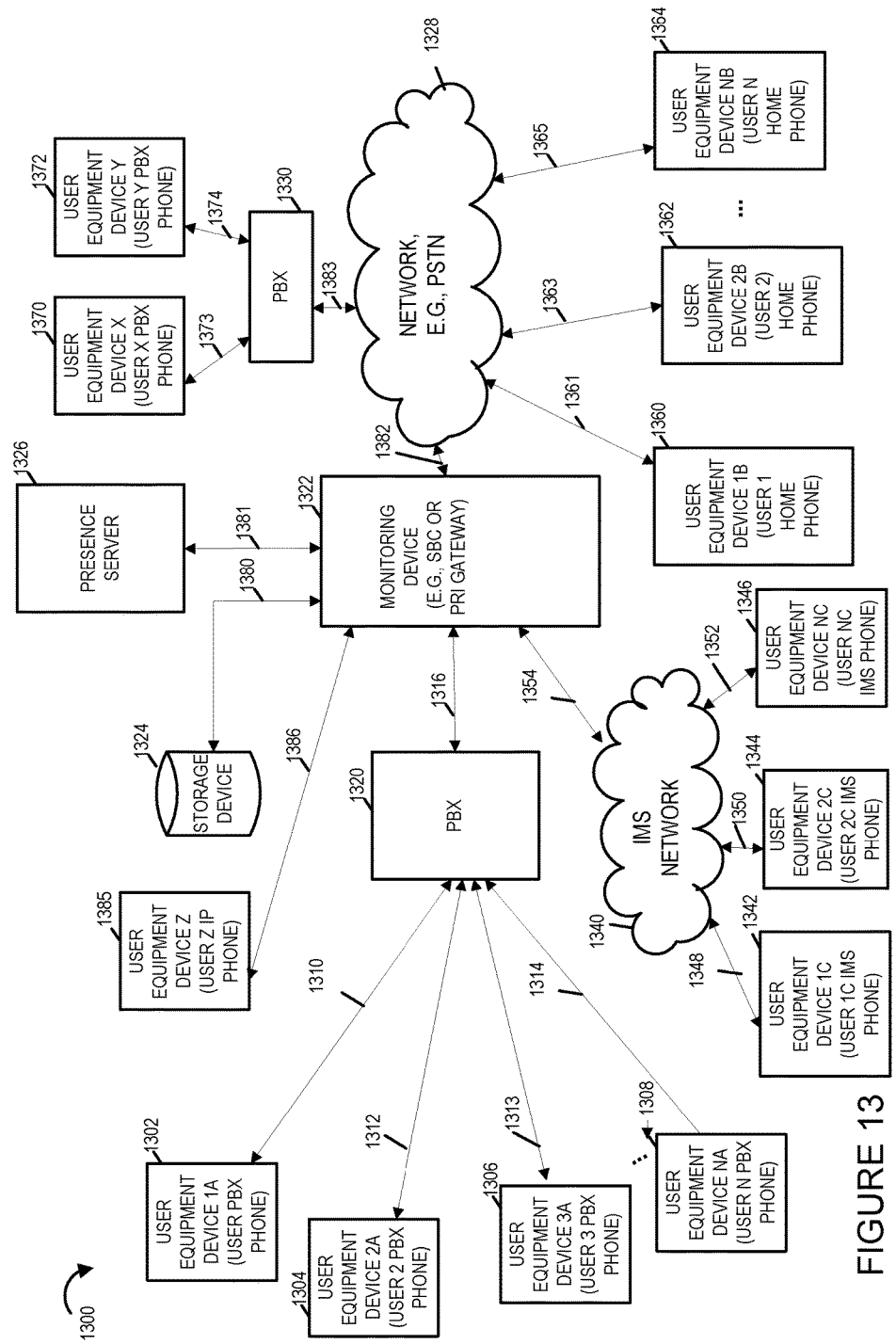
FIG. 13 illustrates an exemplary communications system in accordance with one embodiment of the present invention.

System 1300 of FIG. 13 illustrates an exemplary communications system embodiment of the present invention wherein a SBC or PRI Gateway device non-intrusively monitors signals passing through the device to derive and/or generate presence information from one or more users based on contact information for the one or more users included in or derived from the monitored signals with the SBC or PRI Gateway (Primary Rate Interface Gateway) device processing, formatting and sending the derive and/or generated presence information to a presence server.

System 1300 includes a monitoring device, e.g., SBC or PRI Gateway, 1322, a storage device 1324, a presence server 1326, a first PBX (Private Branch Exchanges) 1320, User Equipment device 1A 1302, User Equipment device 2A 1304, User Equipment Device 3A 1306, . . . , User Equipment device NA 1308, a network, e.g., PSTN (Public Switched Telephone Network) 1328, User Equipment Device 1B 1360, User Equipment Device 2B 1362, . . . , User Equipment Device NB 1364, a second PBX 1330, User Equipment Device X 1370, User Equipment Device Y 1372, an IMS network 1340, User Equipment Device Z 1385 and User Equipment Device 1C 1342, User Equipment Device 2C 1344, and User Equipment device NC 1346. The User Equipment Device 1A 1302 is user 1's PBX phone. User equipment device 2A 1312 is user 2's PBX phone. User Equipment Device 3A 1306 is user 3's PBX phone, . . . , User Equipment device NA 1308 is User N's PBX phone. User Equipment device 1A 1302, User Equipment device 2A 1304, User Equipment device 3A 1306, . . . , User Equipment device NA 1308 are coupled to PBX 1320 over communications links 1310, 1312, 1313, . . . , 1314 respectively. User Equipment device 1C 1342 is User 1C's IMS phone, e.g., a mobile IMS phone. User Equipment device 2C 1344 is user 2C's IMS phone. User Equipment Device NC 1346 is user NC's IMS phone. User equipment device 1C 1342, User Equipment device 2C 1344 and User Equipment device NC 1346 are coupled to IMS Network 1340 via communications links 1348, 1350, and 1352 respectively. User Equipment device X 1370 is user X's PBX phone. User Equipment device Y 1372 is user Y's PBX phone. User Equipment device X 1370 and User Equipment device Y 1372 are coupled to PBX 1330 via communications links 1373 and 1374 respectively. User Equipment device 1B 1360 is user 1's home phone. User Equipment device 2B 1362 is user 2's home phone. User Equipment device NB 1364 is user N's home phone. User Equipment device 1B 1360, user equipment device 2B 1362, . . . , user equipment device NB 1364 are coupled to network 1328 via communications links 1361, 1363, and 1365 respectively. PBX 1320 is coupled to monitoring device 1322 via communications link 1316. In some embodiments, e.g., in embodiments in which the PBX is a legacy device, the monitoring device is a SBC which is separate and distinct from the PBX and is located between the PBX and other networks acting as an interface for the PBX. The SBC configured so that all signals passing to or from the PBX pass through the SBC. The SBC configured to have a variety of different I/O interfaces including transmitters and receivers dedicated or configured to interface with different networks. Storage device 1324 is coupled to monitoring device 1322 via communication link 1380. Presence server 1326 is coupled to monitoring device 1322 via communications link 1381. Network 1328 is coupled to monitoring device 1322 via communications link 1382. PBX 1330 is coupled to network 1328 via communications link 1383. User Equipment device Z 1385 is coupled to monitoring device 1322 via communications link 1386. The User Equipment device Z 1385 is an IP communications, e.g., IP mobile phone. The User Equipment device Z 1385 is user Z's communications device. IMS network 1340 is coupled to monitoring device 1322 via communications link 1354.

Figure 14:
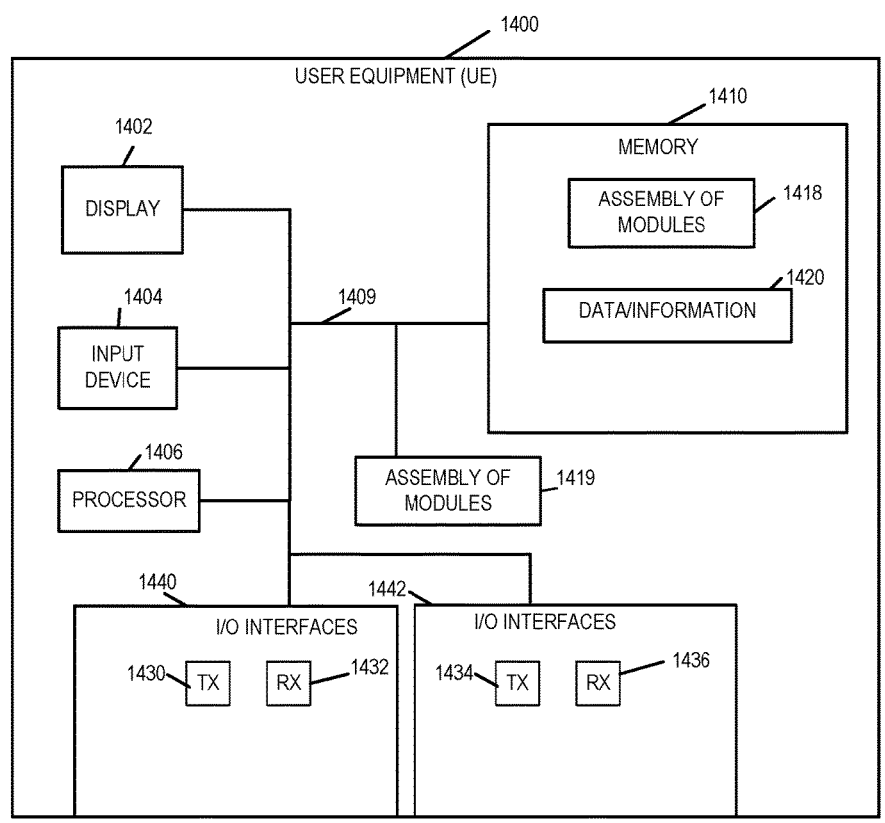
FIG. 14 illustrates an exemplary embodiment of a user equipment device in accordance with one embodiment of the present invention.

FIG. 14 illustrates an exemplary embodiment of a user equipment (UE) device 1400 in accordance with one embodiment of the present invention. Exemplary user equipment device 1400 includes a display 1402, an input device 1404, a processor 1406, e.g., a CPU, input/output (I/O) interfaces 1440 and 1442, which couple the UE to various other devices and/or networks e.g. PBX, IMS network, PSTN, memory 1410, and an assembly of modules 1419, e.g., circuits corresponding to different modules, coupled together via a bus 1409 over which the various elements may interchange data and information. Memory 1410 includes an assembly of modules 1418, e.g., an assembly of software modules, and data/information 1420. The I/O interface 1440 includes transmitters 1430 and receivers 1432. The I/O interface 1442 includes transmitters 1434 and receivers 1436. The user equipment device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the user equipment device is configured to communicate using a proprietary PBX protocol. In some embodiments, the UE 1400 includes a communication module configured to operate using IP, TCP, UDP and SIP protocol signaling methods. In some embodiments, the communication module is a hardware module, a software module or a module including hardware and software components. In some embodiments, the user equipment device 1400 is configured to communicate using standard analog PSTN protocols. In some embodiments, the user equipment 1400 is configured to communicate using telephony protocols such as for example ISDN.

In some embodiments, the user equipment devices 1302, 1304, 1306, . . . 1308 of FIG. 13 are implemented in accordance with user equipment device 1400 of FIG. 14. In some of such embodiments, the user equipment devices are configured to communicate with the PBX 1320 using proprietary PBX protocols which do not support the exchange of presence information.

In some embodiments, the user equipment devices 1360, 1362, . . . , 1364 of FIG. 13 are implemented in accordance with user equipment device 1400 of FIG. 14. In some of such embodiments, the user equipment devices are analog telephones configured to communicate with network switches in the network 1328 which is a PSTN network. In some embodiments, some of these user equipment devices are legacy devices which do not have the ability to provide presence information.

In some embodiments, the user equipment devices 1370 and 1372 of FIG. 13 are implemented in accordance with user equipment device 1400 of FIG. 14. In some of such embodiments, the user equipment devices are configured to communicate with the PBX 1330 using proprietary PBX protocols which do not support the exchange of presence information.

In some embodiments, the user equipment devices 1342, 1344, and 1346 of FIG. 13 are implemented in accordance with user equipment device 1400 of FIG. 14. In some of such embodiments, these user equipment devices are configured to communicate with monitoring device 1322 via IMS network 1340. These devices may be, and in most embodiments are, IMS devices, such as for example, IMS mobile or desktop phones or devices with IMS communications applications.

In some embodiments, the user equipment device 1385 of FIG. 13 is implemented in accordance with user equipment device 1400 of FIG. 14.

Figure 15:
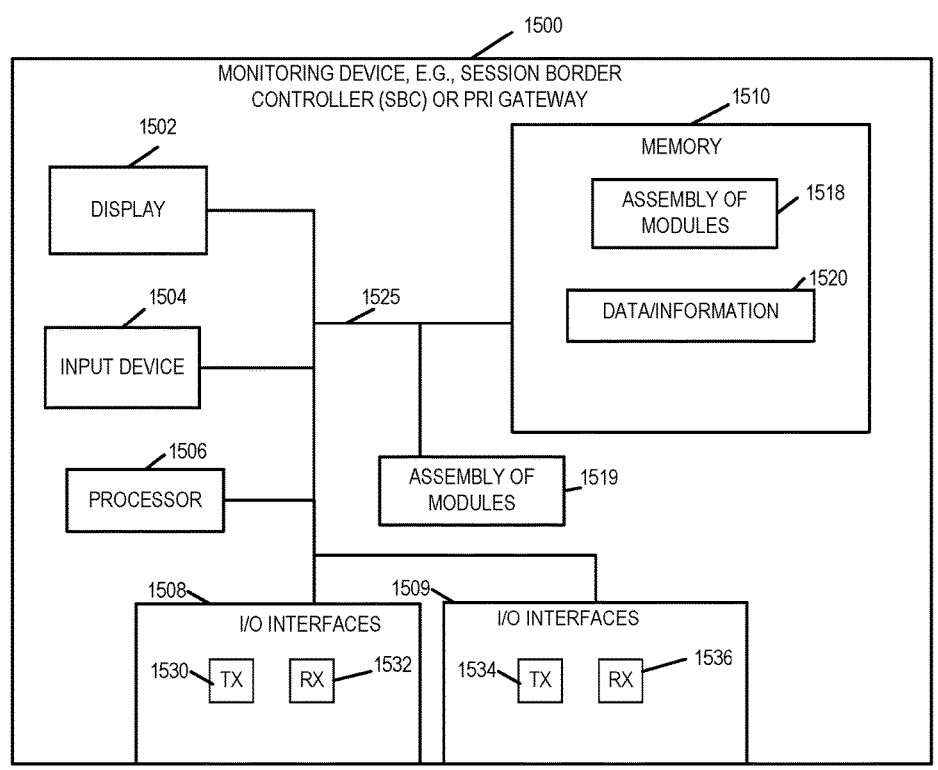
FIG. 15 illustrates an exemplary embodiment of a monitoring device in accordance with one embodiment of the present invention.

FIG. 15 illustrates an exemplary embodiment of a monitoring device, e.g., a Session Border Controller or PRI Gateway, in accordance with one embodiment of the present invention. Exemplary monitoring device 1500 includes a display 1502, an input device 1504, a processor 1506, e.g., a CPU, I/O interfaces 1508 and 1509, which couple the monitoring device to networks such as for example, IMS networks and PTSN networks and/or various other devices including PBX equipment, storage devices, and user equipment devices, memory 1510, and an assembly of modules 1519, e.g., circuits corresponding to different modules, coupled together via a bus 1525 over which the various elements may interchange data and information. Memory 1510 includes an assembly of modules 1518, e.g., an assembly of software modules, and data/information 1520. The I/O interfaces 1508 includes transmitters 1530 and receivers 1532. The I/O interfaces 1509 includes transmitters 1534 and receivers 1536. The monitoring device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the monitoring device 1500 includes a communication module configured to operate using IP, TCP, UDP and SIP protocol signaling methods. In some embodiments, the communication module is a hardware module, a software module or a module including hardware and software components. In some embodiments, the monitoring device 1400 is configured to communicate using standard analog PSTN protocols. In some embodiments, the monitoring device 1500 is configured to communicate using telephony protocols such as for example ISDN.

The monitoring device may, and in some embodiments is, a network edge device located at the edge of a network and through which signals pass such as control signals for establishing voice over internet telephone calls or media sessions. In some embodiments, the monitoring device 1322 of FIG. 13 is implemented in accordance with the monitoring device 1500. In some embodiments the monitoring device 1322 is a Session Border Controller or PRI Gateway implemented in accordance with the monitoring device 1500 and is located on the edge of an IP network. In some embodiments, the monitoring device is a network device. In some embodiments, the monitoring device is a PAIF device.

Figure 16:
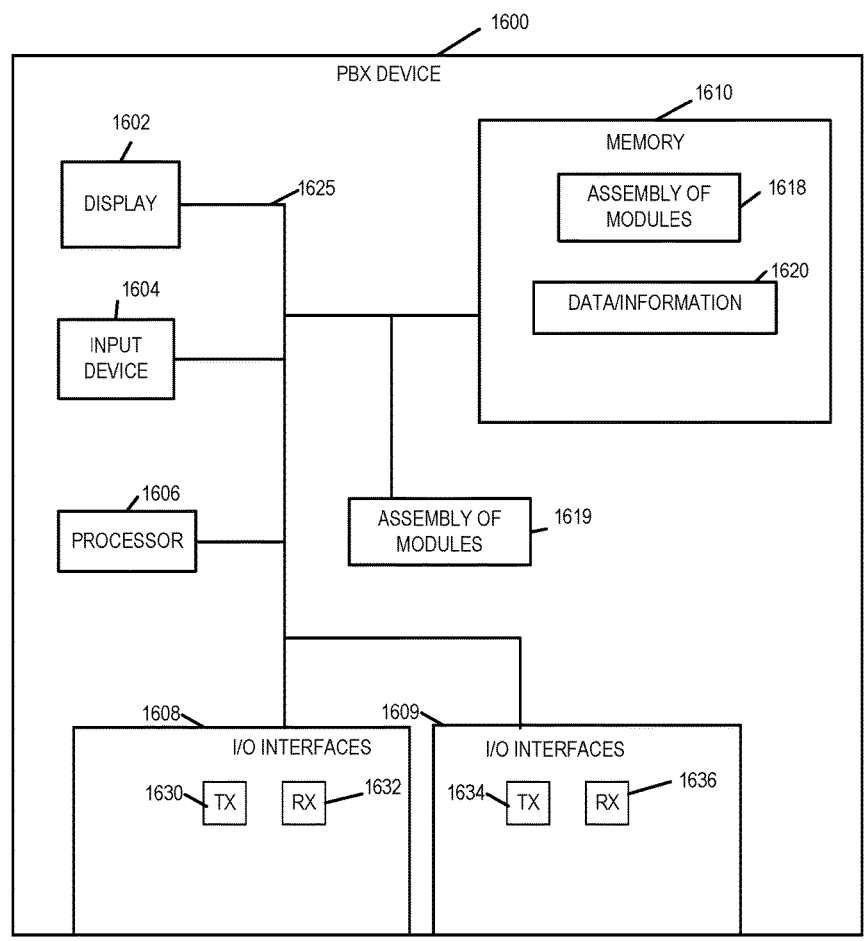
FIG. 16 illustrates an exemplary embodiment of a PBX in accordance with one embodiment of the present invention.

FIG. 16 illustrates an exemplary embodiment of a PBX device or enterprise system in accordance with one embodiment of the present invention. Exemplary PBX 1600 includes a display 1602, an input device 1604, a processor 1606, e.g., a CPU, I/O interfaces 1608 and 1609, which couple the PBX to networks such as for example, PTSN networks and/or various other devices such as SBCs, PRI Gateways, network devices, user equipment devices such as for example PBX telephones and auxiliary equipment, memory 1610, and an assembly of modules 1619, e.g., circuits corresponding to different modules, coupled together via a bus 1625 over which the various elements may interchange data and information. Memory 1610 includes an assembly of modules 1618, e.g., an assembly of software modules, and data/information 1620. The I/O interfaces 1608 includes transmitters 1630 and receivers 1632. The I/O interfaces 1609 includes transmitters 1634 and receivers 1636. The I/O interfaces may be, and sometimes are, configured to communicate with one or more of the user equipment devices using a proprietary communications protocol. In some embodiments, the PBX device is part of an enterprise communications system. In most embodiments, but not all embodiments, the PBX device is a legacy device which does not support providing presence information or communications with presence servers. In some embodiments, the PBX devices 1320 and 1330 of FIG. 13 are implemented in accordance with PBX device 1600. In some of such embodiments, the PBX devices 1320 and 1330 are not capable of providing presence information to another device nor of communicating presence information to a presence server.

In some embodiments, the monitoring device is a SBC or PRI Gateway which derives or learns from signals such as control signals passing through it the presence state of one or more devices corresponding to one or more users. In some embodiments the monitoring device acts as a standard IMS Application Server (AS) relaying the SIP Requests and responses back to a S-CSCF node in the IMS network. The IMS AS may be, and in some embodiments is, a SIP proxy or back to back user agent (B2BUA) transparently relaying Session Description Protocol (SDP) information. The monitoring device uses the knowledge of the SIP session corresponding to the IMS ID to establish or derive the user's presence state.

The monitoring device learns the location of a device using the user's IMS ID based on one or more of the following:
  SIP Signaling headers, e.g., 'P-Access-Network-Info' and GeoLocation header, etc.;
  Using interface to location database, e.g., HLR, HSS, etc.
The monitoring device learns the User's activity on the user's devices with respect to the user's IMS ID based on one or more of the following:
  by being chained in as an IMS AS by IMS core functions for calls and registrations;
  by having an interface towards a call server such as a PBX serving the User to learn its call activity, for example a CTI interface, or any notification mechanism.
The monitoring device learns or derives the user device capability on the user's IMS ID based on one or more of the following:
  User and network Policy information stored in a database or storage device, e.g., storage device 1324,
  Capabilities of the Access network, which can be learned dynamically using SIP headers, e.g., 'P-Access-Network-Info',
  Capability of the device, which can be learned dynamically using SIP headers, e.g., 'User-Agent'.
In some embodiments, the monitoring device establishes the users presence status based on one or more of the following:
  User registration status;
  User in call or IDLE;
  User location;
  Access network capabilities;
  User device capability.
In some embodiments, the monitoring device uses the open presence specification published by Microsoft, e.g., Microsoft's [MS-PRES]: Presence Protocol, for sharing the presence state of the user. In some embodiments, the monitoring device sends a SIP PUBLISH request with pidf+xml payload representing IMS IDs presence state based on user activity.
  User not Registered/de-Register→send Publish with presence state expired.
  User Registered but IDLE→send Publish with presence state Available
  User On call—incoming or outgoing calls→send Publish with presence state Busy
In some embodiments, the monitoring device will send SIP Publish with IMS ID presence state to a Lync server in following events:
  User registers→presence state Available
  User de-registers/registration expired→presence state expired
  User makes a call→presence state Busy
  User receives a call→presence state Busy
  User call is over→presence state Available
In some embodiments, the monitoring device is a PAIF device which also aggregates learned or derived presence state information for all of the devices corresponding to or assigned to a user before sending or publishing the presence information to a presence server.

In some embodiments, calls to from legacy endpoints passing through an SBC or a PRI gateway will have their presence updated on a Skype for Business Lync client by the SBC or PRI gateway monitoring the calls through called and/or calling number matching as well as routing. This is achieved by configuring a Skype for Business/Lync Presence Server; Active Directory is configured with contact information for the third party endpoints; and matching/routing configuration so that there is a match from a calling/called number to an active directory entry and then a mapping from the active directory entry to the Skype for Business/Lync User ID. In this way, a user with a PBX connection who is also a Skype for Business/Lync client can show "In a Call" when a PBX call is connected and a user who is away from their Skype for Business/Lync environment can still show "In a Call" when making calls from PSTN, mobile, home, etc. This allows for legacy equipment (e.g., non-Skype for business/Lync endpoint) that is associated with a Skype for business/Lync client to have its' presence shown when a call is connected.

Table 1700 of FIG. 17 illustrates exemplary presence information which may be, and in some embodiments is, generated for a user ID by a monitoring device based on or derived from activity of a user's device detected by the monitoring device during monitoring of the activity of the user's device such as for example by passively monitoring signals received from the user's device or directed to the user's device passing through the monitoring device. In some such embodiments the monitoring device may be and often is a PRI Gateway, a SBC or a PAIF device. In some embodiments, the monitoring device is an edge device located on the edge of a network. In some embodiments, the monitoring device is a PAIF device incorporated into a PRI Gateway or a SBC. Each of the rows 1706, 1708, 1710, 1712, 1714, 1716, and 1718 contain two entries. The first entry of each of these rows corresponds to column 1702 and contains an activity which may be detected during monitoring of the activity/signals corresponding to a user ID, e.g., an IMS ID, by the monitoring device on one of the monitoring device's I/O interfaces. The second entry of each of these rows corresponds to column 1704 and contains the corresponding presence information generated by the monitoring device for the user ID based on the monitored activity contained in the entry of the first column of the row. The entries of row 1706 indicate that the activity of being registered (entry row 1706, column 1702) correlates to a presence information state of available (entry row 1706, column 1704). The entries of row 1708 indicate that the activity of making a call (entry row 1708, column 1702) correlates to a presence information state of busy (entry row 1708, column 1704). The entries of row 1710 indicate that the activity of receiving a call (entry row 1710, column 1702) correlates to a presence information state of busy (entry row 1710, column 1704). The entries of row 1712 indicate that the activity of call over (entry row 1712, column 1702) correlates to a presence information state of available (entry row 1712, column 1704). The entries of row 1714 indicate that the activity of not registered (entry row 1714, column 1702) correlates to a presence information state of offline (entry row 1714, column 1704). The entries of row 1716 indicate that the activity of detecting a location (entry row 1716, column 1702), e.g., through a SIP message, correlates to presence information indicating the location detected (entry row 1716, column 1704). The entries of row 1718 indicate that the activity of detecting a device capability (entry row 1718, column 1702), e.g., through a SIP message, correlates to presence information indicating the device capability detected (entry row 1718, column 1704).

Figures 18, 18A:
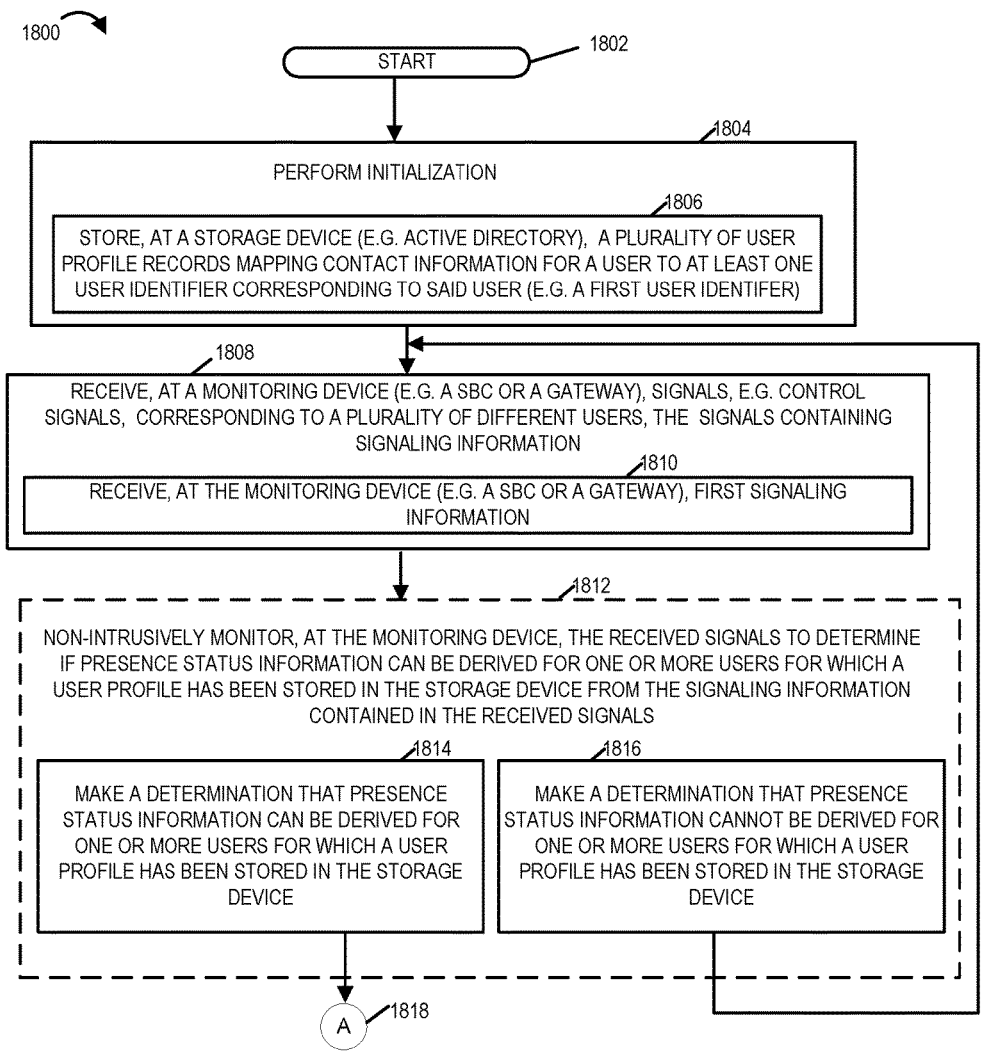
FIG. 18 shows the combination of FIGS. 18A, 18B, 18C, 18D, and 18E.
FIG. 18A illustrates a first part of a flowchart of an exemplary method of generating presence information in accordance with an exemplary embodiment.
Figure 18B:
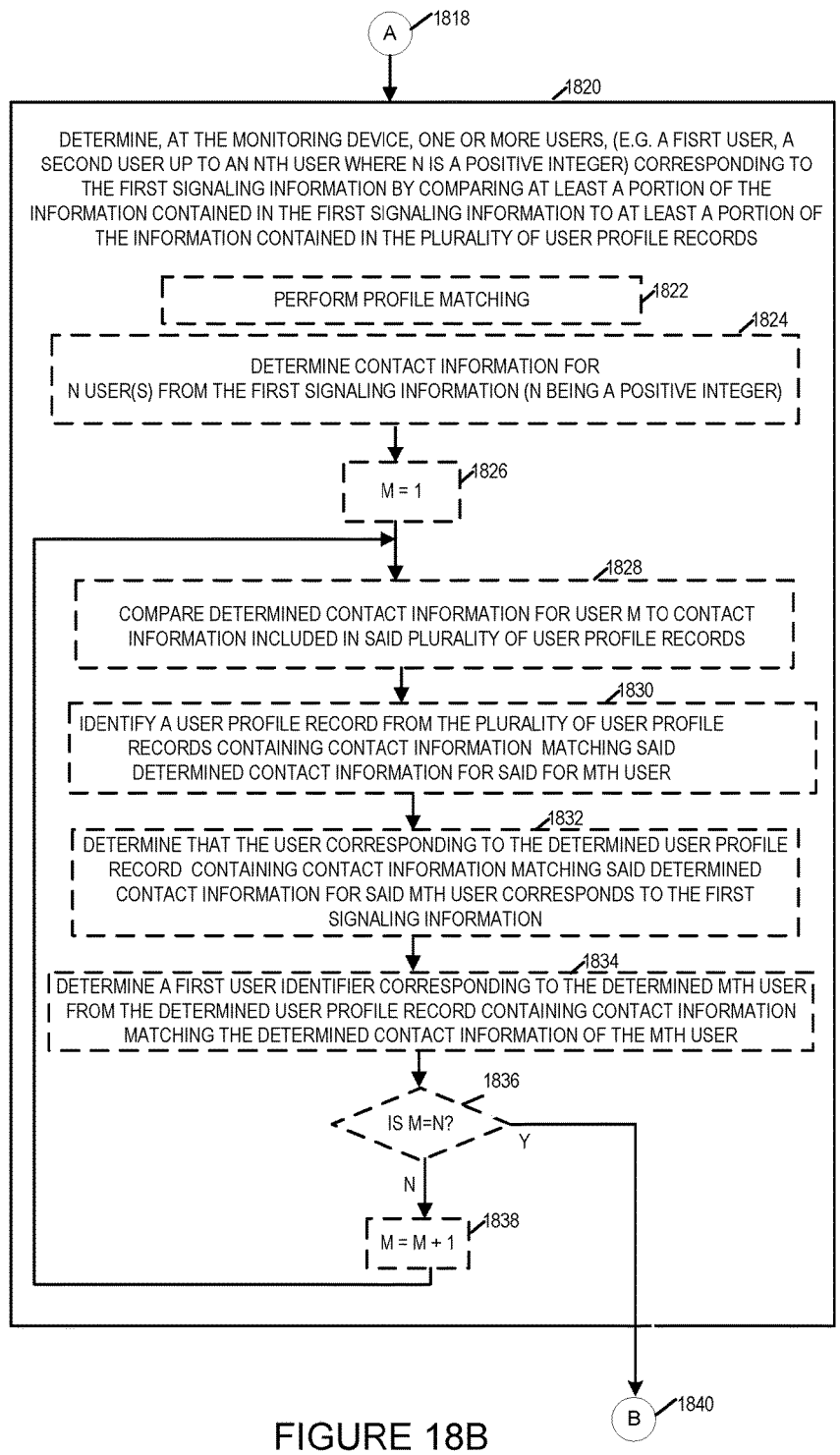
FIG. 18B illustrates a second part of a flowchart of an exemplary method of generating presence information in accordance with an exemplary embodiment.
Figure 18C:
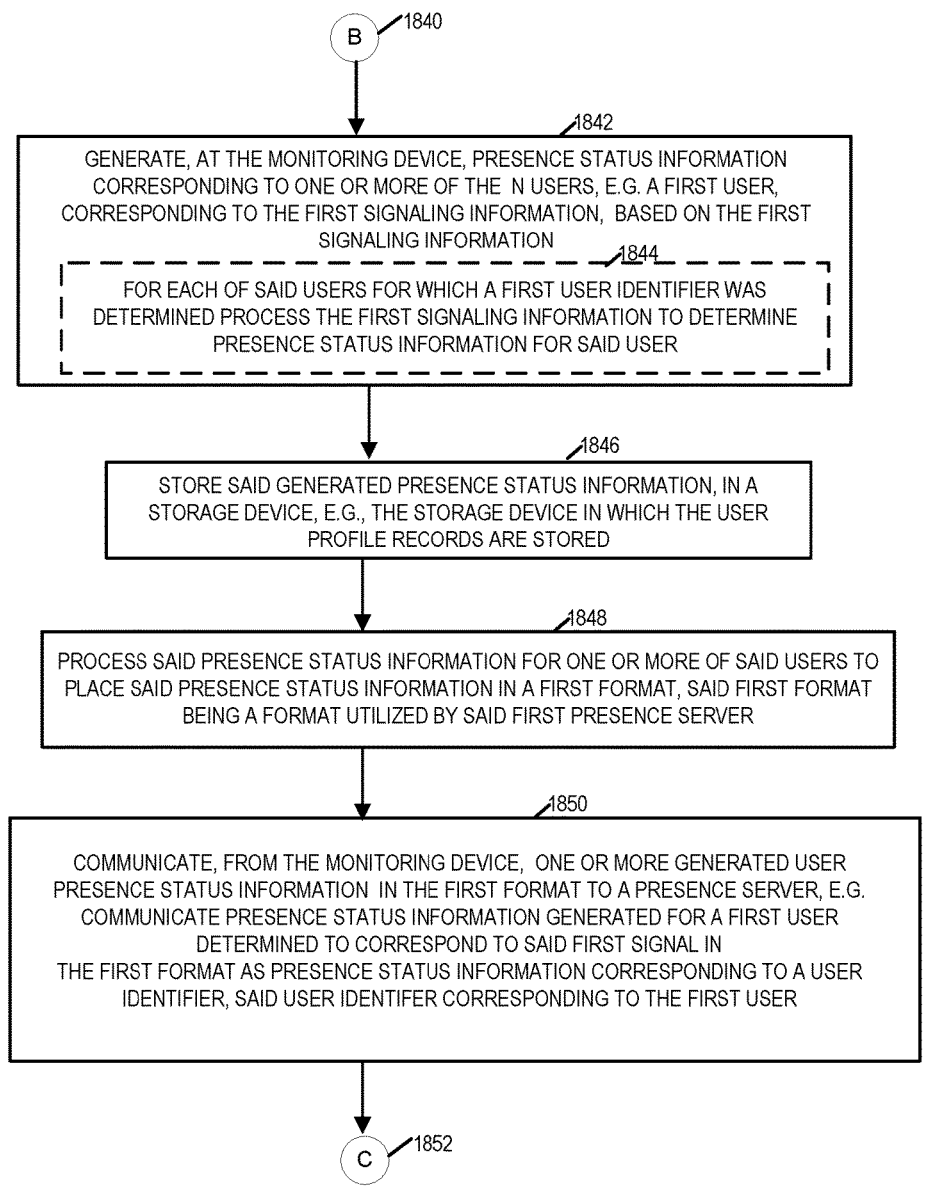
FIG. 18C illustrates a third part of a flowchart of an exemplary method of generating presence information in accordance with an exemplary embodiment.
Figure 18D:
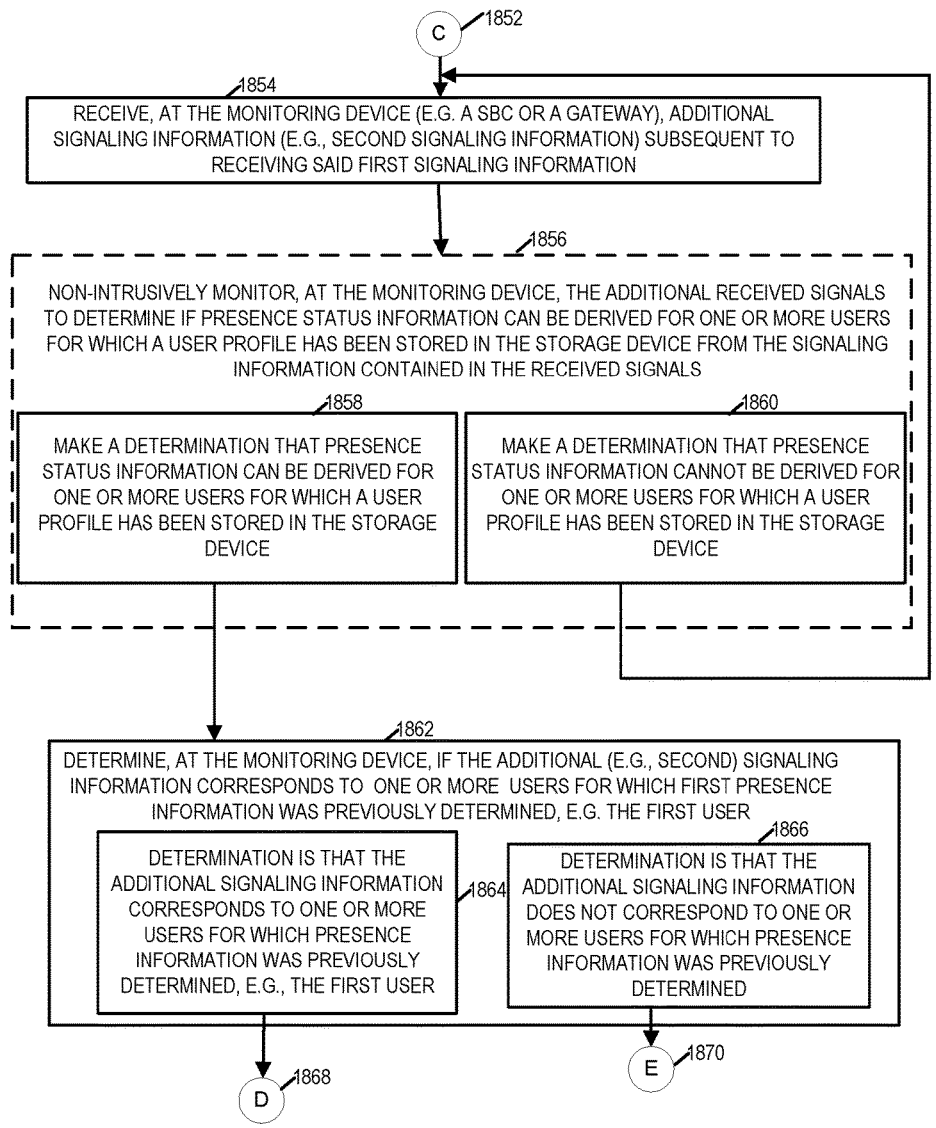
FIG. 18D illustrates a fourth part of a flowchart of an exemplary method of generating presence information in accordance with an exemplary embodiment.
Figure 18E:
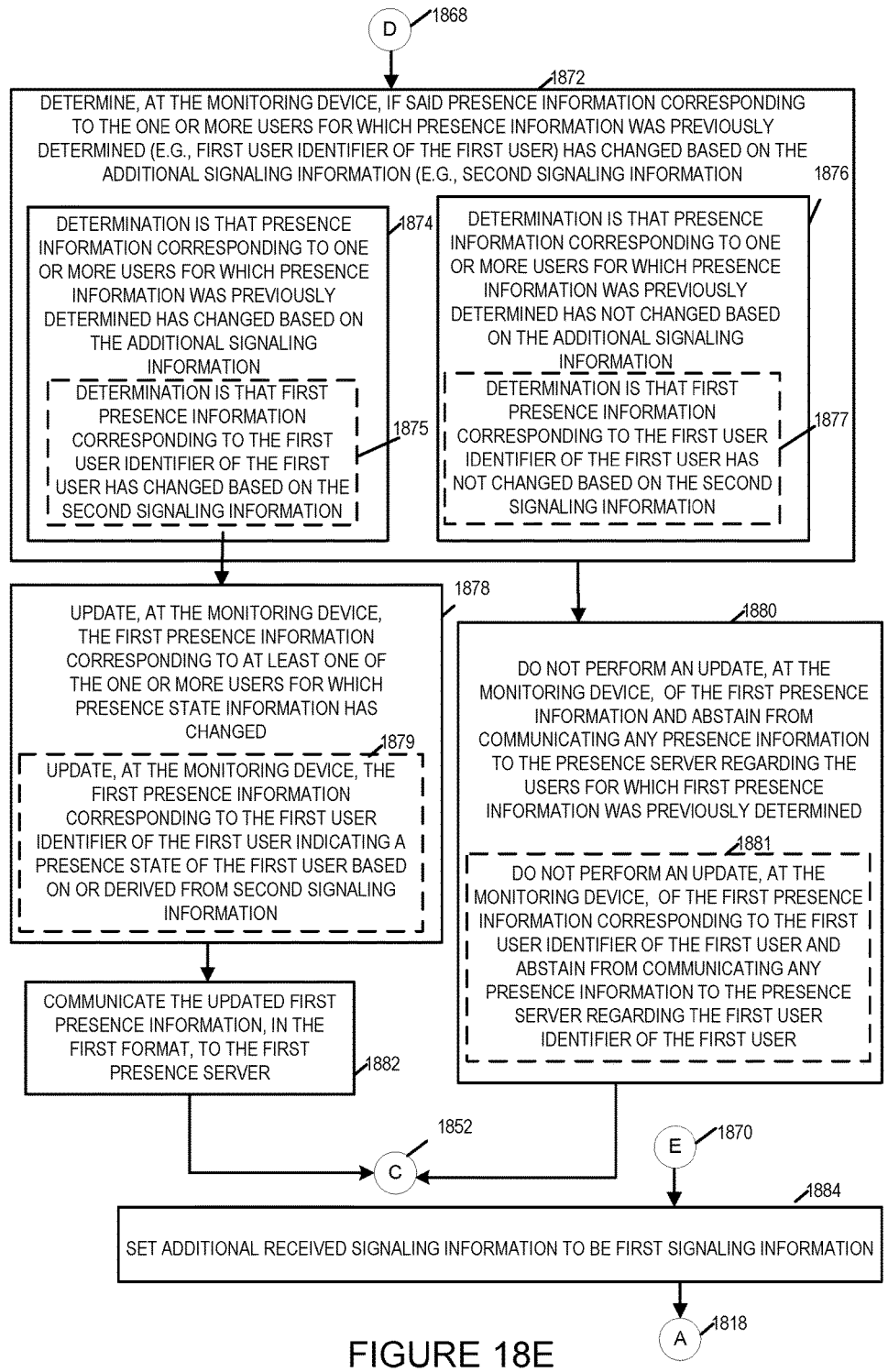
FIG. 18E illustrates a fifth part of a flowchart of an exemplary method of generating presence information in accordance with an exemplary embodiment.

FIG. 18 includes a first part FIG. 18A, a second part FIG. 18B, a third part FIG. 18C, a fourth part FIG. 18D, and a fifth part FIG. 18E. An exemplary communications method 1800 in accordance with an embodiment of the present invention is illustrated in FIG. 18. The exemplary method 1800 will now be explained with reference to the exemplary system 1300 shown in FIG. 13. The method 1800 is applicable to other systems and it will understood by one of skill in the art that system 1300 is merely used for explanatory purposes.

The communications method 1800 begins at start step 1802. Processing proceeds from step 1802 to step 1804. In step 1804, an initialization operation is performed. The step 1804 includes sub-step 1806. In sub-step 1806 as part of the initialization process a plurality of user profile records are stored in a storage device, e.g., storage device 1324. In some embodiments, the storage device is memory 1510 included in monitoring device 1322. In some embodiments the storage device and/or memory is managed using Active Directory directory processing services such as Microsoft's Active Directory for communications server. Each of the plurality of user profile records contains information corresponding to a single user. Among the information corresponding to the user stored in the user's profile record includes contact information for the user and one or more user identifiers for the user. Each of the user profile records maps or links an individual user's contact information to the one or more stored user identifiers corresponding to the user. In some embodiments the contact information may be a user identifier such as for example an MS Lync ID which can be used to contact the user. Examples of contact information for a user include a user's name, telephone number, an address, an IMS ID, MS Lync ID, and Skype for business ID. In some embodiments, the address is a geographical address, a network address (e.g., IP address, SIP address, etc.), or an e-mail address. The geographical address may be, and in some embodiments is, a residential address or a set of global position system coordinates. The contact information may include one or more phone numbers including a landline telephone number, a mobile number, a home number, a work or business number, a fax number, a magicjack phone number, a Google number, a redirection or call forwarding phone number or a Private Branch Exchange (PBX) line number or extension number. In some embodiments, the contact information for users is mapped to a MS Lync ID or Skype for business Lync ID corresponding to the user. In this example among the plurality of user profile records stored in the storage device is a user profile record for a first user that includes contact information and first user identifier corresponding to the first user. The contact information includes a home (landline) phone number, a mobile phone number, a business or work phone number, a Google phone number, a Fax number, a PBX line number, a PBX extension, a personal e-mail address, a business e-mail address, a residential address, the user's name, an IP address, an IMS ID, and a MS Lync for business ID. It will be appreciated that each user may have multiple home phone numbers, multiple mobile phone numbers, etc. although for explanatory purposes only a single home phone number, mobile phone number, etc. is being described.

Operation proceeds from initialization step 1804 to step 1808. In step 1808, signals for example control signals corresponding to a plurality of different users are received at the monitoring device 1322. Step 1808 includes sub-step 1810. In sub-step 1810, first signaling information is received at the monitoring device. The monitoring device 1322 in some embodiments is a Session Border Controller while in other embodiments it is a PRI Gateway. The PRI Gateway device may be and in some embodiments is a Voice Over Internet Protocol gateway, an ISDN PRI to SIP gateway or an ISDN PRI to H.232 gateway.

The received signals contain signaling information and are typically but not always communication control signals. The signals are received over one or more of the communications links 1316, 1354, 1382, and 1386 from various other devices such as PBXes, user equipment devices, PSTN and IP switches and gateways. As the monitoring device is a Session Border Controller or PRI gateway the communications signals from the end user devices are passing through the monitoring device in connection with normal communications operations. In some embodiments, the Session Border Controller and/or PRI gateway devices are distributed at the edge of core networks, e.g., PSTN or Internet, and in some embodiments act as the interface between public and private networks such as the interface between a PBX telephony network and the PSTN and/or the Internet.

Operation proceeds from step 1808 to optional step 1812. In optional step 1812, the received signals are non-intrusively monitored at the monitoring device to determine if presence status information can be derived for one or more users for which a user profile has been stored in the storage device from the signaling information contained in the received signals. In sub-step 1814, a determination that the presence status information can be derived for one or more users for which a user profile has been stored in the storage device. Operation proceeds from step 1814 via connection node A 1818 to step 1820 shown on FIG. 18B. In sub-step 1816, a determination is made that presence status information cannot be derived for one or more users for which a user profile has been stored in the storage device. Operation proceeds from step 1816 back to step 1808 wherein additional signals are received at the monitoring device and are processed as described above. In one embodiment, the monitoring device determines that presence information can not be derived for one or more of the users for which a user profile has been stored in the storage device based on the type of signal received at the monitoring device. For example, if the received signal is an error message the monitoring device will make the determination that presence information can not be derived from the received error message. In some embodiments, network communications link status and network congestion message signals are also message/signal types for which the monitoring device will make the determination that presence information can not be derived from the received messages based on message type. In some of such embodiments, when the signal type can not be used to determine that the signal does not contain information from which presence information can be derived, the monitoring device makes the determination by identifying contact information for one or more users in the signaling information of the received message and then determining whether the identified contact information matches contact information for one or more of the plurality of users whose corresponding profile record is stored in the storage device. This may be, and typically is, accomplished by searching the plurality of user profiles to determine if there is a match to the contact information identified. When the identified contact information from the received signal matches contact information contained in one of the user profile records stored in the storage device a determination is made in step 1814 that presence status information can be derived for one or more users for which a user profile has been stored in the storage device; otherwise, in step 1816 a determination is made that presence status information cannot be derived for one or more users for which a user profile has been stored in the storage device. In some embodiments, the contact information identified in the received signal is normalized before a search is performed to determine if there is a match in the user profile records. For example, a telephone number may be, and sometimes is, normalized by adding a country code to the received telephone number.

Returning now to step 1820. In step 1820, at the monitoring device the one or more users corresponding to the first signaling information is determined by comparing at least a portion of the information contained in the first signaling information to at least a portion of the information contained in the plurality of user profile records. The one or more users is for example a first user, a second user, . . . , Nth user where N is a positive integer that is equal to or less than the number of plurality users for which a user profile was stored in the storage device. In some embodiments, step 1820 includes one or more sub-steps 1822, 1824, 1826, 1828, 1830, 1832, 1834, 1836, and 1838.

In those embodiments in which step 1820 includes sub-step 1822, profile matching is performed at the monitoring device as part of the step of determining the one or more users corresponding to the first signaling information. In some such embodiments, profile matching is performed by generating one or more user profiles from the received signaling information and then comparing the generated one or more user profiles to the stored user profile records to determine if there is a match. A profile match may occur by matching one or more attributes of the generated profile to one or more attributes of a stored profile which uniquely identifies the user. For example, if the received signal is an analog signal including a called party phone number the called party phone number is placed in a generated user profile as contact information for the user. The generated profile is then compared to stored user profile records to determine if there is a match, that is if there are any profiles that contain the called party telephone number as contact information. If there is a single match then the user has been identified. If more than one users' profile includes the called party number as contact information than secondary attributes of the profile are compared. For example, in the case wherein the called party phone number is for a PBX line shared by multiple users then a PBX extension number derived from the received signal information may be used as a secondary profile attribute to determine the unique user corresponding to the generated profile to determine a match.

In embodiments in which step 1820 includes sub-steps 1824, 1826, 1828, 1830, 1832, 1834, 1836 and 1838, operation begins in sub-step 1824.

In sub-step 1824, contact information for N user(s) is derived and/or determined from the first signaling information. N is a positive integer. Operation proceeds from sub-step 1824 to sub-step 1826.

In sub-step 1826, a variable M is set to 1. The variable M will be used as a loop variable. Operation proceeds from sub-step 1826 to sub-step 1828. In sub-step 1828, the determined contact information for user M from the first signaling information is compared to contact information included in the plurality of user profile records. Operation proceeds from sub-step 1828 to sub-step 1830. In sub-step 1830 a user profile record from the plurality of user profile records containing contact information is identified as matching the determined contact information for the Mth User. Operation proceeds from sub-step 1830 to sub-step 1832.

In sub-step 1832, the monitoring device determines that the user corresponding to the determined user profile record containing contact information matching said determined contact information for the Mth User corresponds to the first signaling information. Operation proceeds from sub-step 1832 to sub-step 1834.

In sub-step 1834, a first user identifier corresponding to the determined Mth User is determined at the monitoring device from the determined user profile record containing the contact information matching the determined contact information of the Mth User. Operation proceeds from sub-step 1834 to sub-step 1836.

In sub-step 1836, the value of the loop variable M is compared to the integer N which is the number of contacts determined from the first signaling information. If M equals N then the information pertaining to each of the N contacts has been compared to see if there is a match with the contact information stored in the plurality of user profile records and processing proceeds from sub-step 1836 to sub-step 1840. If loop variable M does not equal N then additional contact information derived from the first signaling information still needs to be compared to the user profile records and processing proceeds from sub-step 1836 to sub-step 1838. In sub-step 1838, loop variable M is incremented by 1. Operation proceeds from sub-step 1838 to sub-step 1828 wherein the contact information for user M=2 determined from the first signaling information is compared to contact information included in the plurality of user profile records. Processing then continues through this loop until all N user contacts derived from the first signaling information has been processed.

As previously discussed upon the completion of the processing of the N contacts, operation proceeds from step 1820 to step 1842 illustrated on FIG. 18C via connection node B 1840.

In step 1842, presence status information corresponding to one or more of the N users, e.g., a first user, corresponding to the first signaling information is generated at the monitoring device based on and/or derived from the first signaling information.

In some embodiments, the step 1842 includes sub-step 1844. In sub-step 1844, the monitoring device processes the first signaling information to determine presence status information for each of said users for which a first user identifier was determined in connection with the first signaling information.

Table 1700 of FIG. 17 illustrates an exemplary table showing presence information generated by a monitoring device for a user ID based on and/or derived from signals received by the monitoring device. Exemplary presence status information includes call status (e.g., idle/available/not busy, on-call/busy), registration status, e.g., SIP registration status, access network information/capability, location, device capability. In some embodiments, the location information is a geographical location which includes country, state, city and/or province. In some embodiments, location is a set of global positioning system (GPS) coordinates. The exemplary presence status information may be derived from the communication signals passing through the monitoring device such as for example from analog and digital telephony and VOIP call initiation, setup, establishment and termination signals and/or signaling messages, session registration, initiation, establishment and termination signals, SIP headers, e.g., 'P-Access-Network-Info', SIP registration and Invite signaling messages. In one exemplary embodiment, at least some of the presence status information generated is determined and/or derived from SIP header messages included in the first signaling information.

Operation proceeds from step 1842 to step 1846. In step 1846, the generated presence status information is stored in a storage device such as memory in the monitoring device and/or the storage device in which the user profile records are stored. Operation proceeds from step 1846 to step 1848.

In step 1848, the presence status information for one or more of said users is processed and/or transformed to place the presence status information in a first format. The first format being a format utilized by a presence server to which the presence information will be published. For example, if presence server 1326 is a MS Lync presence server and the presence status information is to be published to this presence server then the generated presence status information is processed and/or transformed so that it is placed in a format understood by the MS Lync presence server. In some embodiments, the presence status information is processed and placed in a plurality of different formats wherein each format is utilized by a different presence server. Each of the different presence servers being a presence server on which the user corresponding to the presence status information has a user ID thereby allowing the presence status information to be published to the plurality of different presence servers. Operation proceeds from step 1848 to step 1850.

In step 1850, generated presence status information in the first format for one or more of the users is communicated from the monitoring device to a presence server. For example, presence status information generated for a first user determined to correspond to the first signal is communicated in the first format as presence status information corresponding to a user identifier wherein the user identifier corresponds to the first user. In some embodiments, the generated presence status information for one or more of the users is communicated from the monitoring device to a plurality of presence servers which are tracking the presence of the first user. The presence status information being communicated to each of the presence servers in a format which the presence server is utilizing. Operation proceeds from step 1850 to step 1854 shown on FIG. 18D via connection node C 1852.

In step 1854, additional signaling information (e.g., second signaling information) is received at the monitoring device subsequently to the receiving the first signaling information. Operation proceeds from step 1854 to step 1856.

In step 1856, the additional received signals are non-intrusively monitored at the monitoring device to determine if presence status information can be derived for one or more users for which a user profile has been stored in the storage device from the signaling information contained in the received signals. Step 1856 includes sub-steps 1858 and 1860. In sub-step 1858, a determination is made that presence status information can be derived for one or more users for which a user profile has been stored in the storage device. Operation proceeds from sub-step 1858 to step 1862. In sub-step 1860, a determination is made that presence status information cannot be derived for one or more user for which a user profile has been stored in the storage device. Operation proceeds from sub-step 1860 back to step 1856 where additional received signals are received and non-intrusively monitored and processed as previously described. Operations performed during step 1856 and sub-steps 1858 and 1860 are the same as or similar to steps 1812 and sub-steps 1814 and 1816 except the operations are performed on the additional signals instead of the first signals received. The description of various embodiments discussed in connection with step 1812 and sub-steps 1814 and 1816 are also applicable to step 1856 and sub-steps 1858 and 1860.

When a determination is made in sub-step 1858 that presence status information can be derived for one or more users for which a user profile has been stored in the storage device operation proceeds step 1862 as previously described. In step 1862, a determination is made at the monitoring device as to whether the additional signaling information (e.g., second signaling information) corresponds to one or more users for which first presence information was previously determined (e.g., the first user). Step 1862 includes sub-steps 1864 and 1866.

In sub-step 1864, a determination is made that the additional signaling information corresponds to one or more users for which presence information was previously determined, e.g., the first user. This determination, may be and in some embodiments is, made by comparing a list of users for which presence information was previously generated based on and/or derived from the first signaling information to a list of users for which the presence status information may be generated based on and/or derived from the additional signaling information. In some embodiments, this determination is made based on whether the additional signaling information corresponds to the same session or call as the first signaling information. If the additional signaling information corresponds to the same session or call as the first signaling information then a determination is made that the additional signaling information corresponds to one or more users for which presence information was previously determined. Operation proceeds from step 1864 to step 1872 shown on FIG. 18E via connection node D 1868.

In step 1866, a determination is made that the additional signaling information does not correspond to one or more users for which presence information was previously determined, e.g., the first user. This determination, may be and in some embodiments is, made by comparing the list of users for which presence information was previously generated based on and/or derived from the first signaling information to a list of users for which the presence status information may be generated based on and/or derived from the additional signaling information. If no users appear on both lists than the determination is that the additional signaling information does not correspond to one or more users for which presence information was previously determined. Operation proceeds from sub-step 1866 to step 1884 shown on FIG. 18E via connection node E 1870. In step 1884, the additional received signaling information is set to be first signaling information that is it is to be considered first signaling for processing purposes and operation proceeds from step 1884 to step 1820 shown on FIG. 18B via connection node A 1818 wherein the method proceeds as previously described with the additional signaling information being processed as first signaling information.

Returning to step 1872, in step 1872, the monitoring device determines if the presence information corresponding to the one or more users for which presence information was previously determined (e.g., first user identifier of the first user) has changed based on the additional, e.g., second signaling information. When it is determined in sub-step 1874 that presence information for one or more users for which presence information was previously determined has changed operation proceeds from step 1872 to step 1878. When it is determined in sub-step 1876 that presence information has not changed for one or more users for which presence information was previously determined operation proceeds to step 1880. In step 1880, no update operation of the first presence information corresponding to the users for which presence information was previously determined is performed at the monitoring device and the monitoring device abstains from communicating any presence information to the presence server regarding the users for which first presence information was previously determined. Operation proceeds from step 1880 to step 1854 shown on FIG. 18D via connection node C 1852 where additional signaling information is received and the method continues as previously described.

In step 1878, the first presence information corresponding to at least one of the one or more users identified in step 1872 is updated to indicate the presence state of the at least one of the one or more users based on and/or derived from the additional (e.g., second) signaling information. In some embodiments, all of the users identified in step 1872 have their presence status information updated to reflect the changes in presence status for the user based on and/or derived from the second signaling information. Operation proceeds from step 1878 to step 1882.

In some embodiments, one or more of the optional sub-steps 1875, 1877, 1879, 1881 are implemented. In some of such embodiments, sub-step 1874 includes sub-step 1875, sub-step 1876 includes sub-step 1877, step 1878 includes sub-step 1879 and step 1880 includes sub-step 1881. For example when the first user's presence information is the only presence information that has been generated based on the monitoring of the first signaling information and the additional signaling information is the second signaling information then in step 1872 a determination is made at the first monitoring device if said presence information corresponding to the first user identifier of the first user has changed based on the second signaling information. In step 1875 the determination is that the first presence information corresponding to the first user identifier of the first user has changed based on the second signaling information when in step 1876 the determination is that first presence information corresponding to the first user identifier of the first user has not changed based on the second signaling information. When the determination in step 1872 is that the first presence information corresponding to the first user identifier of the first user has changed based on the second signaling information operation proceeds from step 1872 to step 1878 which includes sub-step 1879. In optional sub-step 1879, the first presence information corresponding to the first user identifier of the first user indicating a presence state of the first user based on or derived from the second signaling information is updated. Operation then proceeds to step 1882 wherein the updated first presence information is communicated, e.g., transmitted via the I/O interface of the monitoring device, in a first format, to the first presence server and operation then proceeds via connection node C 1852 to step 1854 as previously described where additional signaling information is received at the monitoring device and the method continues as previously discussed. However, when the determination in step 1872 is that the first presence information corresponding to the first user identifier of the first user has changed based on the second signaling information operation proceeds from step 1872 to step 1880 which includes sub-step 1881. In sub-step 1881, no update is performed of the first presence information corresponding to the first user identifier of the first user at the monitoring device. Furthermore, the monitoring device abstains from communicating any presence information to the presence server regarding the first user identifier of the first user. This saves on I/O interface processing, communications processing, and power and also prevents congestion on the communications link between the monitoring device and the presence server.

In some embodiments, step 1872 is bypassed and in step 1882, presence information for one or more of the users is determined based on and/or derived from the second signaling information and is communicated to the presence server without regard to whether the presence information has changed. In such embodiments, the monitoring device determines presence information for one or more users for each of the additional signals received, determines the user identifier based on the contact information in the received signal, associates the presence information with the user identifier corresponding to the contact information, formats the presence information into a format being utilized by the presence server and transmits the presence information to the presence server with the user identifier. The monitoring device makes no determination on whether the presence information has changed or not. Such embodiments are useful when the monitoring device's real time processing capability needs to be reserved and congestion on the communications link between the presence server and the monitoring device is not an issue.

In some embodiments, the monitoring device after identifying the user profile record corresponding to a user for whom the received first signaling information is destined will route the first signal to a plurality of different end points based on the contact information contained in the user profile corresponding to the identified user. For example, a call setup message may be received for a work telephone number for John Smith. The monitoring device identifies based on the work telephone number contained in the call setup message that the call setup message is for John Smith and identifies John Smith's user profile record. Upon identifying John Smith's user profile record, the monitoring device identifies all of the contact phone numbers in the profile record for John Smith and branches the call to each of the telephone numbers, e.g., his home, mobile, and business telephone numbers. In some such embodiments, the call setup message may be received from either a PSTN or IP network.

Figure 19:
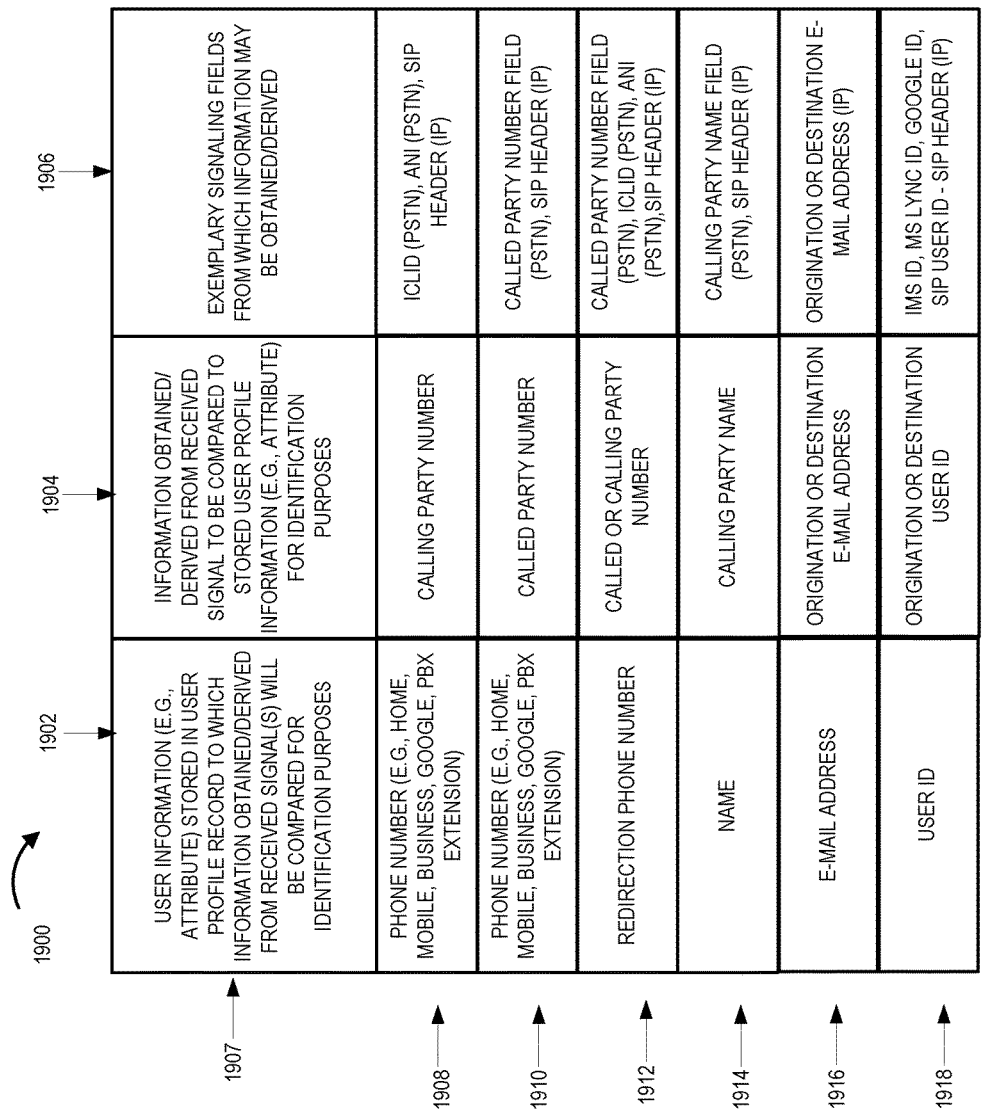
FIG. 19 illustrates an exemplary table showing user information stored in user profile records, information obtained/derived from received signals, and exemplary signaling fields from which signaling information may be obtained/derived.

FIG. 19 illustrates an exemplary table 1900 showing user information stored in user profile records, information obtained/derived from received signals, and exemplary signaling fields from which signaling information may be obtained/derived. Row 1907 is a header for the table which provides an explanation of the data contained in each of the columns of each of the rows. Column 1902 includes user information (e.g., attributes) stored in a user profile record to which information obtained/derived from received signal(s) will be compared for identification purposes. That is to identify user(s) corresponding to the received signal(s). Column 1904 includes information obtained/derived from received signal(s) to be compared to stored user profile information (e.g., attribute) for identification purposes. Column 1906 includes exemplary signaling fields from which information may be obtained/derived as well as the exemplary networks from which the signals are received.

Entry column 1902, row 1908 is phone number (e.g., home phone number, a mobile phone number, business phone number, Google phone number or a PBX extension number). One or more of these phone numbers is stored in the exemplary user's profile and is an attribute that is used for identifying the user corresponding to signaling information. The information obtained/derived from received signal(s) to be compared to the user profile information (e.g., attribute) for identification purposes in column 1904, row 1908 is calling party number. The exemplary signaling fields from which the calling party number may be obtained and/or derived is listed in column 1906, row 1908 as Incoming Calling Line Identification (ICLID) received from a Public Switched Network (PSTN), Automatic Number Identification received from a PSTN or SIP Header received from an Internet Protocol (IP) network.

Entry column 1902, row 1910 is phone number (e.g., home phone number, a mobile phone number, business phone number, Google phone number or a PBX extension number). One or more of these phone numbers is stored in the exemplary user's profile and is an attribute that is used for identifying the user corresponding to signaling information. The information obtained/derived from received signal(s) to be compared to the user profile information (e.g., attribute) for identification purposes in column 1904, row 1910 is called party number. The exemplary signaling fields from which the called party number may be obtained and/or derived is listed in column 1906, row 1910 as Called Party Number Field received from a Public Switched Network (PSTN) or a SIP Header received from an Internet Protocol (IP) network.

Entry column 1902, row 1912 is redirection phone number to which calls received at the monitoring device identified for the user will be routed. This phone number is stored in the exemplary user's profile and is an attribute that is used for identifying the user corresponding to signaling information. The information obtained/derived from received signal(s) to be compared to the user profile information (e.g., attribute) for identification purposes in column 1906, row 1912 is called or calling party number. The exemplary signaling fields from which the calling or called party number may be obtained and/or derived is listed in column 1906, row 1912 as Called Party Number Field received from a Public Switched Network (PSTN) or a SIP Header received from an Internet Protocol (IP) network. Additionally for the calling party number the information may be derived and/or obtained from a calling party number field, the ICLID field, ANI field or SIP header field.

Entry column 1902, row 1914 is name. A name is stored in the exemplary user's profile and is an attribute that is used for identifying the user corresponding to signaling information. The information obtained/derived from received signal(s) to be compared to the user profile information (e.g., attribute) for identification purposes in column 1904, row 1914 is calling party name. The exemplary signaling fields from which the calling party name may be obtained and/or derived is listed in column 1906, row 1914 as Calling Party Name Field which may include Incoming Calling Line Identification (ICLID) received from a Public Switched Network (PSTN) or SIP Header received from an Internet Protocol (IP) network. In some embodiments, the name may be matched to a display name corresponding to a PBX extension for identification purposes. In some embodiments, the name may be matched to a called party name when called party name information is identified in said received signaling information.

Entry column 1902, row 1916 is an e-mail address. One or more e-mail addresses is stored in the exemplary user's profile and is an attribute that is used for identifying the user corresponding to signaling information. The information obtained/derived from received signal(s) to be compared to the user profile information (e.g., attribute) for identification purposes in column 1904, row 1916 is origination or destination e-mail address. The exemplary signaling fields from which the originate or destination e-mail address may be obtained and/or derived is listed in column 1906, row 1916 as origination or destination e-mail address provided in a message received from an Internet Protocol (IP) network.

Entry column 1902, row 1918 is a user ID. One or more user IDs is stored in the exemplary user's profile and is an attribute that is used for identifying the user corresponding to signaling information. The information obtained/derived from received signal(s) to be compared to the user profile information (e.g., attribute) for identification purposes in column 1904, row 1918 is origination or destination user ID. The exemplary signaling fields from which the origination and/or destination user ID may be obtained and/or derived is listed in column 1906, row 1918 as IMS user ID, MS LYNC user ID, GOOGLE user ID, SIP user ID any of which may be included in a SIP header received in a message from an Internet Protocol (IP) network.

In some embodiments, one or more pieces of information derived and/or obtained from the monitored signals are used to identify a user and a user ID corresponding to the identified user that is utilized by the presence server to which presence status information for the user is communicated from the information, e.g., contact information or user ID information contained in a user's profile. For example, an incoming analog call is monitored at the monitoring device and a calling party number is identified from the ICLID number information in the analog signal. The ICLID number is then compared to each user's profile record stored phone numbers. When a match is found the user is identified as being the calling party corresponding to the monitored call. The monitoring device then derives the user's presence call status as busy for as long as the current call corresponding to the calling party is active. The monitoring device then identifies a MS Lync user ID corresponding to the user from the identified user record profile, generates a presence call status message for the first user, and sends it to the MS presence server with the MS Lync user ID. When the monitoring device, detects from the signals passing through it that the call has been terminated, it generates a presence call status message indicating the first user is available and sends it to the MS presence server with the MS Lync user ID corresponding to the identified calling party. In this way even if the user calls from his/her home phone number which is not associated with the user MS Lync user ID, the MS Lync presence server still receives presence information for the user. In some embodiments, the presence information communicated to the presence server includes an indication of which device a user is currently active on along with the user's status. In some embodiments, the presence information communicated to the presence server includes an indication that it is derived presence information.

Figure 20:
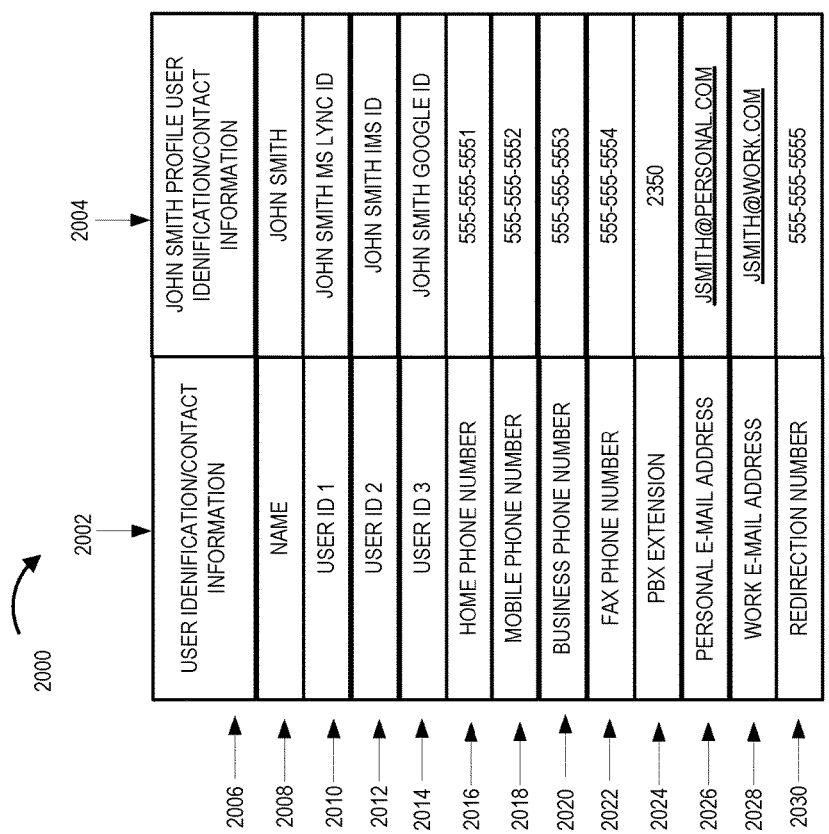
FIG. 20 illustrates exemplary user identification/contact information included in a user profile record in accordance with an exemplary embodiment.

Table 2000 of FIG. 20 illustrates an exemplary user profile record. Row 2006 of table 2000 is a header for the table and is merely provided to help explain the contents of each column. As indicated in the header entry at row 2006, column 2002, the column 2002 includes exemplary user identification/contact information entry types/fields of the profile record. The entries in column 2004 include an exemplary user identification/contact information included in a profile record for user John Smith. Row 2008 is the name of the user stored in the profile record. Row 2010 is user ID 1, row 2012 is user ID 2, row 2014 is user ID 3, row 2016 is home phone number, row 2018 is mobile phone number, row 2020 is business phone number, row 2022 is FAX phone number, row 2024 is PBX extension, row 2026 is personal e-mail address, row 2028 is work e-mail address, row 2030 is redirection number. It should be understood that multiple names, personal and work e-mail addresses, user IDs, home, mobile, business, fax PBX extension, redirection numbers may be included in each users profile and the profile shown is only provided for explanatory purposes. The entries in column 2004 are the stored John Smith profile user identification/contact information. Entry at column 2004, row 2008 shows the name stored in the profile record for John Smith is John Smith. Column 2004, row 2010 shows the user ID 1 (first user ID) is John Smith's MS Lync ID which is the user John Smith's user ID on a MS Lync communications system. Entry at column 2004, row 2012 shows the user ID 2 (second user ID) which is John Smith's IMS ID which is the user John Smith's user ID on a IMS system and used by his IMS phone. Entry at column 2004, row 2012 shows the user ID 3 (third user ID) which is John Smith's Google ID which is the user John Smith's user ID on Google systems. Entry at row 2004, column 2016 is John Smith's home phone number which is shown as 555-555-5551. Entry at row 2004, column 2018 is John Smith's mobile phone number which is shown as 555-555-5552. Entry at row 2004, column 2020 is John Smith's business phone number which is shown as 555-555-5553. Entry at row 2004, column 2022 is John Smith's FAX phone number which is shown as 555-555-5554. Entry at row 2004, column 2024 is John Smith's PBX extension number which is shown as 2350. Entry at row 2004, column 2026 is John Smith's personal e-mail address which is shown as JSMITH@PERSONAL.COM. Entry at row 2004, column 2028 is John Smith's work e-mail address which is shown as JSMITH@WORK.COM. Entry at row 2004, column 2030 is John Smith's redirection number which is shown as 555.555.5555. The redirection number is a phone number which may be, and in some embodiments, is used to specify a phone to route incoming calls to when the destination for the call is determined to be user John Smith.

Figure 21:
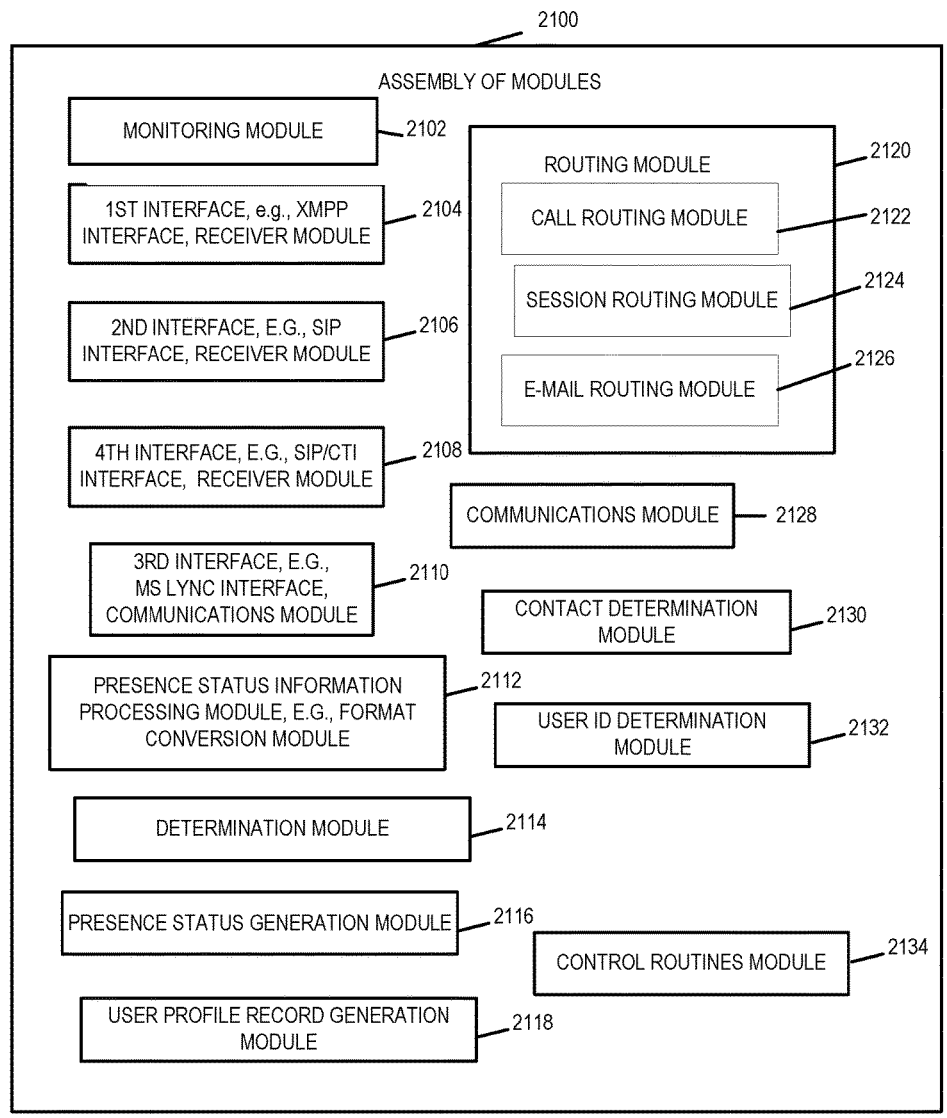
FIG. 21 is an exemplary assembly of modules in accordance with an embodiment of the present invention.

FIG. 21 illustrates an assembly of modules 2100 which includes modules which may be used in a user device, a monitoring device, and/or a PBX. One or more of the modules may be implemented in hardware, e.g., circuitry, and/or software modules. The assembly of modules 2100 includes a monitoring module 2102 configured to monitor signals for signaling information from which a user's identity may be determined or from which a user's presence status information may be determined. The assembly of modules includes a 1st interface, e.g., XMPP Interface, receiver module for receiver module 2104, a 2nd interface, e.g., SIP Interface, receiver module 2106, a 3rd Interface, e.g., a MS LYNC Interface communications module 2110, and a 4th Interface, e.g., SIP/CTI Interface, receiver module 2108. The 1st, 2nd, 3rd, and 4th Interface modules are configured to allow communications using different protocols and are only exemplary. The Computer Telephone Interface module is configured in monitoring devices to allow for communications with telephony device and systems, e.g., PBX that do not support IP communications. The assembly of modules includes presence status information processing module 2112 which in some embodiments is a format conversion module that is used for generating or placing presence information messages in a format that is being used by the target presence server. A determination module 2114 that is configured to make a variety of determinations such as for example, whether a signal includes presence information for a user whose profile is stored among the plurality of user profile records stored in memory, the determination of a user corresponding to a monitored signal based on received signaling information and information stored in the plurality of user profiles, and the determination of a user identifier corresponding to identified user information, determining a routing destination for a signal destined for a user based on the user's profile, e.g., routing a call to user profile redirection phone number for an identified user. The assembly of modules includes a presence status generation module 2116 configured to generate presence status information for one or more users based on and/or derived from signaling information being non-intrusively monitored. The assembly of modules also includes a user profile record generation module 2118 which generates a user profile record. The assembly of modules includes a routing module 2120 which includes a call routing module 2122, a session routing module 2124 and a e-mail routing module 2126. The routing module 2120 is configured to route messages destined for a user based on redirection contact information included in a user profile such as for example a telephone number or e-mail address to which telephone calls or e-mails are to be forwarded. The call routing module 2122 routes calls. The session routing module 2124 routes sessions and the e-mail rating module 2126 routes e-mails. The assembly of modules includes a communications module 2128 which provides communications with various devices using a variety of protocols, e.g., SIP, ISDN, and IP. The assembly of modules includes a contact determination module 2130 configured to determine user contact information from received or monitored signals. The contact determination module 2130 is sometimes a sub-module of the determination module 2114. The assembly of modules includes a user ID determination module 2132 configured to determine a user ID corresponding to a user from received or monitored signaling information or from contact information derived from received or monitored signaling information. The assembly of modules in a control routines module 2134 which includes numerous routines for controlling the processor of a device, e.g., a processor of monitoring apparatus or device.

Various apparatus embodiments and features will now be discussed. The apparatus may be, and in some embodiments is a hardware device including a processor and software operational control routines.

A monitoring apparatus comprising: a storage device (e.g., Active Directory) for storing a plurality of user profile records, each of the user profile records mapping contact information (e.g., PBX telephone number, User ID, e-mail address) for a user to one or more user identifiers (e.g., S4B Lync User ID) corresponding to the user, an Input/Output Interface configured to receive first signaling information (e.g., call setup request with calling party telephone number, called party telephone number, call termination request, call connection status information such as call established or call terminated), and a processor configured to operate said monitoring to: (i) identify a first user corresponding to the first signaling information by comparing at least a first portion of the information contained in the first signaling information (e.g., calling or called party telephone number) to at least a first portion of the information contained in the plurality of user profiles; (ii) generate first presence status information corresponding to the first user based on said first signaling information; and (iii) communicate via said Input/Output Interface the first presence status information, in a first format, to a first presence server as presence status information corresponding to a first user identifier, said first user identifier corresponding to said first user. The monitoring apparatus being either a session border controller or a PRI Gateway device. In some such embodiments the storage device is memory, e.g., cache memory, included in the monitoring apparatus. In some embodiments of the monitoring apparatus the processor is further configured to operate the monitoring apparatus to receive said plurality of user profile records via said Input/Output Interface from an Active Directory database and store said user profile records in said cache memory. In many embodiments the first format is a Session Initiation Protocol message format. In some embodiments, the first signaling information includes at least one of: user call status information, SIP user registration status information, user access network status information, and user device capability information.

In some embodiments in which the monitoring apparatus is a session border controller, the processor is further configured to operate said monitoring apparatus to non-intrusively monitor signals corresponding to a plurality of different users received at the SBC to determine if presence status information can be derived from signaling information contained in said signals for one or more users for which a user profile has been stored in the storage device. The signals in some embodiments are control signals.

In some such embodiments, the monitoring apparatus' processor is configured to operate the apparatus to receive said control signals from a private branch exchange via one of the monitoring apparatus' Input/Output Interfaces.

In some embodiments, the monitoring apparatus is a gateway device; and the gateway device is chosen from the group of gateway devices consisting of a Voice Over Internet Protocol gateway, an ISDN PRI to SIP gateway, and an ISDN PRI to H.323 gateway. In some such embodiments the signals received by the monitoring apparatus are Signaling System Number 7 signals received over a Public Switched Telephone Network communications link.

In some embodiments, the plurality of user profile records includes a user profile record for the first user and said first user profile record includes contact information for said first user and a first user identifier corresponding to said first user. In some embodiments, the processor is further configured to operate said monitoring apparatus to perform user profile matching as part of identifying the first user. In some embodiments, the contact information includes one or more of the following: a name, a telephone number, an address, an IMS ID, MS Lync ID, Skype for business ID. The address may be, and in some embodiments is, a geographical address, a network address (IP address, SIP address, etc.), or an e-mail address. In some embodiments, the telephone number is a landline number, a mobile number, a home number, a work number, a fax number or a Private Branch Exchange (PBX) line number. In some embodiments, the contact information for said first user is mapped to a MS Lync ID or Skype for business Lync ID corresponding to the first user.

In some embodiments, the first signaling information received by the monitoring apparatus is Signaling System No. 7 (SS7) call information. The Signaling System No. 7 call information may be, and in some embodiments is, Integrated Services Digital Network User Part (ISUP) call information and said contact information is called party number or calling party number. In some such embodiments, the processor of the monitoring apparatus is further configured to determine said first user identifier from said contact information stored in said first user profile.

In some embodiments in which the monitoring apparatus is a session border controller, the signaling information is included in one or more signaling messages. In some embodiments, the signaling information is included in SIP headers of SIP signals. In some embodiments, the processor is further configured to operate the monitoring apparatus to process the first signaling information to determine said first presence status information to put in said first format prior to communicating the first presence status information to said presence server in the first format.

In some embodiments, the monitoring apparatus is a SBC which is an edge device positioned between a PBX and a PSTN network and the apparatus' processor is further configured to operate said monitoring apparatus to: (i) receive second signaling information via an Input/Output Interface subsequent to receiving said first signaling information; (ii) determine if said second signaling information corresponds to said first user and when said second signaling information is determined to correspond to said first user; (iii) update said first presence information corresponding to the first user identifier of the first user indicating a presence state of said first user; and (iv) communicate said updated first presence information, in the first format, to the presence server. In some such embodiments, the first and second presence status information each include user in a call (busy) status or idle (available) status.

In some embodiments, the monitoring apparatus is coupled to a PBX and the first signaling information is received from a PBX, the signaling information being one of the following: call initiation signaling information, call connection signaling information, and call connection termination signaling information.

In some embodiments wherein said monitoring apparatus is coupled to a Public Switched Telephone Network (PSTN), the first signaling information is received from the Public Switched Telephone Network (PSTN), the processor of the monitoring apparatus is further configured to operate said monitoring apparatus to route said first signaling information to a plurality of different end points based on the contact information contained in the user profile corresponding to the first user. In some of such embodiments, the contact information contained in the user profile corresponding to the first user includes two or more of the following: home telephone number, mobile telephone number, PBX line number, a Skype for business Lync ID, and a IMS ID.

The first signaling information may be, and in some embodiments is, in an analog format.

In some embodiments, the first signaling information is generated by a PBX in response to receiving a first user device signal from a first user device assigned to the first user. In some such embodiments, the first user device signal is one of a call initiation signal or a call termination signal. In some embodiments, communicating said first presence status information to a first presence server includes publishing the first presence status information to the first presence server on behalf of the first user.

In some embodiments, the processor is further configured to operate said monitoring apparatus to: (i) identify a second user corresponding to the first signaling information by comparing at least a second portion of the information contained in the first signaling information (e.g., callee or called party telephone number) to at least a second portion of the information contained in the plurality of user profiles; (ii) generate first presence status information (e.g., available/not busy, on-call/busy) corresponding to the second user based on said first signaling information; and (iii) communicate the first presence status information corresponding to the second user, in a first format (e.g., Session Initiation Protocol format), to the first presence server as presence status information corresponding to a second user identifier, said second user identifier corresponding to said second user. In most, but not all of such embodiments, the at least a first portion of the first signaling information is a calling party telephone number and a second portion of the first signaling information is a called party telephone number. In some embodiments, the first presence status information which corresponds to the first user and the second presence status information which corresponds to the second user are the same status (i.e., both have busy/on-call presence status or both have not busy/not on a call/available/idle presence status) as they are both parties to the same call.

In another exemplary embodiment, a SBC publishes presence information on behalf of an endpoint. The SBC is not a network device but is a device owned by an operator, e.g., a private business, that is positioned between a PBX and IP or PSTN network. In most but not all of such embodiments the SBC and PBX are owned by the same business. The SBC in these embodiments does not receive presence information from the PBX via a CTI link but instead derives presence information from the PBX endpoints based on call signals passing through the SBC by intelligently determining when presence information needs to be published for one or both of the legs of a call it is handling for a PBX endpoint. After making this determination, the SBC will send notification to the Skype for Business Presence Server announcing that the Skype for Business User Id(s) are in a call. The SBC retains this information and at the end of the call will notify the Skype for Business Presence Server that the User ID is no longer in a call.

Various method embodiments and features will now be discussed.

A first method of operating a communications system, the method comprising: storing, at a storage device (e.g., Active Directory), a plurality of user profile records, each of the user profile records mapping contact information (e.g., PBX telephone number) for a user to one or more user identifiers (e.g., S4B Lync User ID) corresponding to the user; receiving, at a monitoring device, first signaling information (e.g., call setup request with calling party telephone number, called party telephone number, call termination request, call connection status information such as call established or call terminated), said monitoring device being a Session Border Controller or a gateway; determining, at the monitoring device, a first user corresponding to the first signaling information by comparing at least a first portion of the information contained in the first signaling information (e.g., calling or called party telephone number) to at least a first portion of the information contained in the plurality of user profiles; generating, at the monitoring device (e.g., SBC or gateway), first presence status information (idle/available/not busy, on-call/busy) corresponding to the first user based on said first signaling information; communicating, from the monitoring device (SBC or gateway), the first presence status information, in a first format (e.g., Session Initiation Protocol format), to a first presence server as presence status information corresponding to a first user identifier, said first user identifier corresponding to said first user. In some embodiments of the method the storage device is memory included in the monitoring device. In some embodiments of the method, the method further includes communicating said plurality of user profile records to said monitoring device for storage via an input/output interface. The first format may be, and in some embodiments is, a Session Initiation Protocol message format. In some embodiments of the method, the first signaling information includes at least one of: user call status information, SIP user registration status information, user access network status information, and user device capability information.

The first method embodiment wherein said monitoring device is a session border controller (SBC), the method further comprising: non-intrusively monitoring, at the SBC, signals corresponding to a plurality of different users received at the SBC to determine if presence status information can be derived from signaling information contained in said signals for one or more users for which a user profile has been stored in the storage device. The signals may be, and in some embodiments are, control signals. The control signals may be received from a private branch exchange (PBX).

The first method embodiment wherein the monitoring device is a gateway device; and the gateway device is chosen from the group of gateway devices consisting of a Voice Over Internet Protocol gateway, an ISDN PRI to SIP gateway, and an ISDN PRI to H.323 gateway.

The first method embodiment wherein said plurality of user profile records includes a user profile record for the first user and said first user profile record includes contact information for said first user and a first user identifier corresponding to said first user. In some embodiments determining the first user includes user profile matching. In some embodiments, the contact information includes one or more of the following: a name, a telephone number, an address, an IMS ID, a MS Lync ID, a Skype for business ID. In some embodiments, the address is a geographical address, a network address (e.g., IP address, SIP address, etc.), or an e-mail address. In some embodiments, the telephone number is a landline number, a mobile number, a home number, a work number, a fax number or a Private Branch Exchange (PBX) line number. In some embodiments, the contact information for said first user is mapped to a MS Lync ID or Skype for business Lync ID corresponding to the first user.

In some embodiments of the first method embodiment the first signaling information is Signaling System No. 7 (SS7) call information. In some such embodiments, the Signaling System No. 7 call information is Integrated Services Digital Network User Part (ISUP) call information and said contact information is called party number or calling party number and the method further includes determining said first user identifier from said contact information stored in said first user profile.

In some embodiments, the monitoring device is a session border controller and said signaling information is included in one or more signaling messages, e.g., SIP headers of registration and initiation messages.

In some embodiments, the method further includes prior to communicating said first presence status information to said presence server in the first format, processing the first signaling information to determine said first presence status information to put in said first format.

In some embodiments, the monitoring device is a SBC which is an edge device positioned between a PBX and a PSTN network and the method further comprises: subsequent to receiving said first signaling information, receiving, at the SBC, second signaling information; determining, at the SBC, if said second signaling information corresponds to said first user and when said second signaling information is determined to correspond to said first user; updating, at the SBC, said first presence information corresponding to the first user identifier of the first user indicating a presence state of said first user; and communicating said updated first presence information, in the first format, to the presence server. In some such embodiments, the first and second presence status information each include user in a call (busy) status or idle (available) status.

The method of the first method embodiment further comprising receiving said first signaling information at the monitoring device from a PBX, the signaling information being one of the following: call initiation signaling information, call connection signaling information, and call connection termination signaling information.

In some embodiments, said first signaling information is received from a Public Switched Telephone Network (PSTN) and the method further includes routing said first signaling information to a plurality of different end points based on the contact information contained in the user profile corresponding to the first user. In some embodiments, the contact information contained in the user profile corresponding to the first user includes two or more of the following: home telephone number, mobile telephone number, PBX line number, a Skype for business Lync ID, and an IMS ID.

In some embodiments, the first signaling information is in an analog format. In some such embodiments, the method further comprises: generating, by the PBX, said first signaling information in response to receiving a first user device signal from a first user device assigned to the first user. The first user device signal being one of a call initiation signal or a call termination signal. In some embodiments, communicating said first presence status information includes publishing said first presence status information to the first presence server on behalf of the first user.

In some embodiments, the first method embodiment further comprises: determining, at the monitoring device (SBC or gateway), a second user corresponding to the first signaling information by comparing at least a second portion of the information contained in the first signaling information (e.g., callee or called party telephone number) to at least a second portion of the information contained in the plurality of user profiles; generating, at the monitoring device (SBC or gateway), first presence status information (e.g., available/not busy, on-call/busy) corresponding to the second user based on said first signaling information; communicating, from the monitoring device (SBC or gateway), the first presence status information corresponding to the second user, in a first format (e.g., Session Initiation Protocol format), to the first presence server as presence status information corresponding to a second user identifier, said second user identifier corresponding to said second user. In some embodiments, the at least a first portion of the first signaling information is a calling party telephone number and a second portion of the first signaling information is a called party telephone number. In some embodiments, the first presence status information corresponding to the first user and the second presence status information corresponding to the second user are the same status. (i.e., both have busy/on-call presence status or both have not busy/not on a call/available/idle presence status)

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a data processing system. Various embodiments are also directed to methods, e.g., a method of processing data. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

In various embodiments, servers, e.g., application servers, may be utilized. Servers may be implemented in one or more circuits thus in some embodiments a server is a hardware device. In some embodiments servers may be software. In some embodiments servers may be a combination of hardware and software.

In some embodiments, the processor or processors, e.g., CPUs, of one or more devices, e.g., monitoring device, user devices, session border controllers, PAIF devices, and gateways, are configured to perform the steps of the methods described as being performed by the device, e.g., monitoring device, user devices, session border controllers, PAIF devices, gateways, and presence servers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device such as for example a monitoring device, session border controller, gateway, user device, presence server, PAIF device with a processor which includes a module corresponding to each of the steps of the various described methods performed by the device in which the processor is included. In some but not all embodiments a device includes a module corresponding to each of the steps of the various described methods performed by the device in which the processor is included. The modules may be implemented using software and/or hardware Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., circuits. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or sub-routines, or some of the steps performed by such routines, may be implemented in dedicated hardware as opposed to software executed on a general purpose processor. In some embodiments each of the modules is implemented using a processor configured to perform the module's function. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s). In some embodiments, each step or sub-step is implemented by a processor. In some embodiments, one or more processors are used to control a device, e.g., monitoring device to perform one or more steps of the methods and routines disclosed.

Numerous additional variations on the methods and apparatus of the various embodiments described above will be apparent to those skilled in the art in view of the above description. Such variations are to be considered within the scope of the invention.

What is claimed is:

1. A method of operating a communications system, the method comprising:
   storing, at a storage device of the communications system, a plurality of user profile records, each of the user profile records mapping contact information for a user to one or more user identifiers corresponding to the user;
   receiving from a first end user device, at a monitoring device of the communications system, first signaling messages being exchanged between said first user device and a second device passing through said monitoring device for establishing or terminating a call, said monitoring device being a Session Border Controller (SBC), said monitoring device including said storage device or being coupled to said storage device;
   determining, at the monitoring device, a first user corresponding to the first signaling messages by comparing at least a first portion of information contained in the first signaling messages to at least a first portion of the information contained in the plurality of user profiles;
   generating, at the monitoring device, first presence status information corresponding to the first user based on said first signaling messages;
   communicating, from the monitoring device, the first presence status information, in a first format, to a first presence server as presence status information corresponding to a first user identifier, said first user identifier corresponding to said first user; and
   transmitting to said second device from said SBC said received first signaling messages as part of exchanging said messages between said first user device and said second device for establishing or terminating said call, said first signaling messages being call establishment signaling messages or call termination signaling messages;
   generating by the SBC a user profile from information contained in the first signaling messages, said generated user profile containing contact information; and
   using said SBC generated user profile to determine the first user through user profile matching, said user profile matching including:
      comparing said contact information in said generated user profile with contact information in said plurality of user profile records and
      when said comparison results in only a single user profile record with matching contact information determining said user corresponding to said single user profile record with said matching contact information as the first user, and
      when said comparison results in two or more of said user profile records of said plurality of user profile records having contact information matching said contact information in said SBC generated user profile, matching one or more additional attributes in said generated user profile to identify a single matching user profile record from said plurality of user profile records and determining said user corresponding to said identified single matching user profile from said plurality of user profile records as the first user; and
   obtaining said first user identifier corresponding to said first user from the user profile record determined to correspond to the first user.

2. The method of claim 1 further comprising:
   non-intrusively monitoring, at the SBC, control signals passing through the SBC corresponding to a plurality of different users to determine if presence status information can be derived from signaling information contained in said control signals for one or more users for which a user profile has been stored in the storage device, said control signals being for establishing voice over internet telephone calls or media sessions.

3. The method of claim 2, wherein said first signaling messages passing through said monitoring device contain Signaling System No. 7 (SS7) call information.

4. The method of claim 3, wherein said Signaling System No. 7 call information is Integrated Services Digital Network User Part (ISUP) call information and said contact information is called party number or calling party number; the method further including:
   determining said first user identifier from said contact information stored in said first user profile.

5. The method of claim 2, wherein said monitoring device is a SBC which is an edge device positioned between a PBX and a PSTN network further comprising:
   subsequent to receiving said first signaling messages passing through said SBC, receiving, at the SBC, second signaling messages passing through the SBC;
   determining, at the SBC, if said second signaling messages correspond to said first user and when said second signaling messages are determined to correspond to said first user;
   updating, at the SBC, said first presence information corresponding to the first user identifier of the first user indicating a presence state of said first user; and communicating said updated first presence information, in the first format, to the presence server.

6. The method of claim 1, wherein said plurality of user profile records includes a user profile record for the first user and said first user profile record includes contact information for said first user and a first user identifier corresponding to said first user, said contact information for said first user and said first user identifier being different.

7. The method of claim 6, wherein said contact information for said first user includes one or more of the following: a name, a telephone number, an address, an IMS ID, a MS Lync ID, a Skype for business ID.

8. The method of claim 7, wherein said contact information for said first user is mapped to a MS Lync ID or a Skype for business Lync ID corresponding to the first user.

9. The method of claim 6,
wherein said contact information for said first user includes a plurality of different telephone numbers selected from the following group: a landline number, a mobile number, a home number, a work number, and a Private Branch Exchange (PBX) line number; and
wherein said at least a first portion of information contained in the first signaling messages is a telephone number; and
wherein said method further includes said SBC normalizing said telephone number of said first signaling messages prior to performing said comparing at least a first portion of information contained in the first signaling messages to at least a first portion of the information contained in the plurality of user profiles.

10. Them method of claim 1 further comprising:
prior to communicating said first presence status information to said presence server in the first format, processing the information contained in the first signaling messages to determine said first presence status information to put it in said first format.

11. The method of claim 1 further comprising receiving said first signaling messages at the monitoring device from a PBX, the first signaling messages including one of the following: call initiation signaling information, call connection signaling information, and call connection termination signaling information.

12. The method of claim 1 further comprising:
determining, at the monitoring device, a second user corresponding to the first signaling messages by comparing at least a second portion of the information contained in the first signaling messages to at least a second portion of the information contained in the plurality of user profiles;
generating, at the monitoring device, first presence status information corresponding to the second user based on said first signaling messages;
communicating, from the monitoring device, the first presence status information corresponding to the second user, in a first format, to the first presence server as presence status information corresponding to a second user identifier, said second user identifier corresponding to said second user.

13. The method of claim 1 further comprising: routing, by the SBC, the first signaling messages to a plurality of phone numbers based on contact information contained in a user profile record identified as corresponding to the user for whom the received first signaling messages are destined.

14. A monitoring apparatus comprising:
a storage device for storing a plurality of user profile records, each of the user profile records mapping contact information for a user to one or more user identifiers corresponding to the user;
an Input/Output Interface configured to receive and transmit first signaling messages received from a first end user device, said monitoring apparatus being a Session Border Controller (SBC), said first signaling messages being exchanged between said first user device and a second user device for establishing or terminating a call; and
a processor configured to operate said monitoring apparatus to:
identify a first user corresponding to the first signaling messages by comparing at least a first portion of information contained in the first signaling messages to at least a first portion of the information contained in the plurality of user profiles;
generate first presence status information corresponding to the first user based on said first signaling messages;
communicate via said Input/Output Interface the first presence status information, in a first format, to a first presence server as presence status information corresponding to a first user identifier, said first user identifier corresponding to said first user; and
transmit via said Input/Output Interface said received first signaling messages to said second user device as part of exchanging said messages between said first user device and said second user device for establishing or terminating said call, said first signaling messages being call establishment signaling messages or call termination signaling messages;
generate a user profile from information contained in the first signaling messages, said generated user profile containing contact information; and
using said SBC generated user profile to determine the first user through user profile matching, said user profile matching including:
comparing said contact information in said generated user profile with contact information in said plurality of user profile records and
when said comparison results in only a single user profile record with matching contact information determining said user corresponding to said single user profile record with said matching contact information as the first user, and
when said comparison results in two or more of said user profile records of said plurality of user profile records having contact information matching said contact information in said SBC generated user profile, matching one or more additional attributes in said generated user profile to identify a single matching user profile record from said plurality of user profile records and determining said user corresponding to said identified single matching user profile from said plurality of user profile records as the first user; and
obtain said first user identifier corresponding to said first user from the user profile record determined to correspond to the first user.

15. The apparatus of claim 14 wherein said information included in said first signaling messages includes at least one of: user call status information, SIP user registration status information, user access network status information, and user device capability information.

16. The apparatus of claim 14 wherein the processor is further configured to operate said monitoring apparatus to:

non-intrusively monitor control signals passing through the SBC corresponding to a plurality of different users to determine if presence status information can be derived from signaling information contained in said control signals for one or more users for which a user profile has been stored in the storage device, said control signals being for establishing voice over internet telephone calls or media sessions.

17. The apparatus of claim 14 wherein said plurality of user profile records includes a user profile record for the first user and said first user profile record includes contact information for said first user and a first user identifier corresponding to said first user, said contact information for said first user and said first user identifier being different.

18. The apparatus of claim 17, wherein said contact information includes one or more of the following: a name, a telephone number, an address, an IMS ID, a MS Lync ID, a Skype for business ID.

19. The apparatus of claim 16, wherein said SBC is an edge device positioned between a PBX and a PSTN network wherein said processor is further configured to operate said monitoring apparatus to:

receive second signaling messages passing through the SBC via the Input/Output Interface subsequent to receiving said first signaling messages;

determine if said second signaling messages correspond to said first user and when said second signaling messages are determined to correspond to said first user;

update said first presence information corresponding to the first user identifier of the first user indicating a presence state of said first user; and communicate said updated first presence information, in the first format, to the presence server.

20. The apparatus of claim 14, wherein said processor of the SBC is further configured to operate the SBC to route the first signaling messages to a plurality of phone numbers based on contact information contained in a user profile record identified as corresponding to the user for whom the received first signaling messages are destined.

* * * * *